United States Patent [19]

Misawa et al.

[11] Patent Number: 5,751,486
[45] Date of Patent: May 12, 1998

[54] SHAKE-PREVENTING CORRECTION OPTICAL SYSTEM

[75] Inventors: Junichi Misawa; Yutaka Suenaga, both of Yokohama, Japan

[73] Assignee: Nikon Corporation, Japan

[21] Appl. No.: 545,418

[22] Filed: Oct. 19, 1995

[30] Foreign Application Priority Data

| Oct. 20, 1994 | [JP] | Japan | 6-281228 |
| Oct. 20, 1994 | [JP] | Japan | 6-281229 |
| Oct. 20, 1994 | [JP] | Japan | 6-281231 |
| Oct. 20, 1994 | [JP] | Japan | 6-281232 |
| Oct. 20, 1994 | [JP] | Japan | 6-281233 |
| Oct. 20, 1994 | [JP] | Japan | 6-281234 |

[51] Int. Cl.$^6$ .................. G02B 27/64; G02B 15/14
[52] U.S. Cl. .................. 359/557; 359/691
[58] Field of Search .................. 359/557, 692, 359/745, 748, 749, 753, 652, 653, 691

[56] References Cited

U.S. PATENT DOCUMENTS

| 4,844,602 | 7/1989 | Kitagishi et al. | 359/557 |
| 4,883,346 | 11/1989 | Aoki et al. | 359/652 |
| 4,907,868 | 3/1990 | Kitagishi et al. | 359/557 |
| 4,965,619 | 10/1990 | Shikaumi et al. | 354/410 |
| 5,011,272 | 4/1991 | Nakayama et al. | 359/692 |
| 5,157,550 | 10/1992 | Tsuchida et al. | 359/686 |
| 5,172,276 | 12/1992 | Ueyama et al. | 359/813 |
| 5,579,160 | 11/1996 | Sato | 359/557 |
| 5,598,299 | 1/1997 | Hayakawa | 359/557 |

FOREIGN PATENT DOCUMENTS

| 2-234115 | 9/1990 | Japan. |
| 4-277728 | 10/1992 | Japan. |
| 4-294310 | 10/1992 | Japan. |
| 6-59192 | 3/1994 | Japan. |

OTHER PUBLICATIONS

Patent Abstracts of Japan and JP 7-168077, published on Jul. 4, 1995.

*Primary Examiner*—Paul M. Dzierzynski
*Assistant Examiner*—Mark A. Robinson
*Attorney, Agent, or Firm*—Pennie & Edmonds LLP

[57] ABSTRACT

A shake-preventing correction optical system has in order from the object side a lens unit (Gf) fixed in a direction perpendicular to the optical axis and a shake-preventing correction lens unit (Gv) including a decentering lens unit arranged as movable in a direction substantially perpendicular to the optical axis, wherein the lens unit (Gf) has a first lens unit (G1) having a positive refractive power, a focusing lens unit (G2) having a negative refractive power and arranged to move along the optical axis to effect focusing to a near object, and a lens unit (G3a), and wherein the shake-preventing lens unit (Gv) includes the decentering lens unit (G3b) having a positive lens and a negative lens. The shake-preventing correction optical system has the decentering lens unit composed of a small number of constituent lens or lenses and has good imaging performance even upon shake-preventing correction.

8 Claims, 72 Drawing Sheets

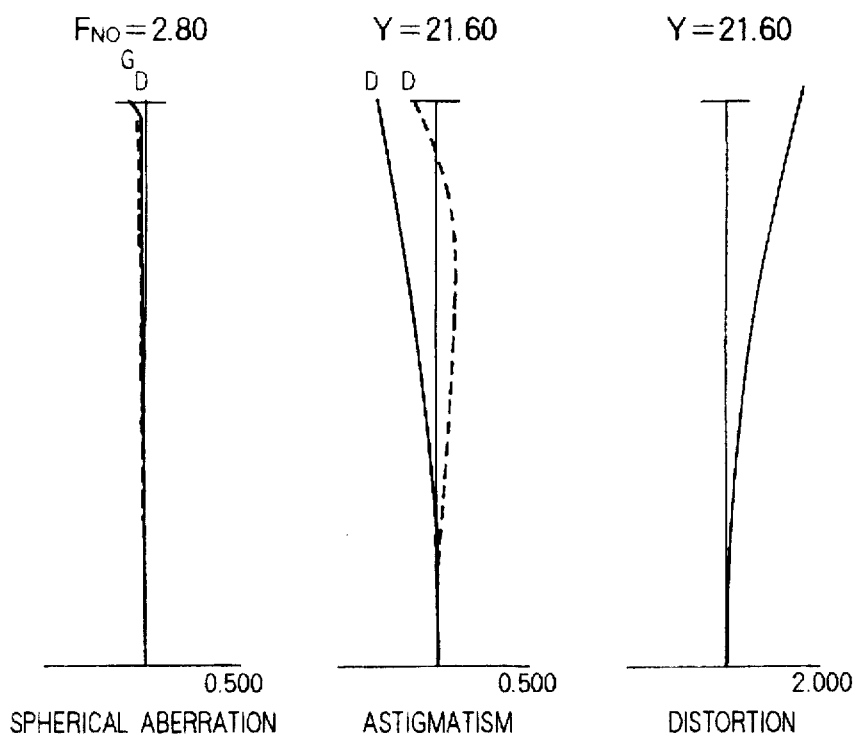
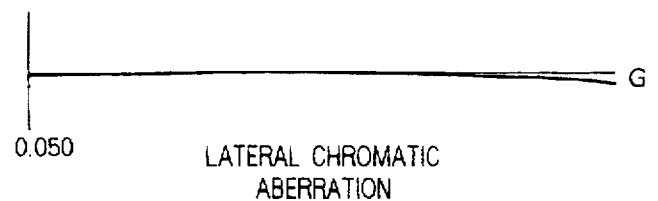

Fig. 3A  Y = +21.6  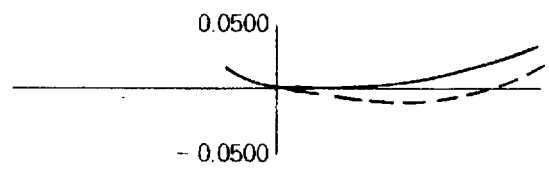
Fig. 3B  Y = +15.12  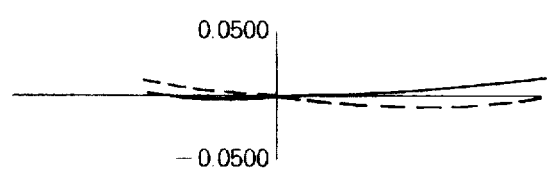
Fig. 3C  Y = +10.8  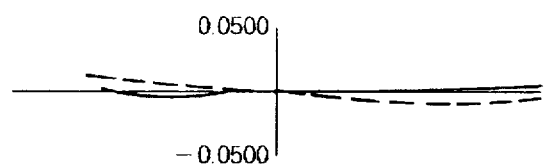
Fig. 3D  Y = 0  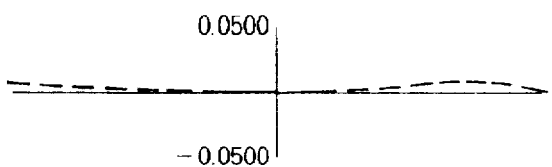
Fig. 3E  Y = −10.8  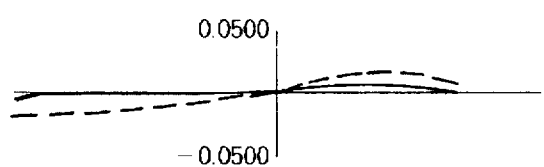
Fig. 3F  Y = −15.12  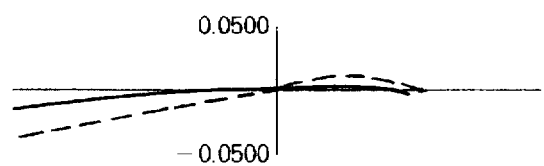
Fig. 3G  Y = −21.6  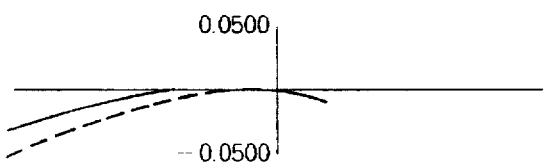

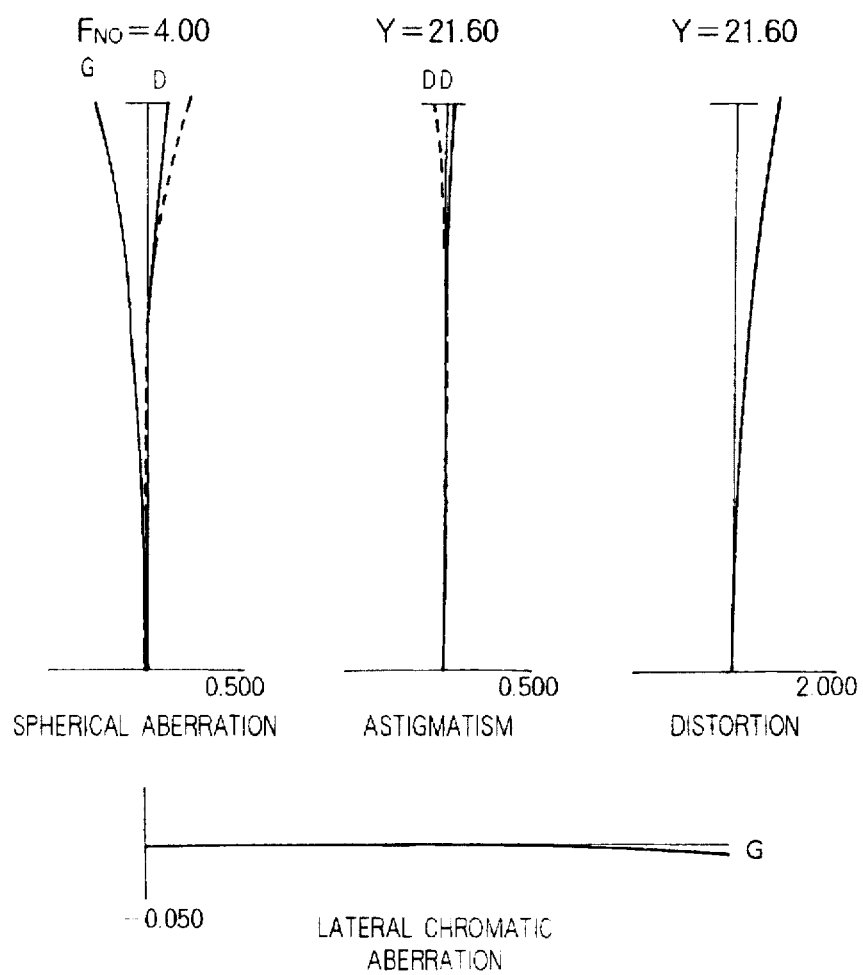

Fig. 6A    Y = +21.6    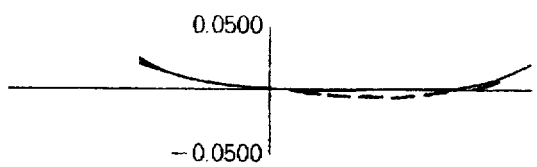
Fig. 6B    Y = +15.12   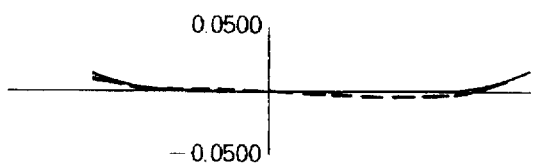
Fig. 6C    Y = +10.8    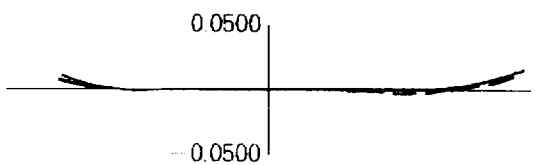
Fig. 6D    Y = 0        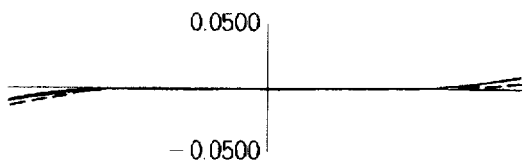
Fig. 6E    Y = −10.8    
Fig. 6F    Y = −15.12   
Fig. 6G    Y = −21.6    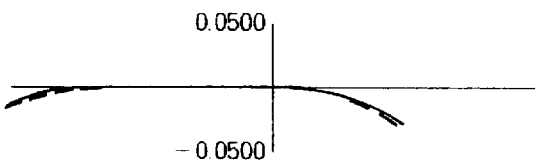

Fig. 8A   Fig. 8B   Fig. 8C
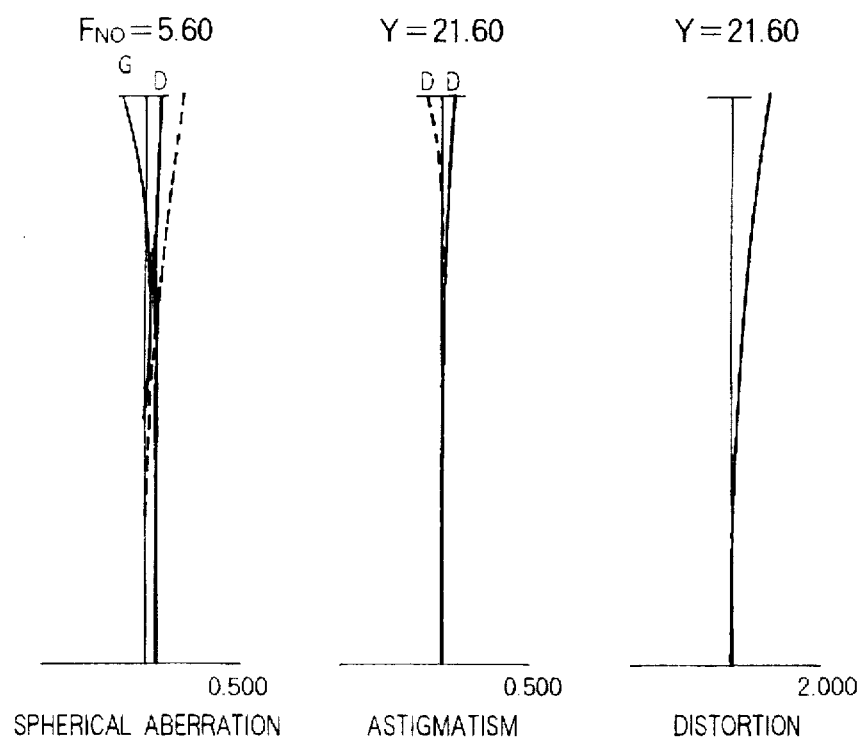
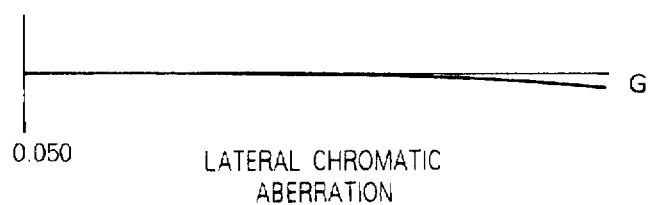
Fig. 8D

Fig. 9A    Y = +21.6    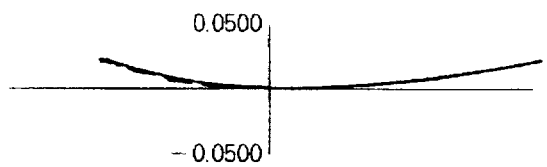
Fig. 9B    Y = +15.12   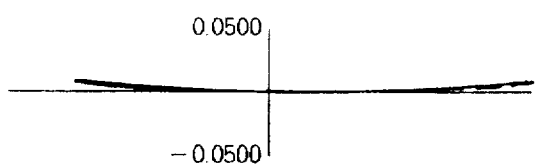
Fig. 9C    Y = +10.8    
Fig. 9D    Y = 0        
Fig. 9E    Y = −10.8    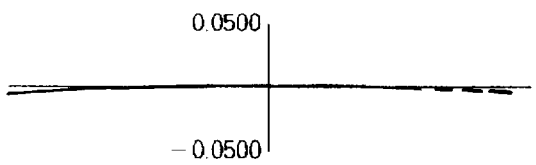
Fig. 9F    Y = −15.12   
Fig. 9G    Y = −21.6    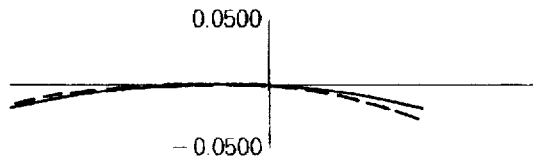

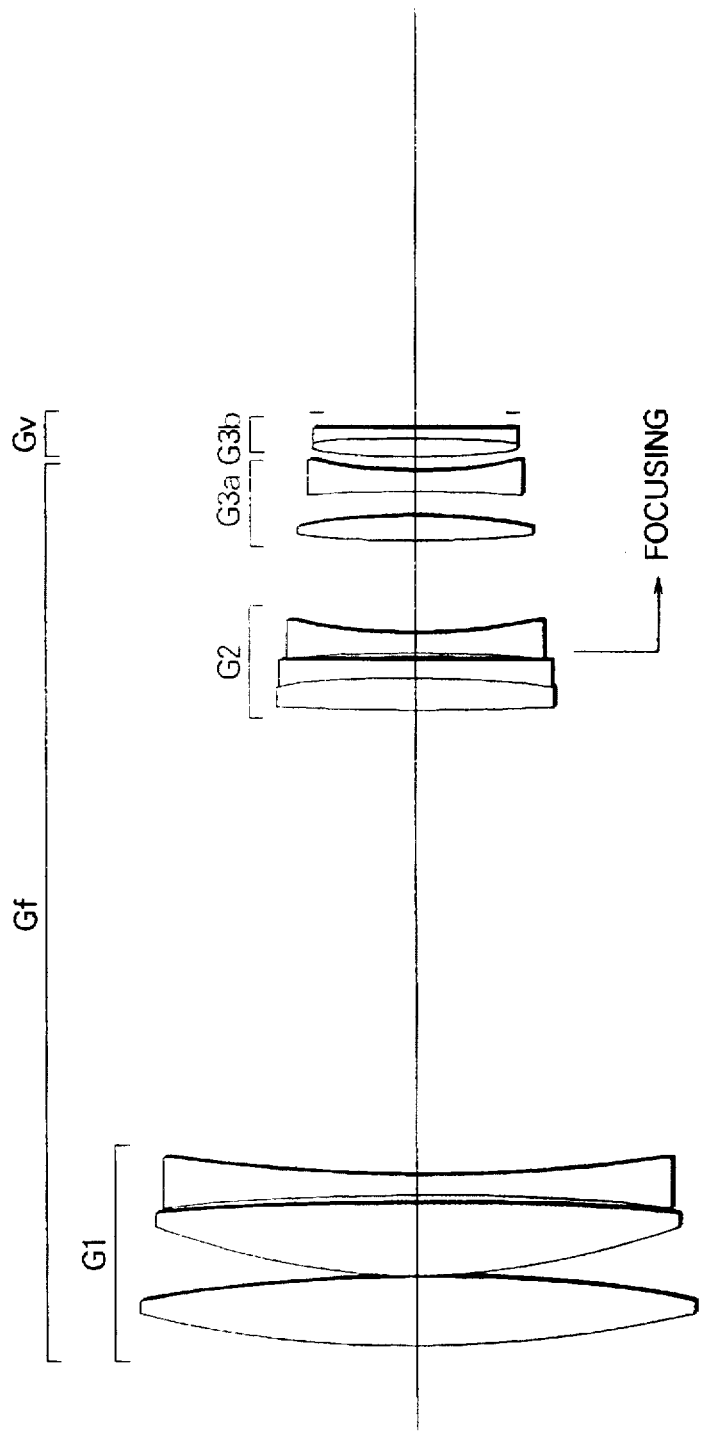

Fig. 11A  Fig. 11B  Fig. 11C
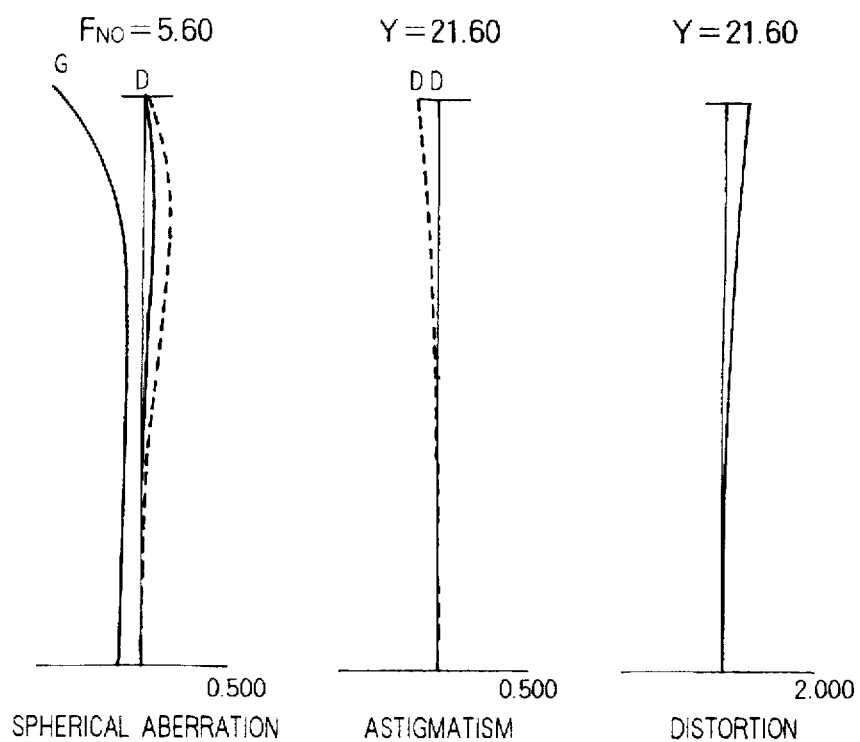
SPHERICAL ABERRATION   ASTIGMATISM   DISTORTION
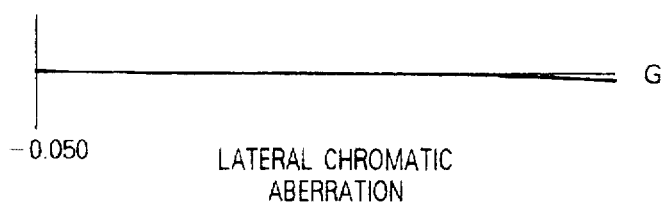
LATERAL CHROMATIC ABERRATION
Fig. 11D Fig. 12A    Y = +21.6    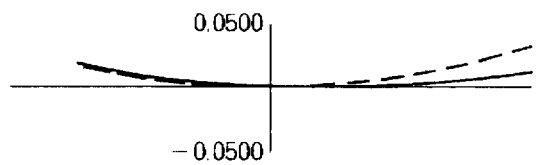
Fig. 12B    Y = +15.12   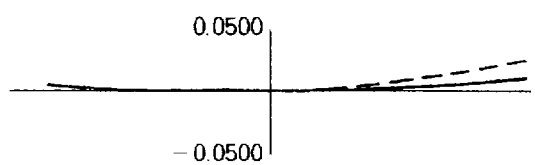
Fig. 12C    Y = +10.8    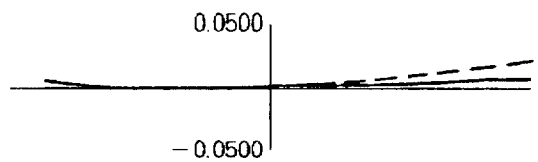
Fig. 12D    Y = 0        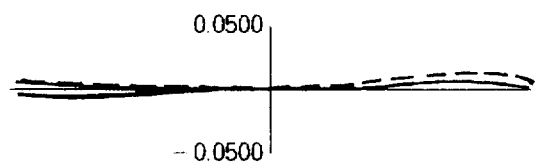
Fig. 12E    Y = −10.8    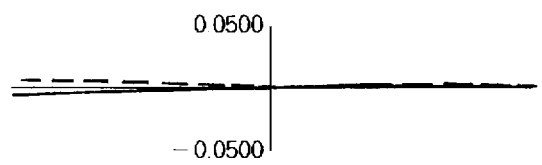
Fig. 12F    Y = −15.12   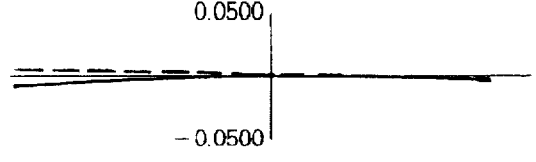
Fig. 12G    Y = −21.6    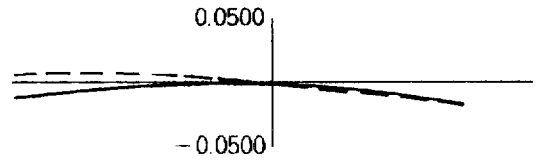

Fig. 14A  Fig. 14B  Fig. 14C
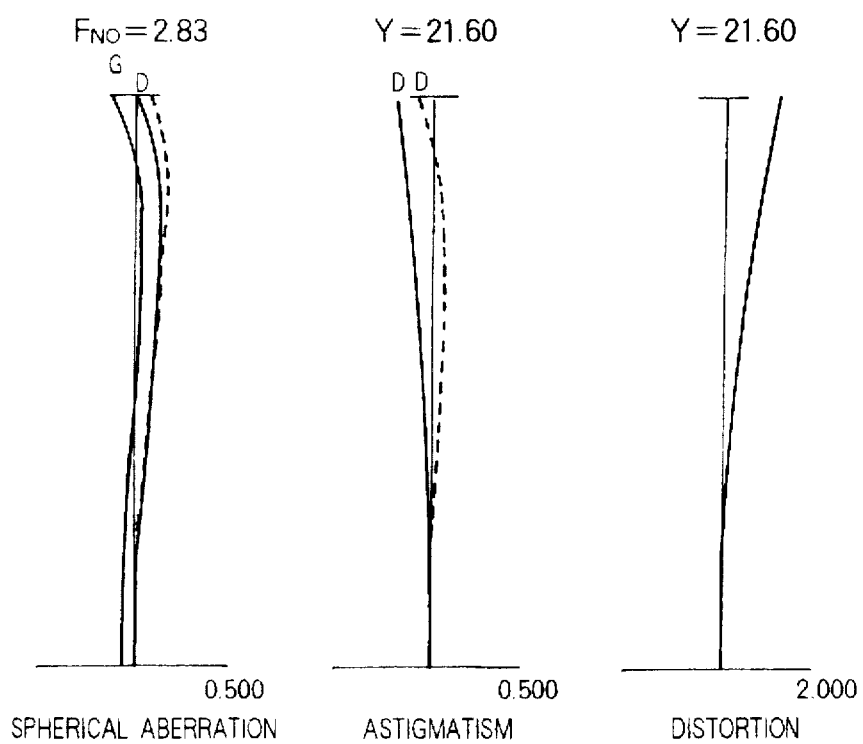
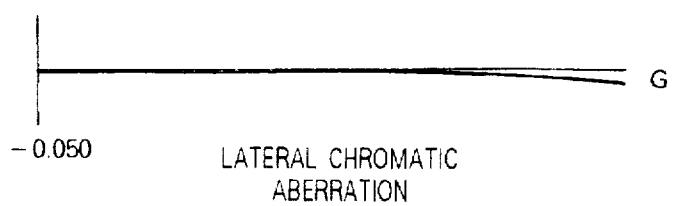
Fig. 14D

Fig. 15A  Y = +21.6  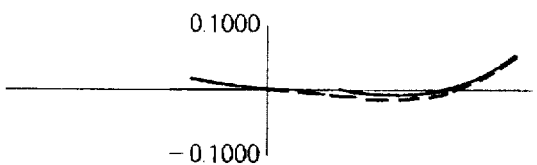
Fig. 15B  Y = +15.12  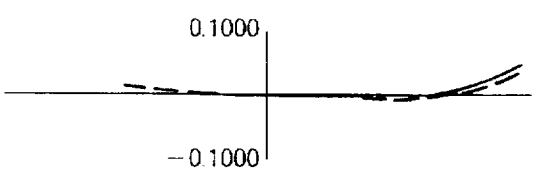
Fig. 15C  Y = +10.8  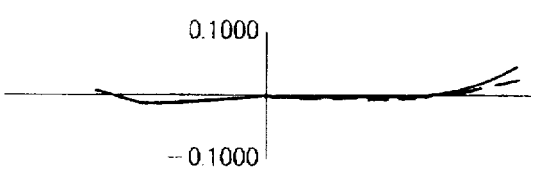
Fig. 15D  Y = 0  
Fig. 15E  Y = −10.8  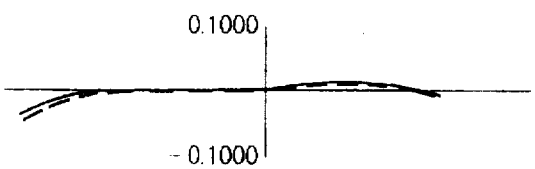
Fig. 15F  Y = −15.12  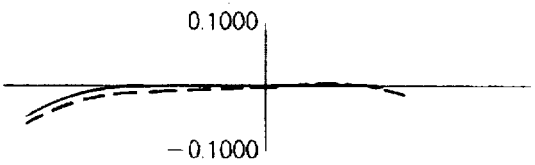
Fig. 15G  Y = −21.6  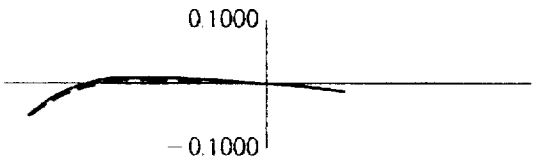

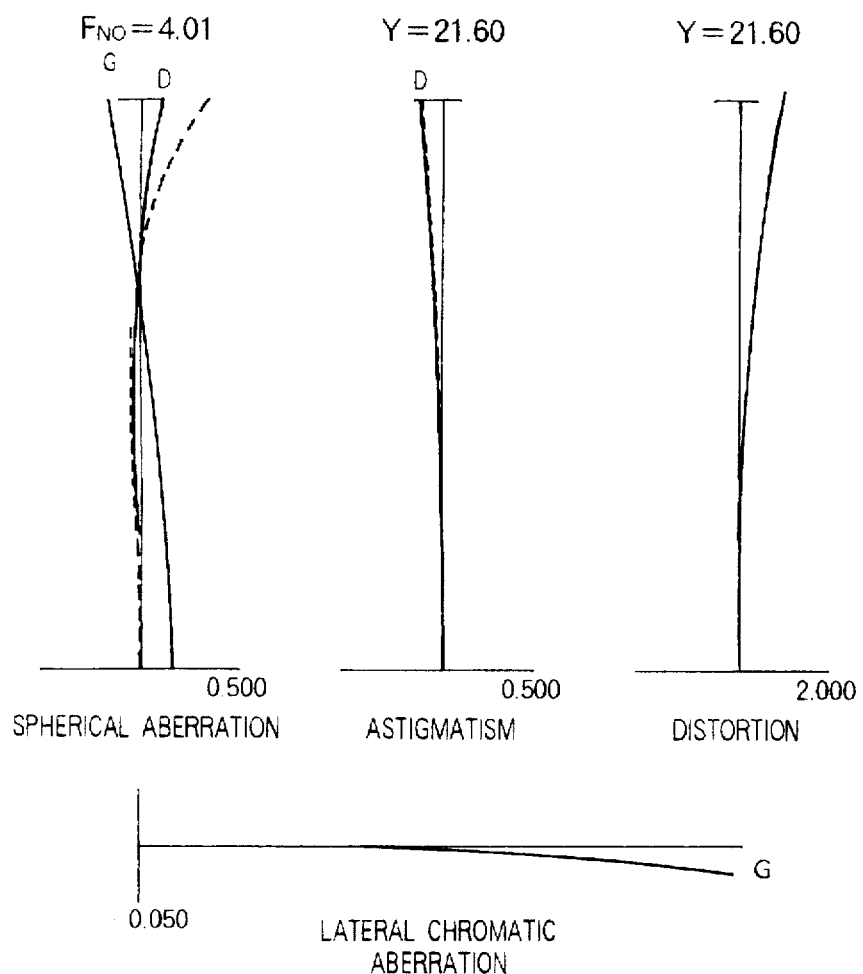

Fig. 18A    Y = +21.6    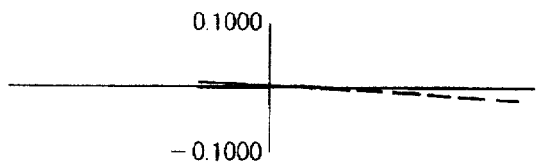
Fig. 18B    Y = +15.12   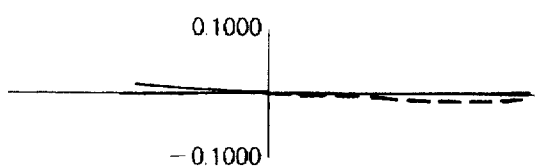
Fig. 18C    Y = +10.8    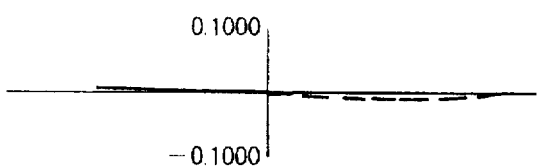
Fig. 18D    Y = 0        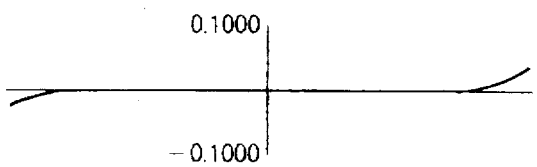
Fig. 18E    Y = −10.8    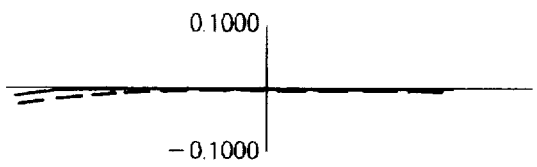
Fig. 18F    Y = −15.12   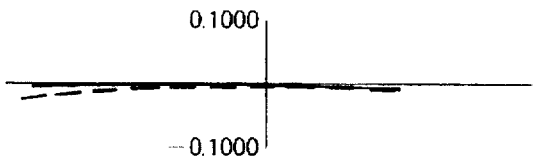
Fig. 18G    Y = −21.6    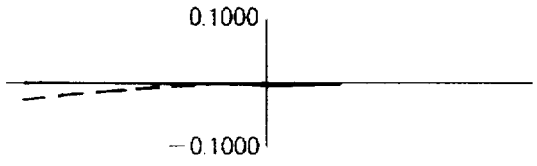

Fig. 21A  Y = +21.6 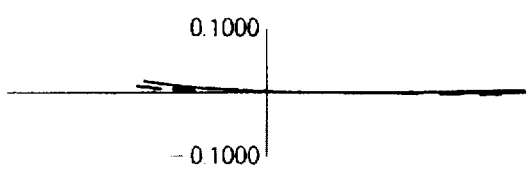
Fig. 21B  Y = +15.12 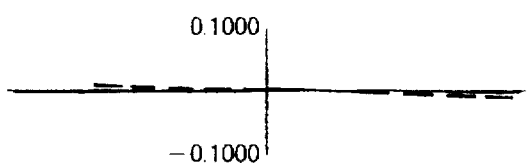
Fig. 21C  Y = +10.8 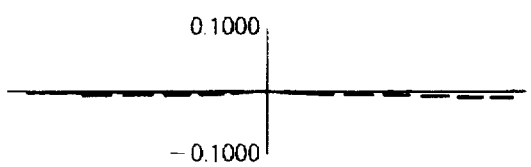
Fig. 21D  Y = 0 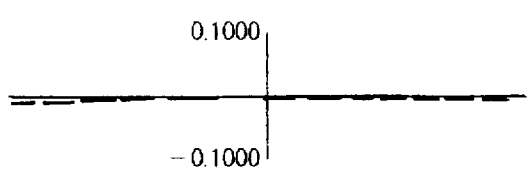
Fig. 21E  Y = −10.8 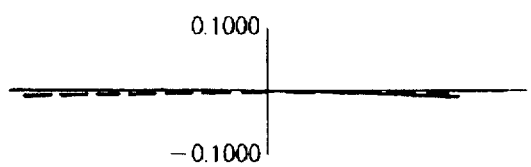
Fig. 21F  Y = −15.12 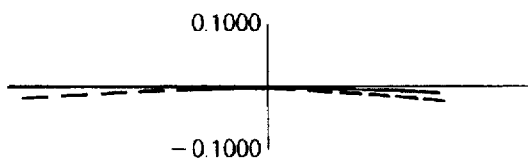
Fig. 21G  Y = −21.6 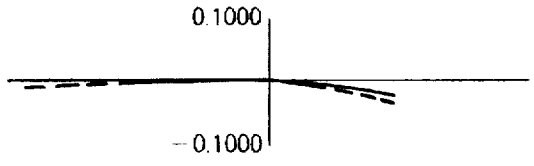

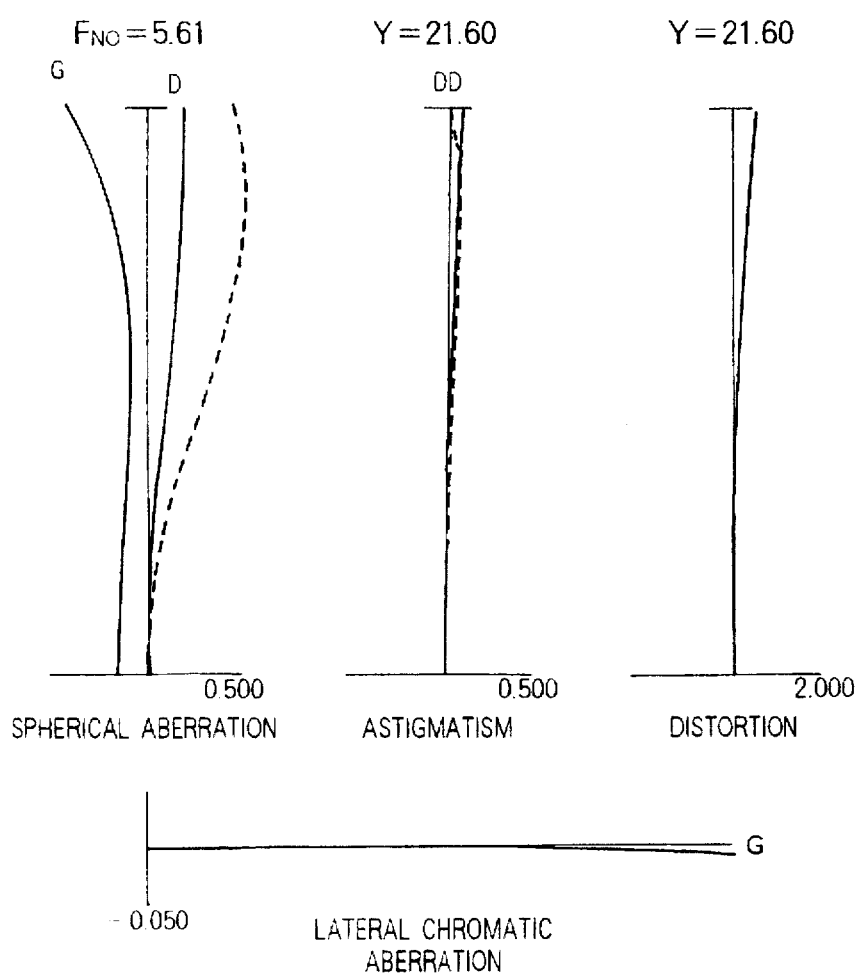

Fig. 24A   Y = +21.6   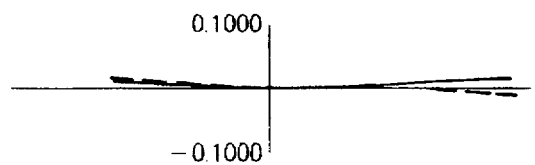
Fig. 24B   Y = +15.12   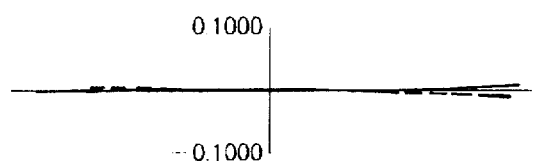
Fig. 24C   Y = +10.8   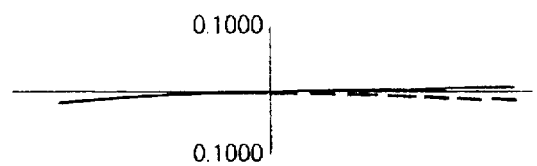
Fig. 24D   Y = 0   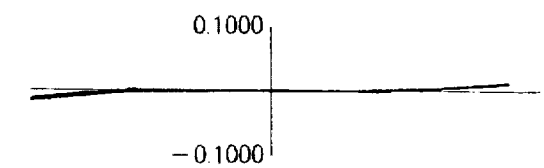
Fig. 24E   Y = −10.8   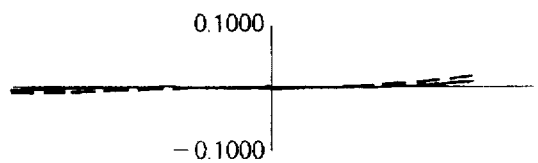
Fig. 24F   Y = −15.12   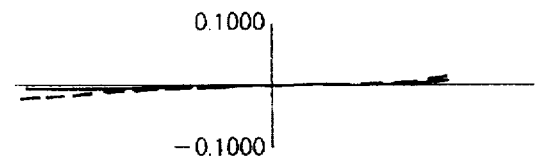
Fig. 24G   Y = −21.6   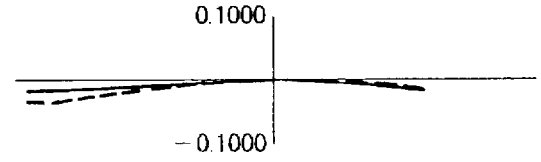

Fig. 27A  Y = +21.6  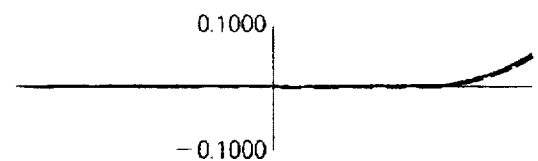
Fig. 27B  Y = +15.12  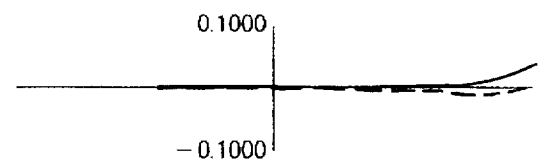
Fig. 27C  Y = +10.8  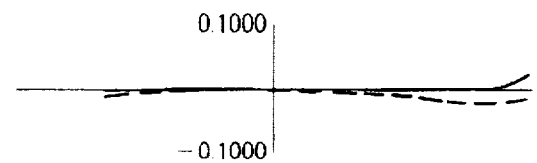
Fig. 27D  Y = 0  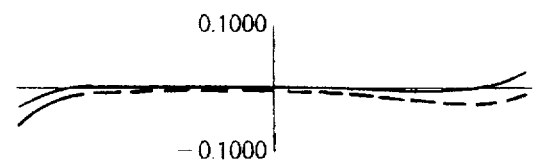
Fig. 27E  Y = −10.8  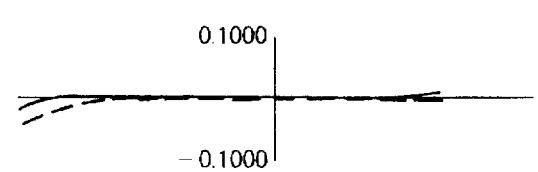
Fig. 27F  Y = −15.12  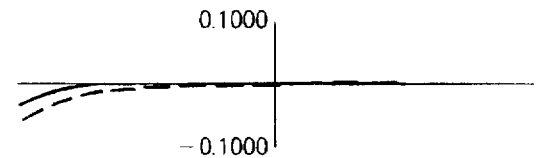
Fig. 27G  Y = −21.6  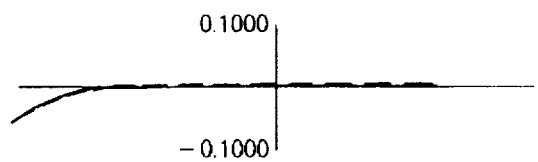

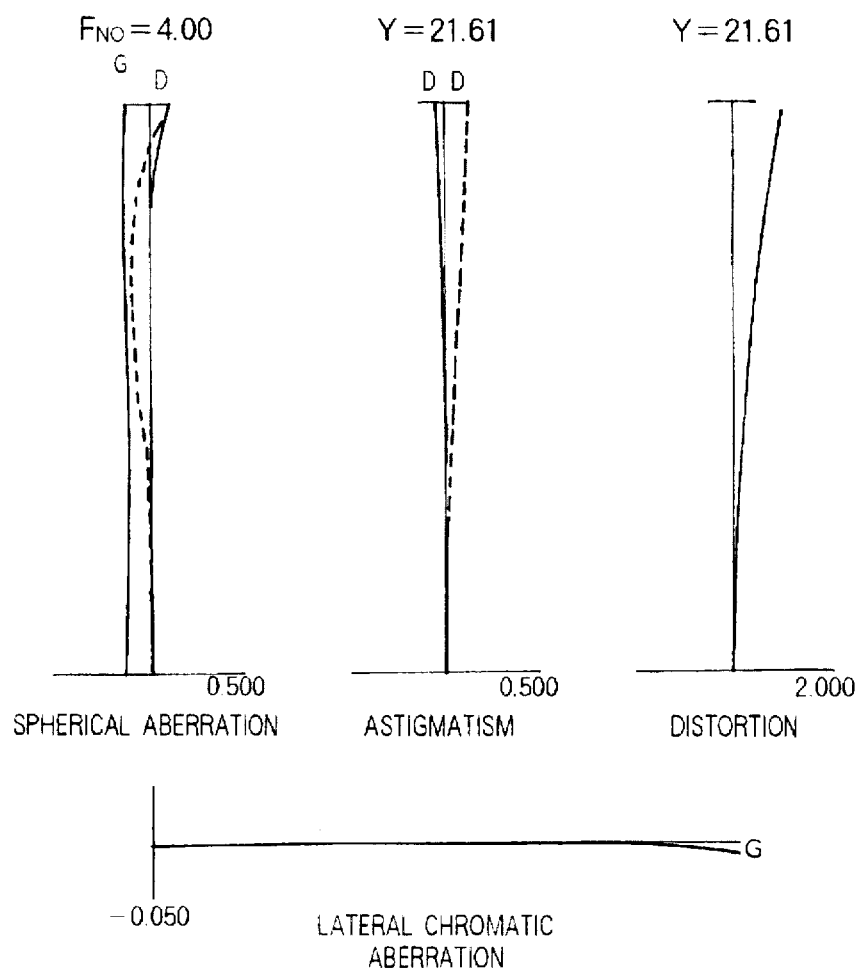

Fig. 30A  Y = +21.6  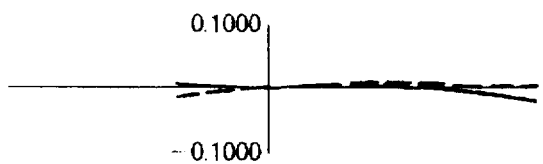
Fig. 30B  Y = +15.12  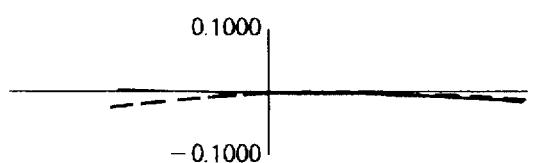
Fig. 30C  Y = +10.8  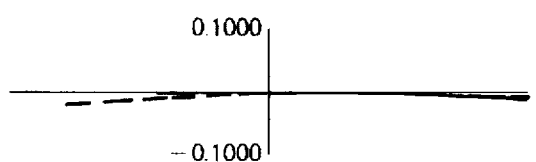
Fig. 30D  Y = 0  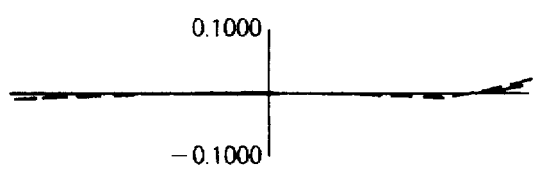
Fig. 30E  Y = −10.8  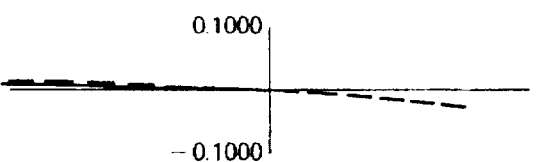
Fig. 30F  Y = −15.12  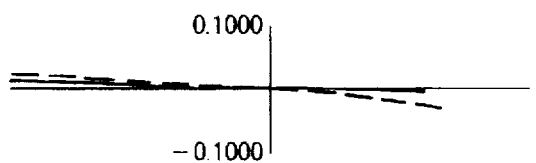
Fig. 30G  Y = −21.6  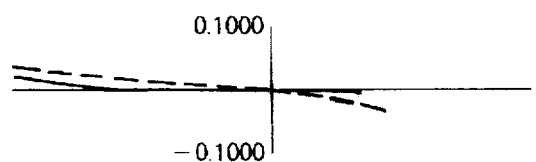

Fig. 32A  Fig. 32B  Fig. 32C
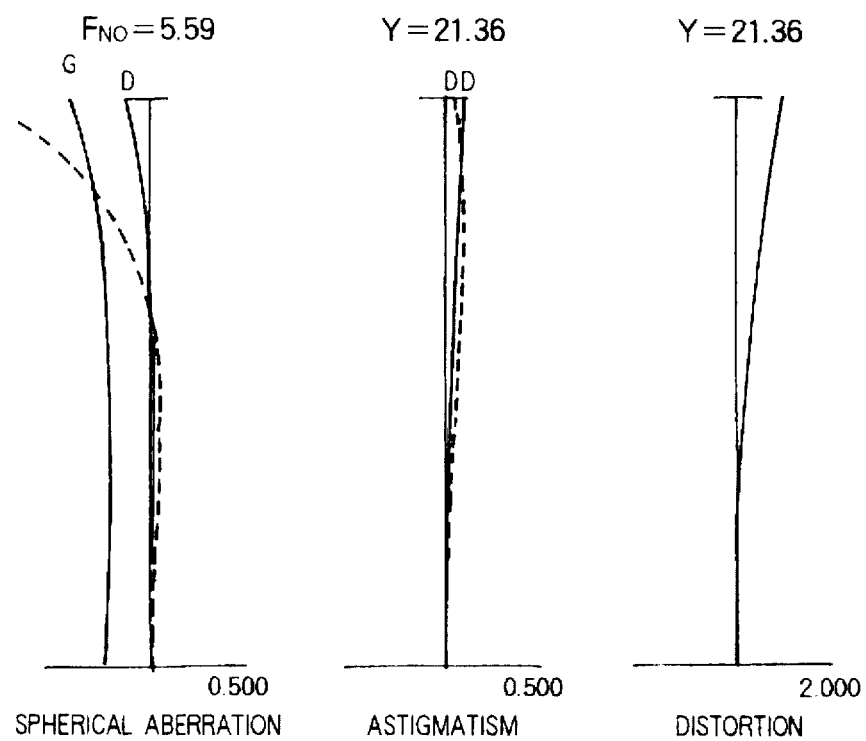
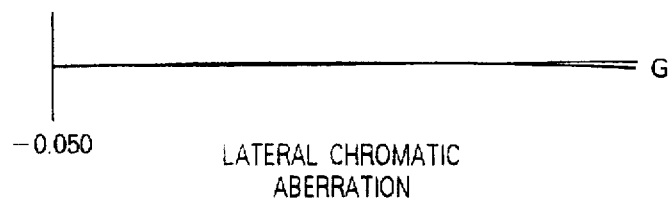
Fig. 32D

Fig. 33A  Y = +21.6  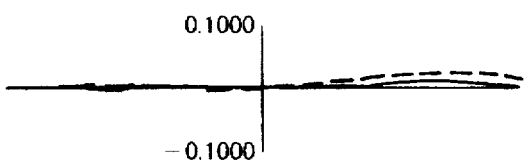
Fig. 33B  Y = +15.12  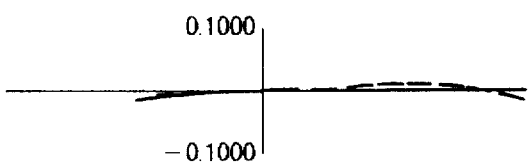
Fig. 33C  Y = +10.8  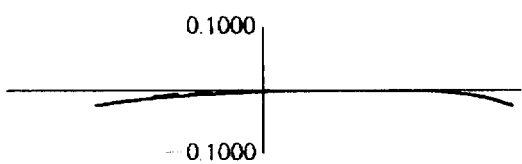
Fig. 33D  Y = 0  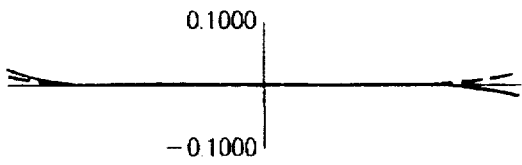
Fig. 33E  Y = −10.8  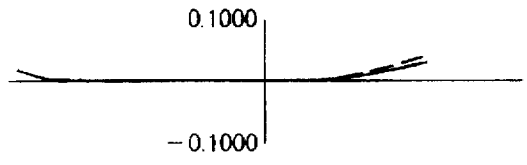
Fig. 33F  Y = −15.12  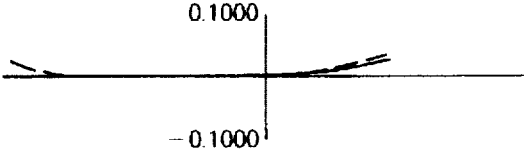
Fig. 33G  Y = −21.6  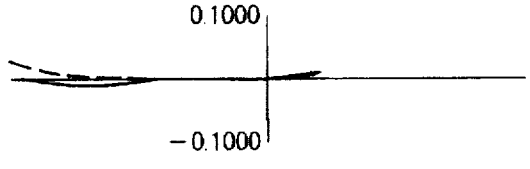

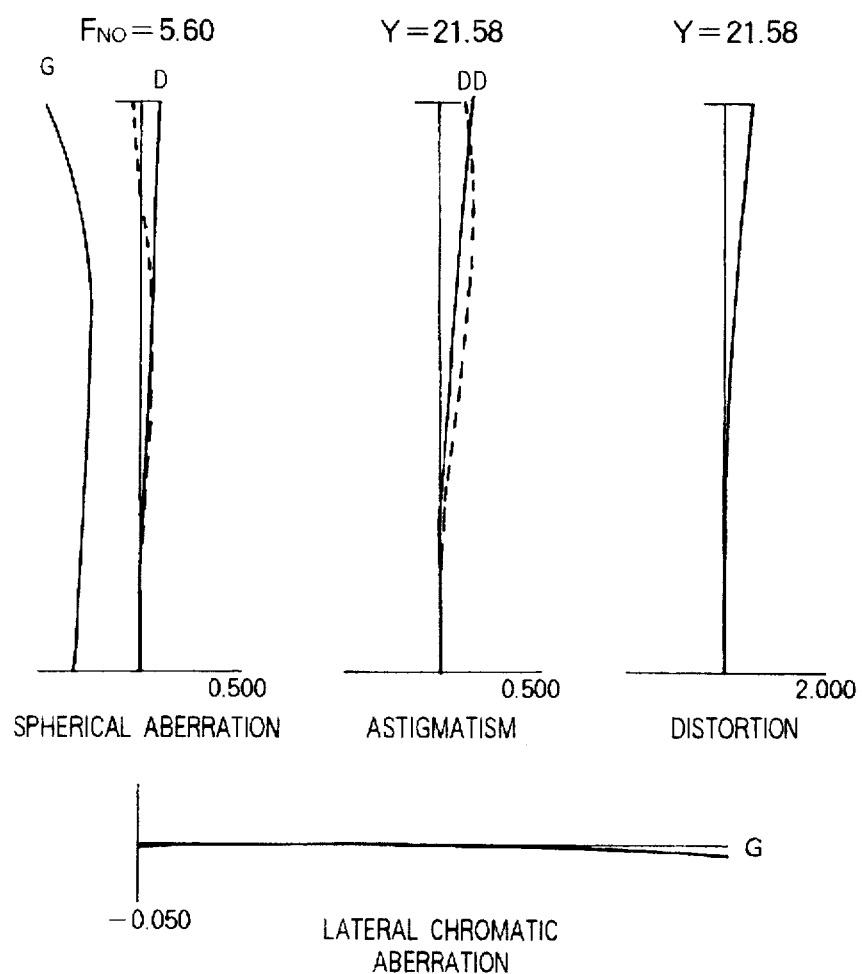

Fig. 36A    Y = +21.6    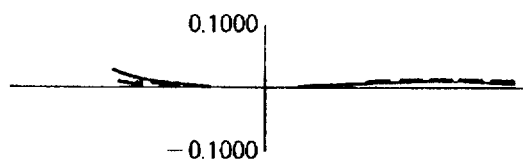
Fig. 36B    Y = +15.12   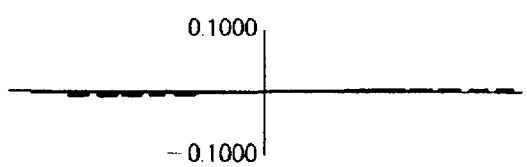
Fig. 36C    Y = +10.8    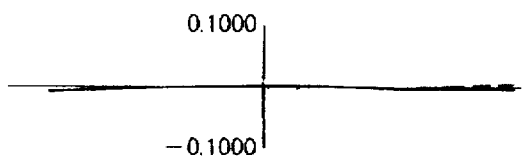
Fig. 36D    Y = 0        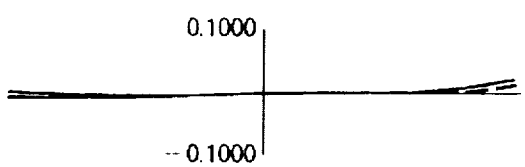
Fig. 36E    Y = −10.8    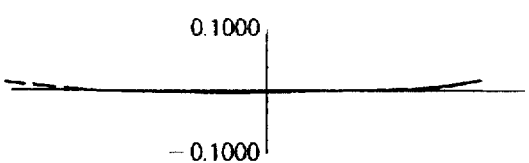
Fig. 36F    Y = −15.12   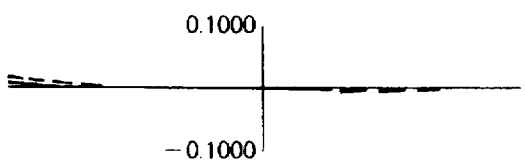
Fig. 36G    Y = −21.6    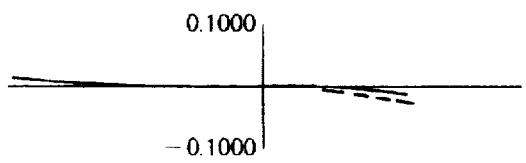

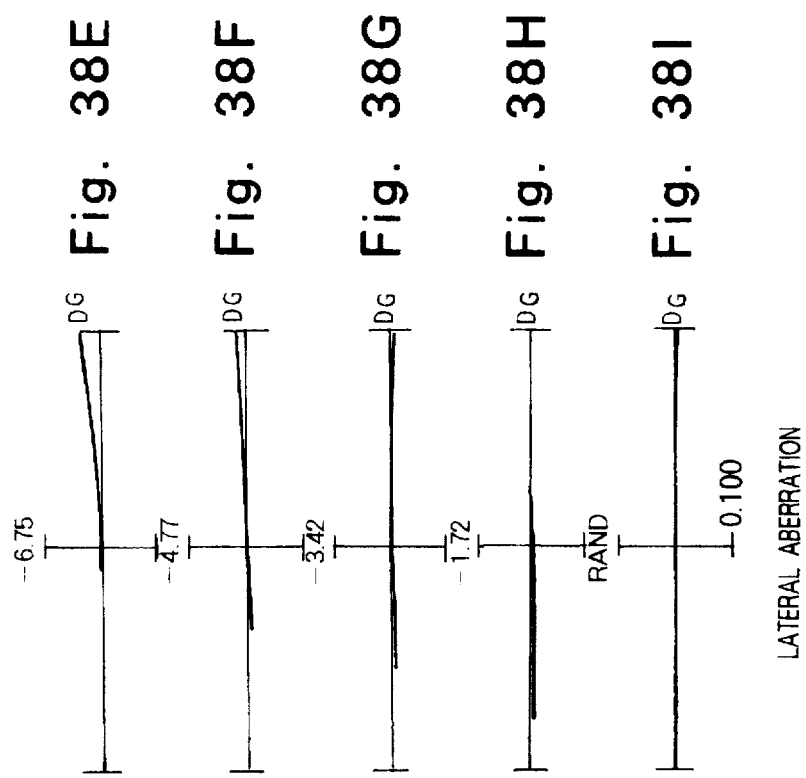
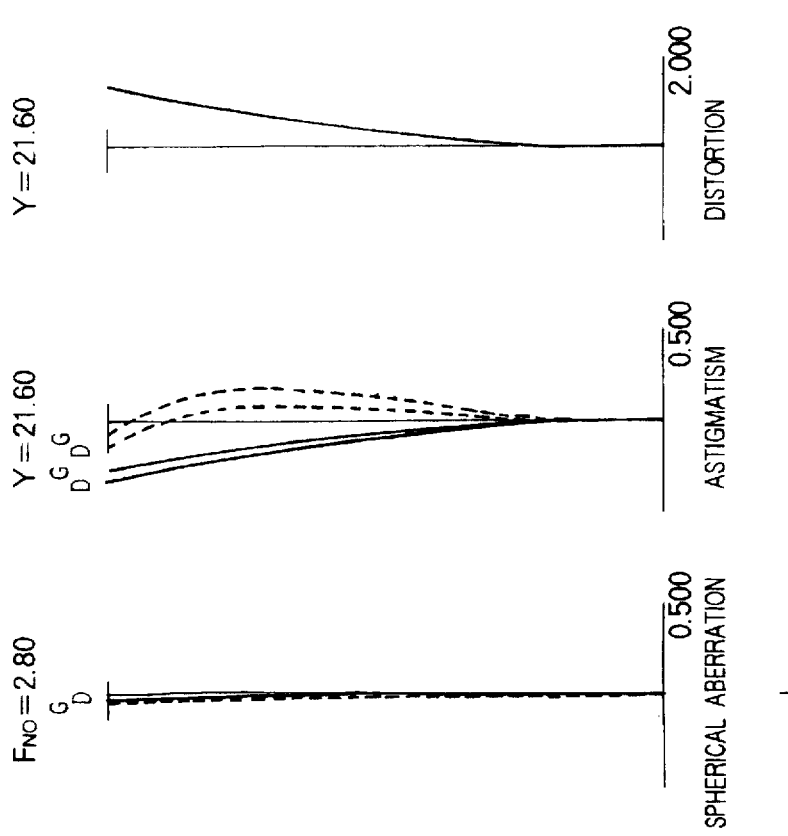
Fig. 38A  Fig. 38B  Fig. 38C
Fig. 38D
Fig. 38E
Fig. 38F
Fig. 38G
Fig. 38H
Fig. 38I

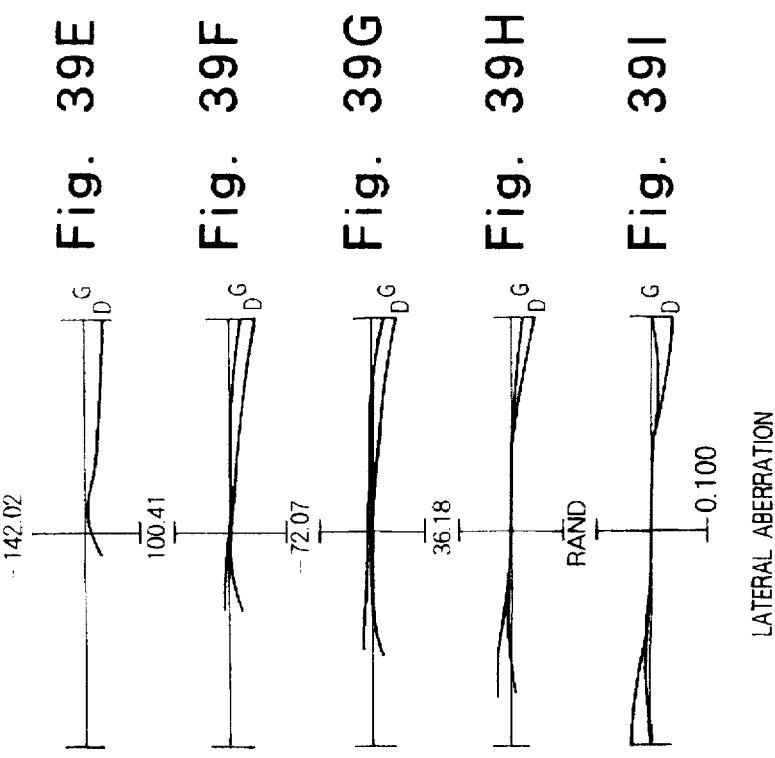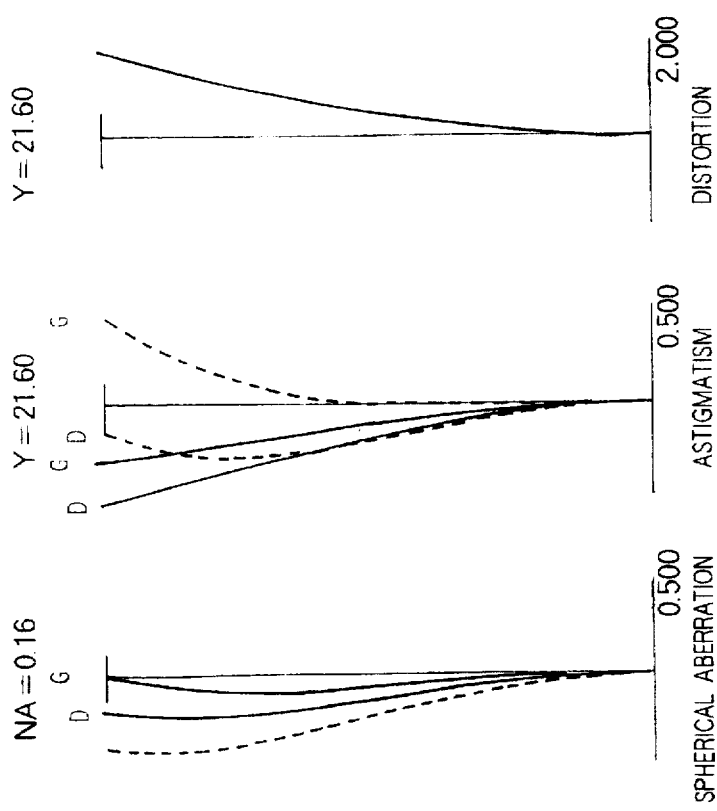

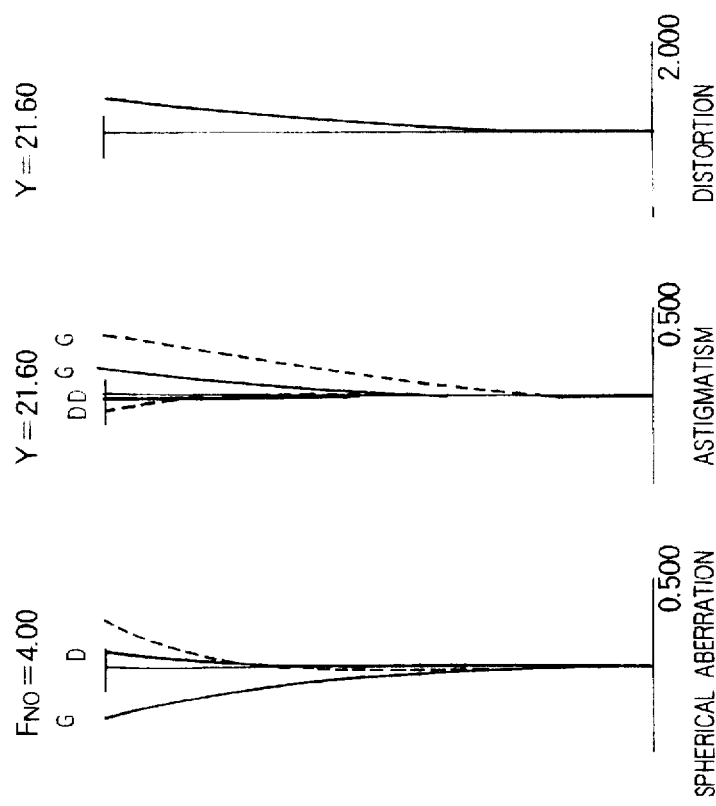

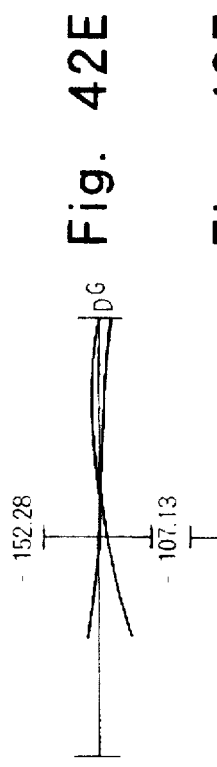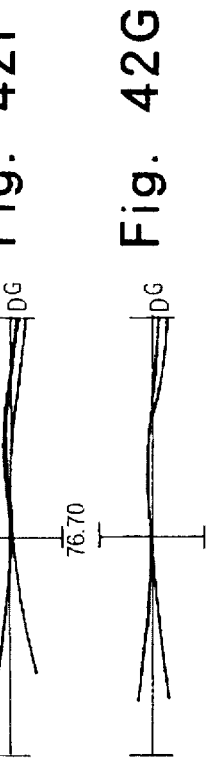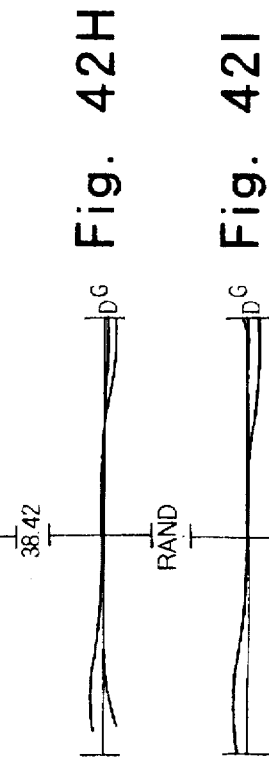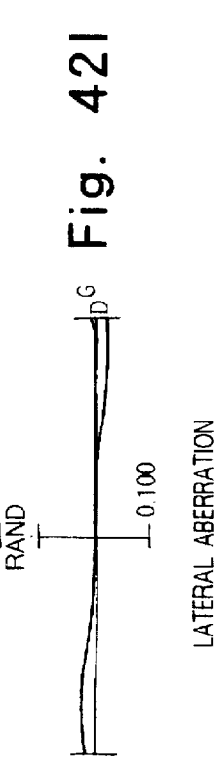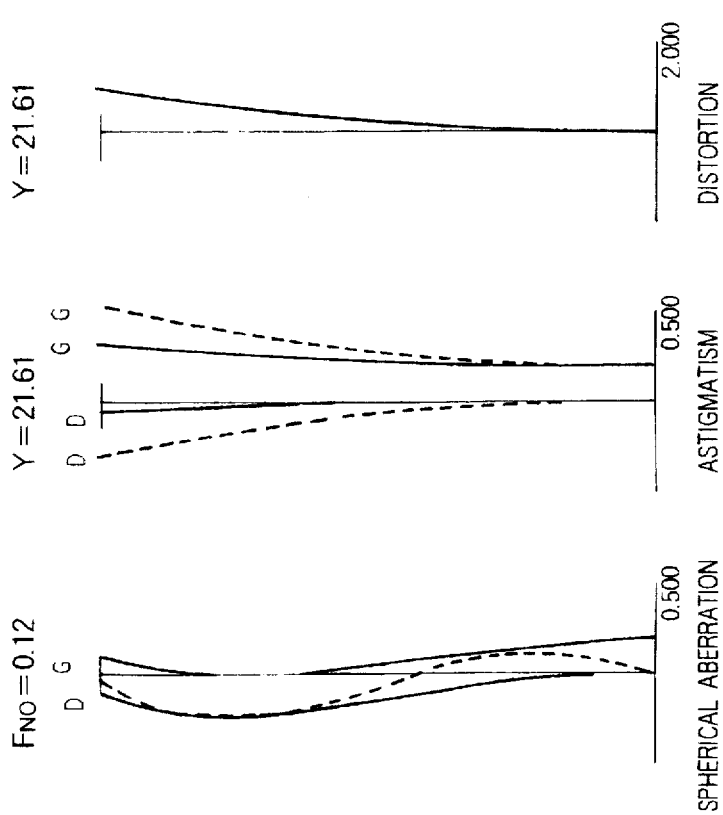

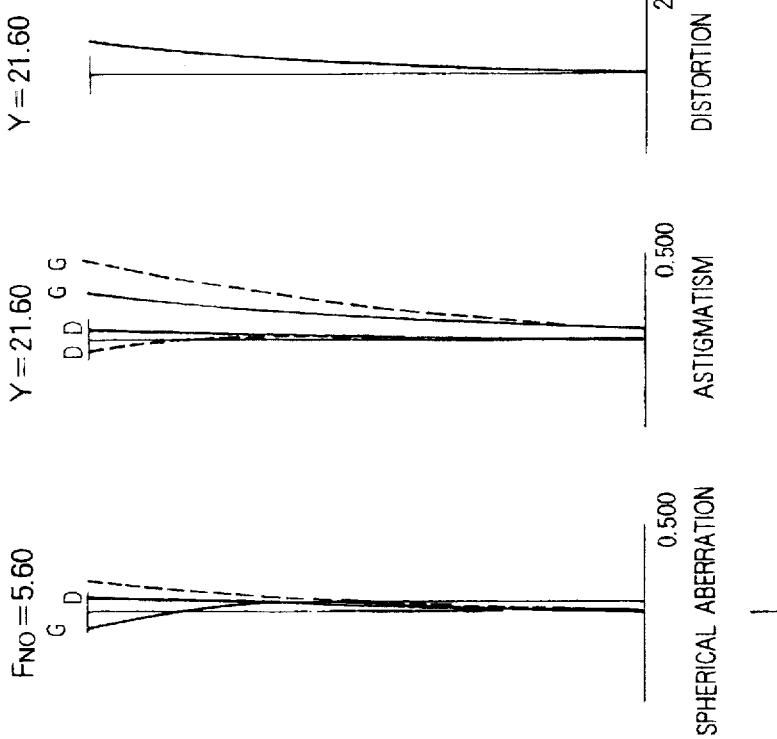

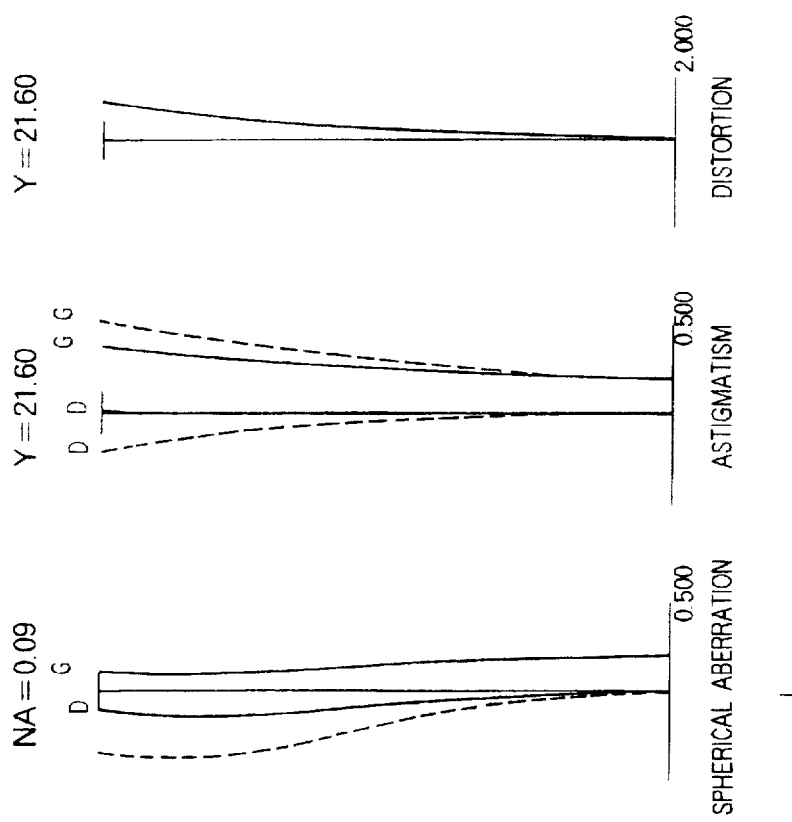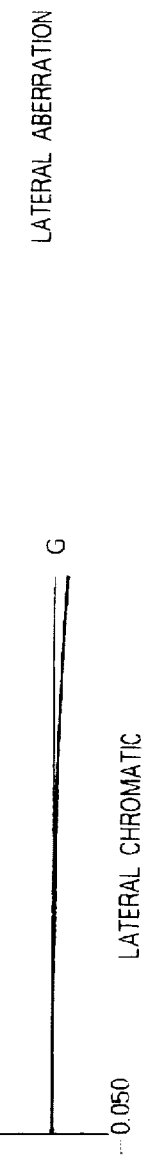

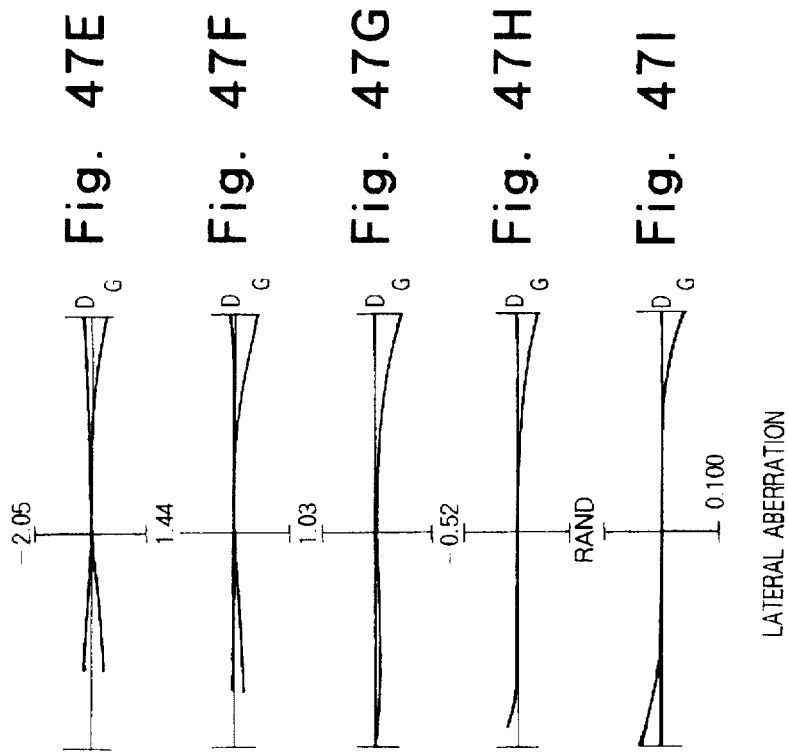
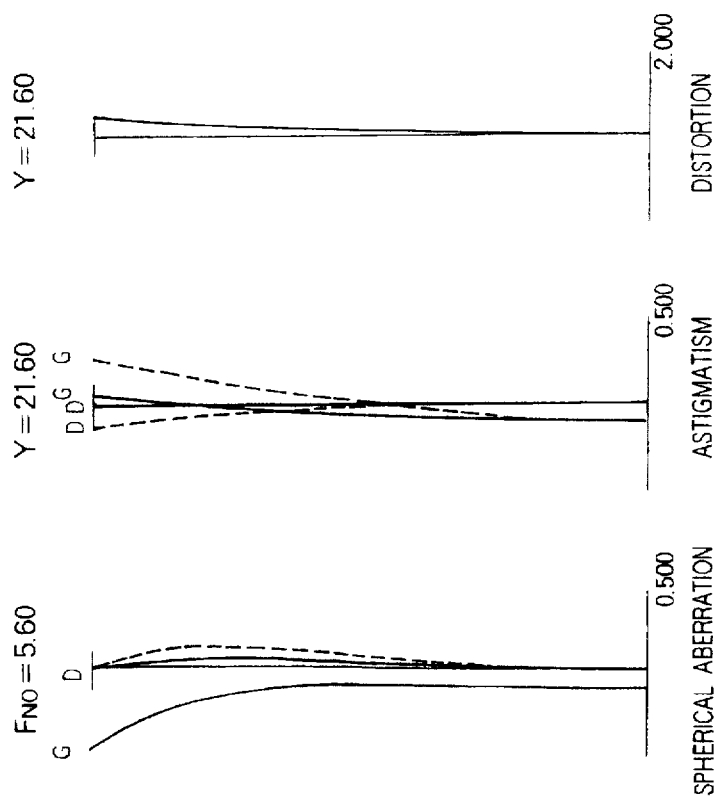

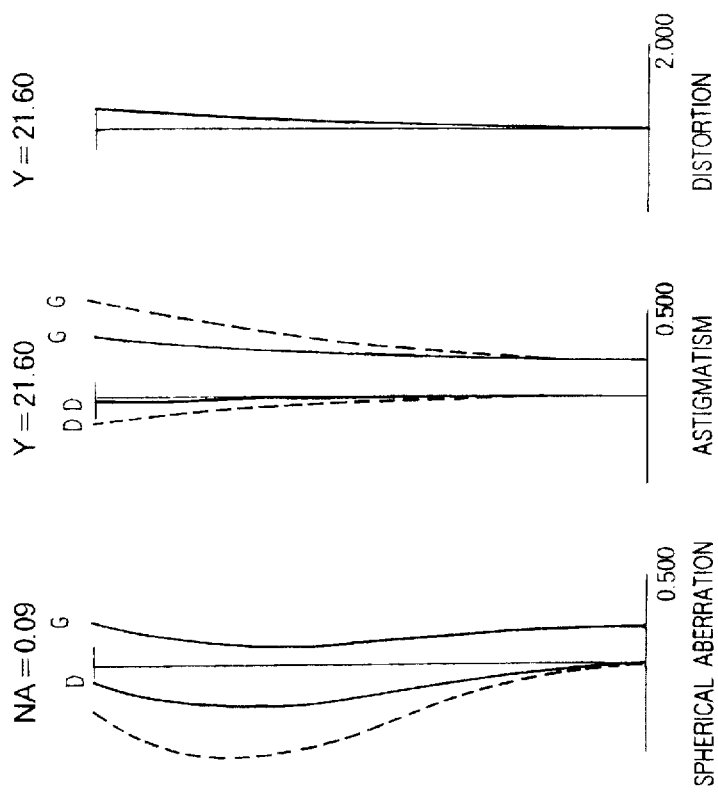

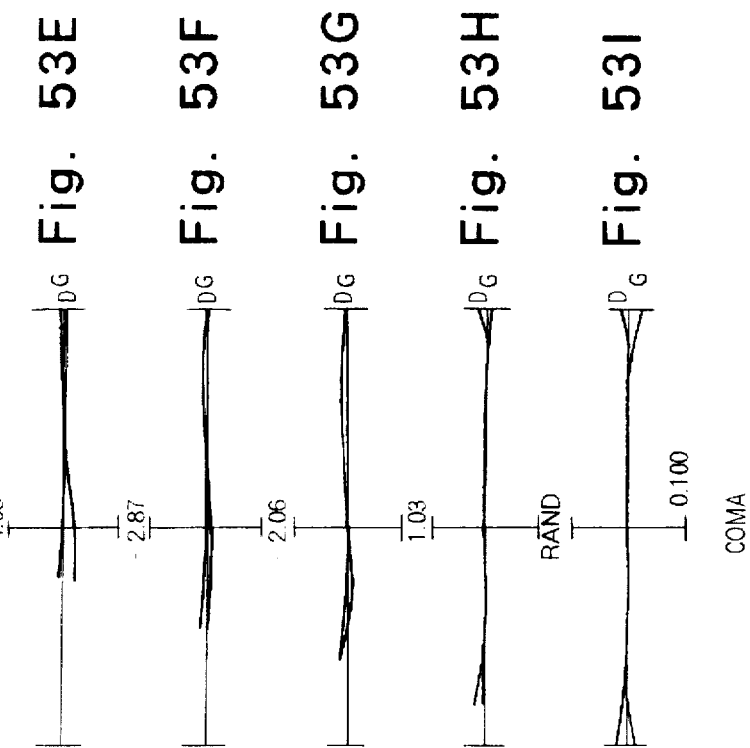
Fig. 53A  Fig. 53B  Fig. 53C
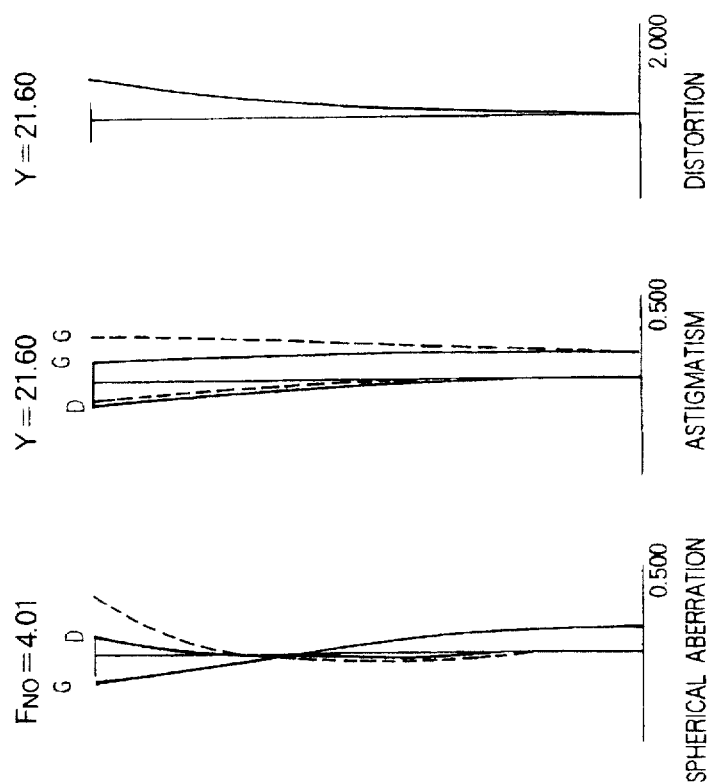
Fig. 53D
Fig. 53E
Fig. 53F
Fig. 53G
Fig. 53H
Fig. 53I

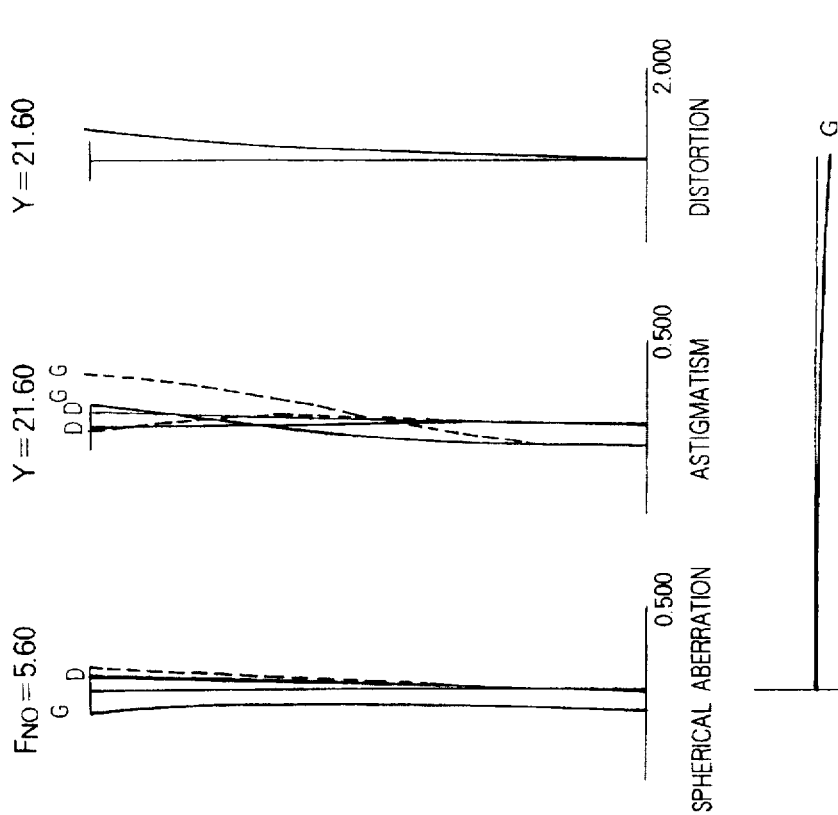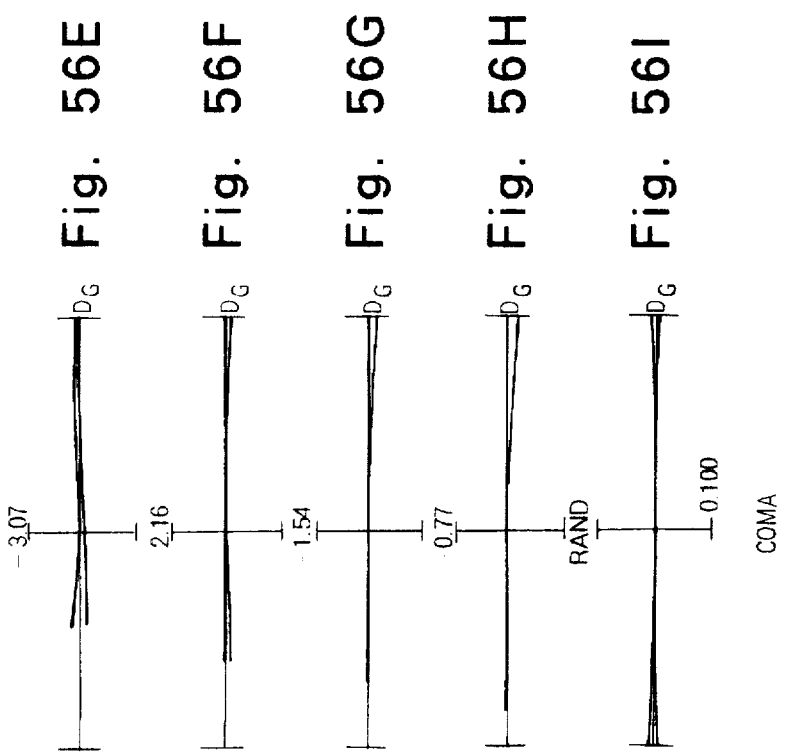

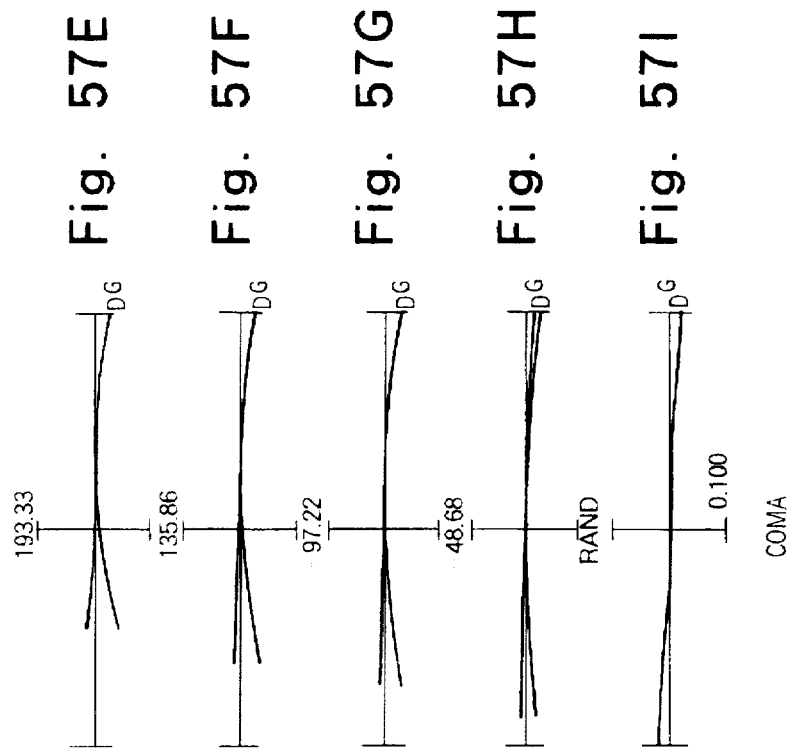
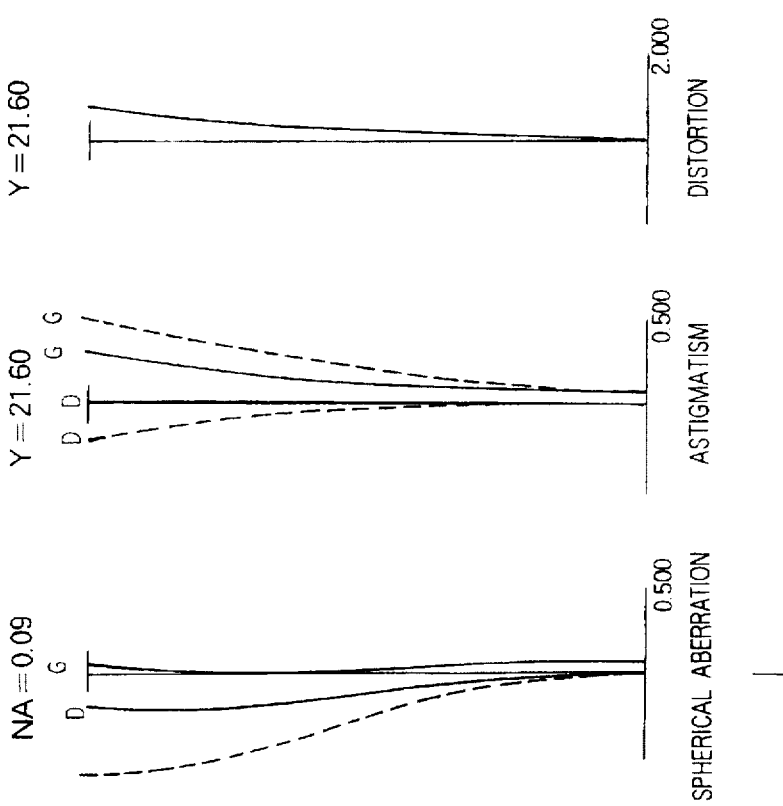

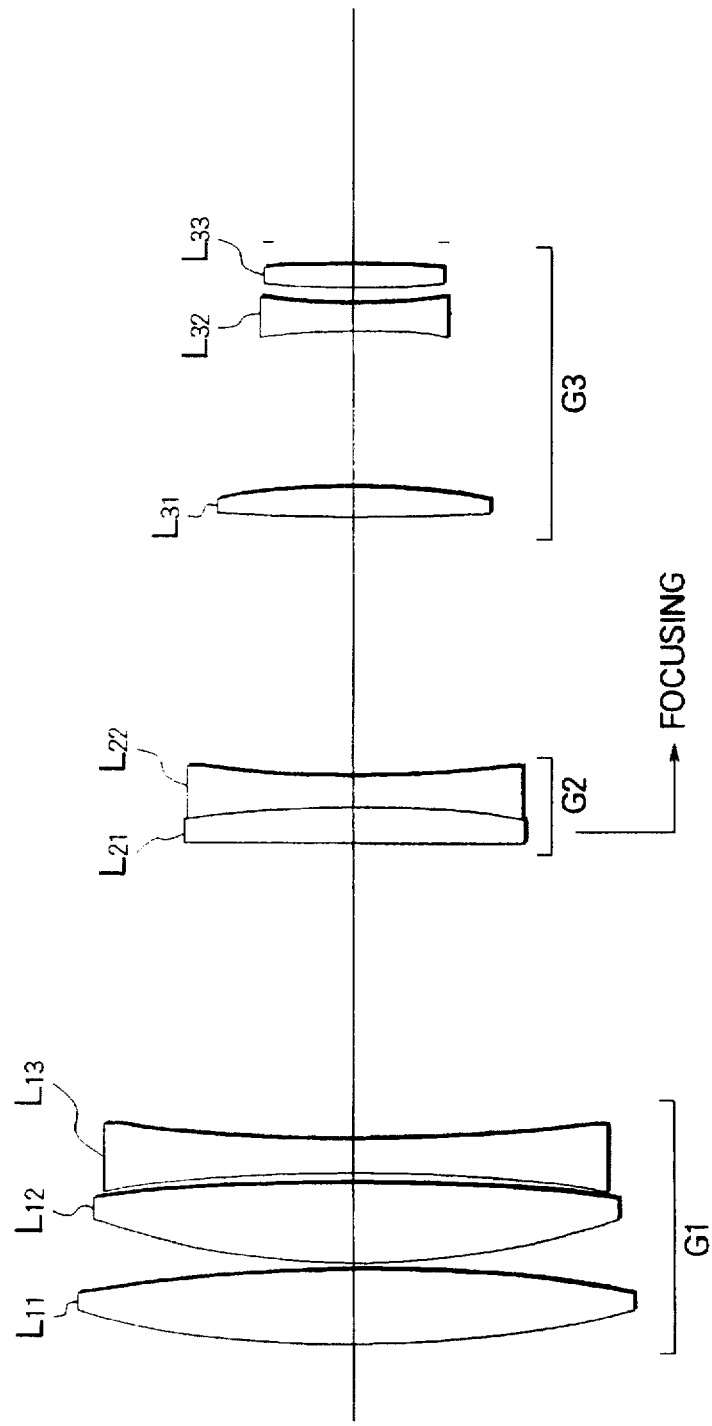

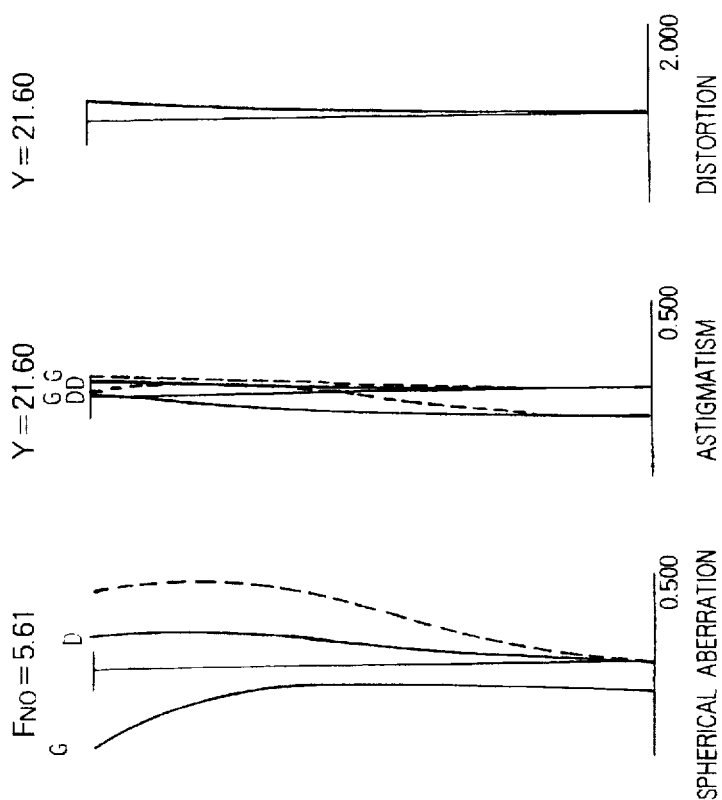

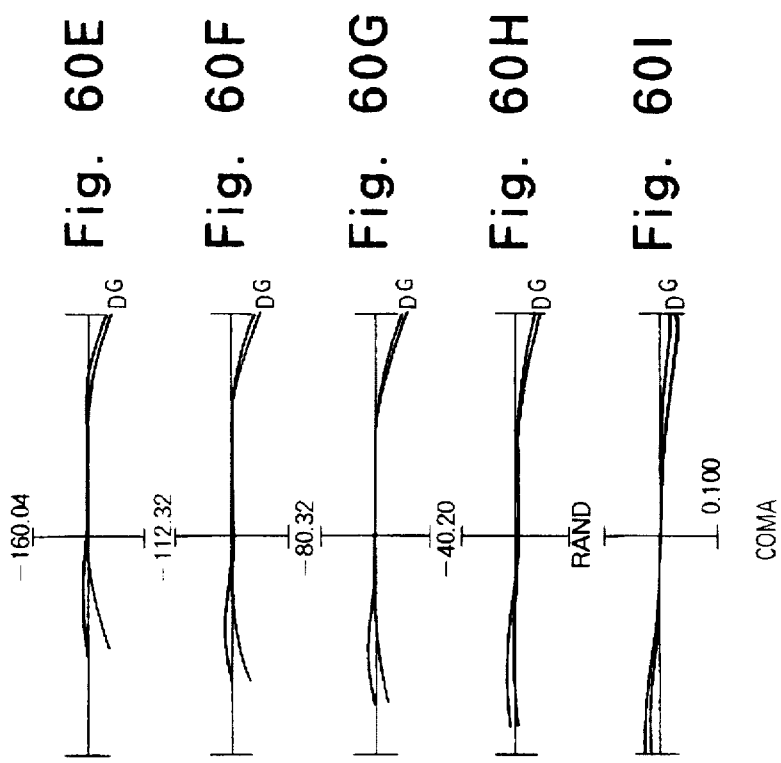
Fig. 60A  Fig. 60B  Fig. 60C
Fig. 60D
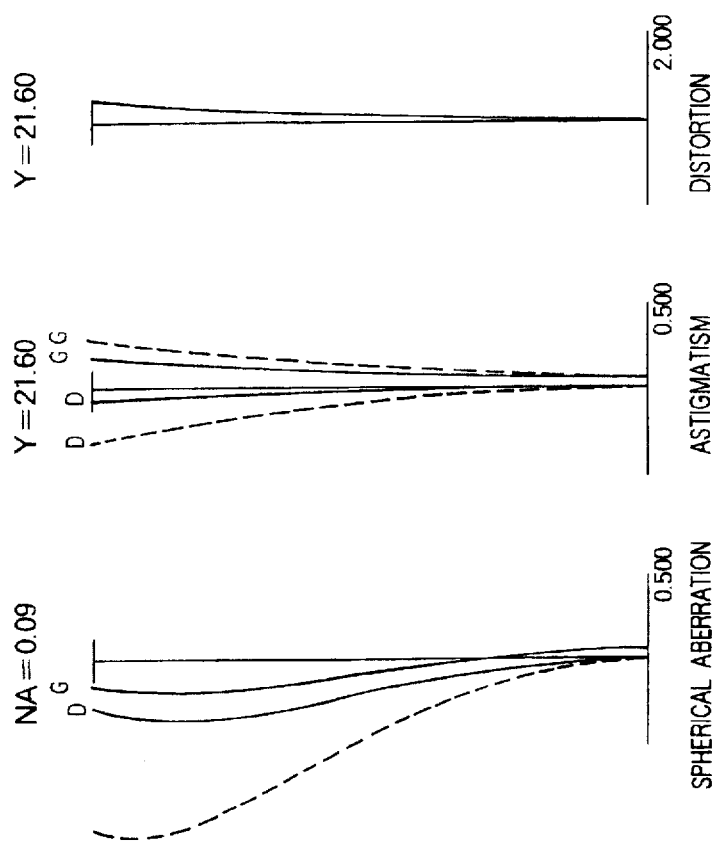
Fig. 60E
Fig. 60F
Fig. 60G
Fig. 60H
Fig. 60I Fig. 62A  Fig. 62B  Fig. 62C
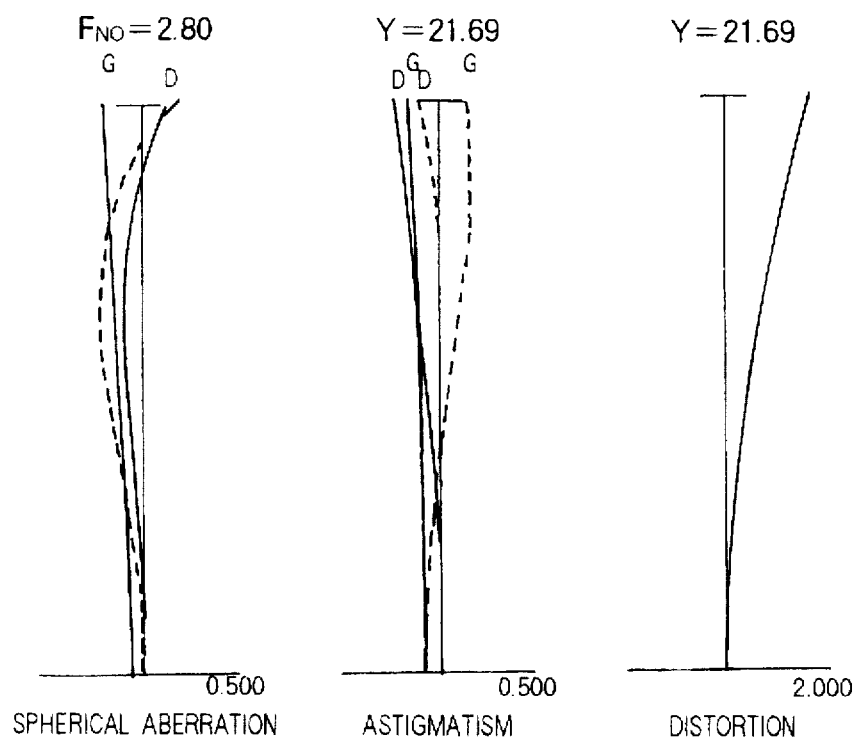
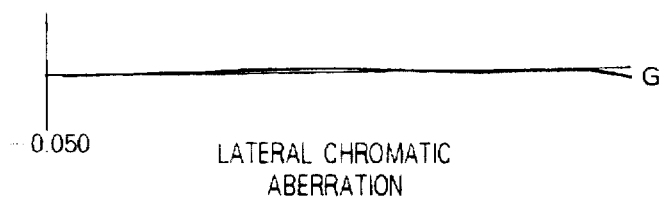
Fig. 62D

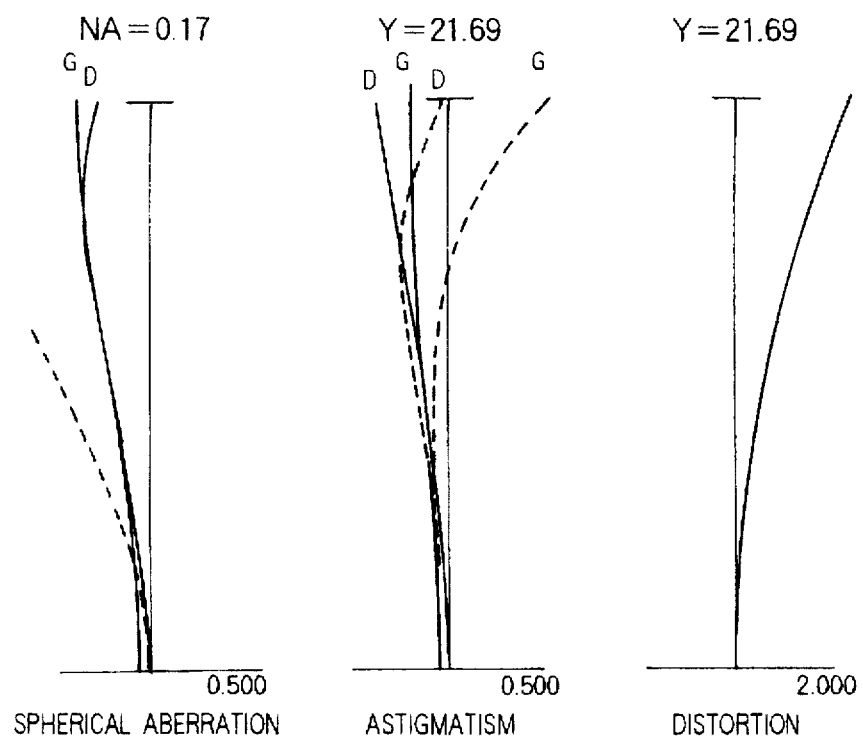
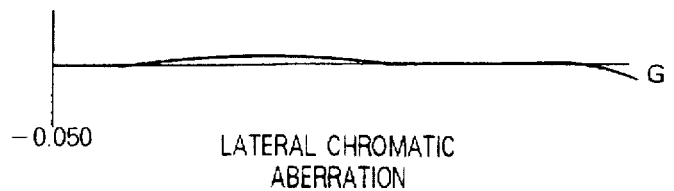

Fig. 65A  Fig. 65B  Fig. 65C
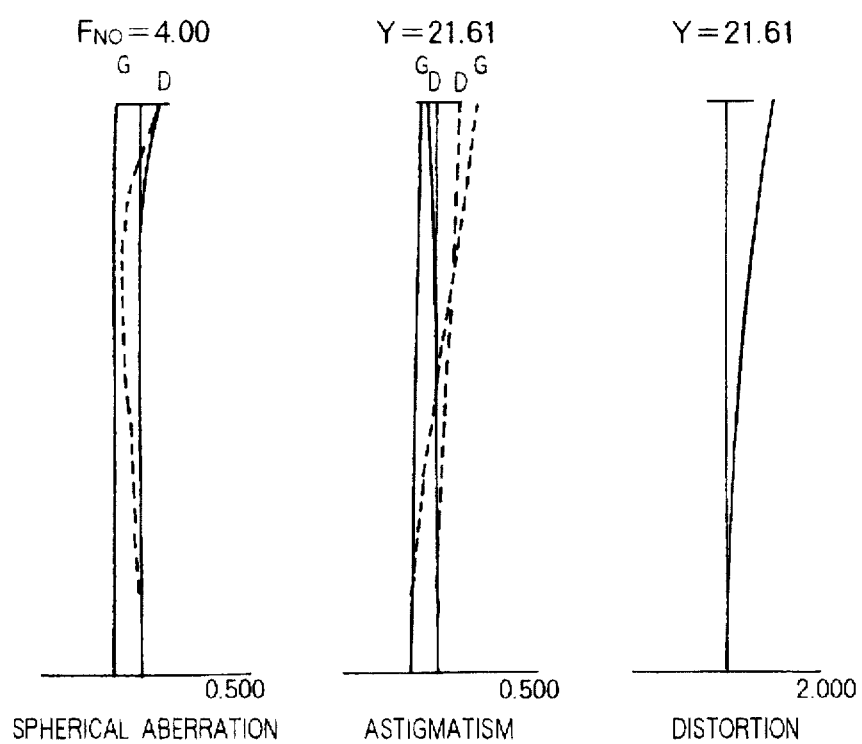
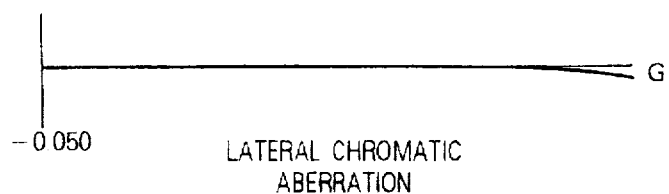
Fig. 65D

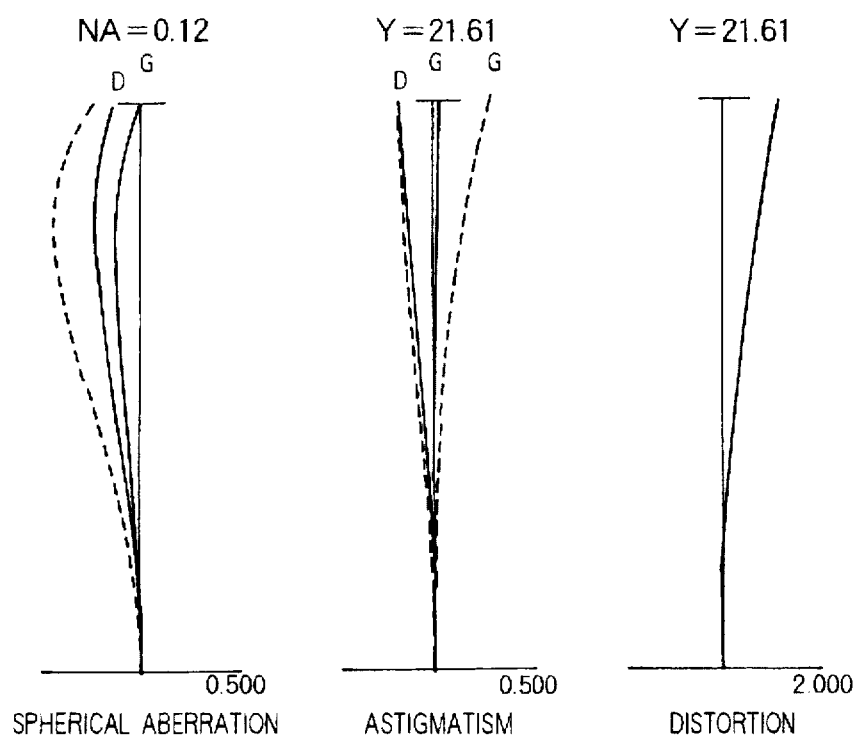

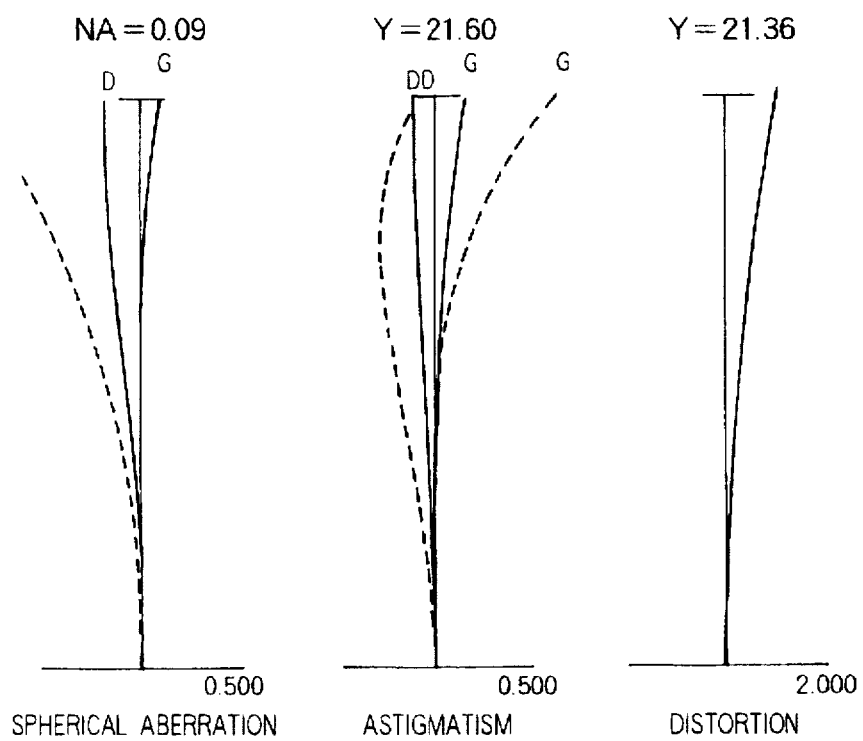

Fig. 71A  Fig. 71B  Fig. 71C
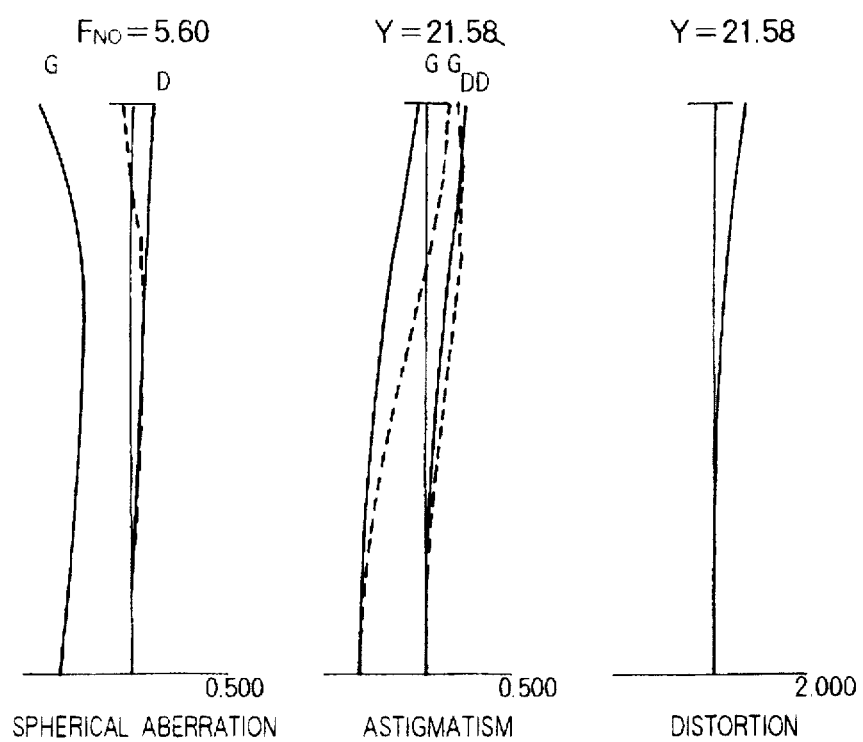
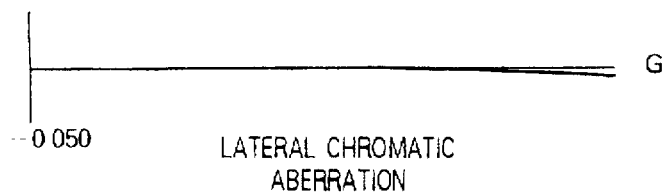
Fig. 71D

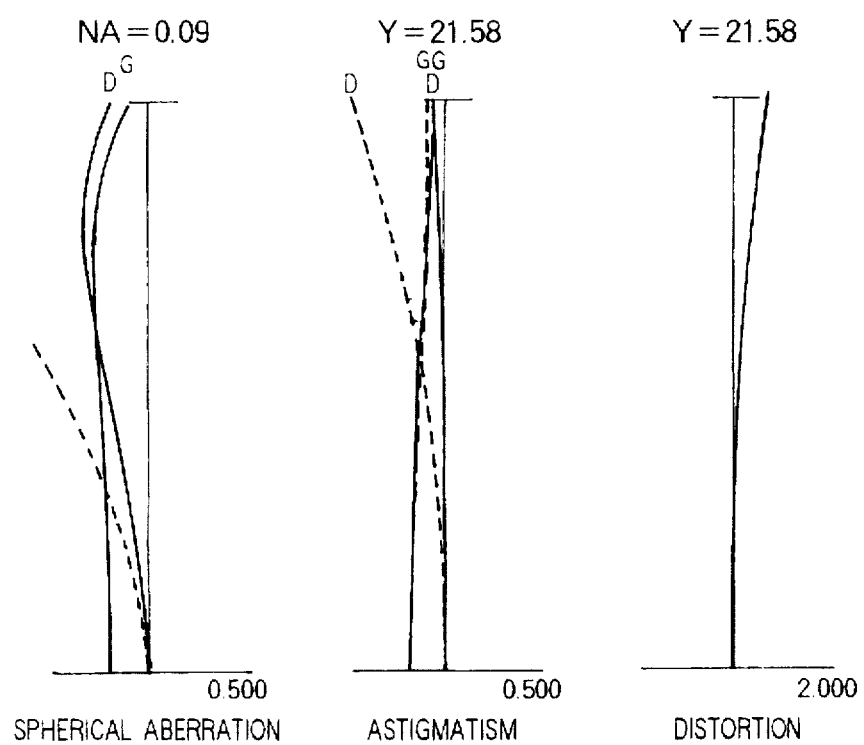

SHAKE-PREVENTING CORRECTION OPTICAL SYSTEM

BACKGROUND OF THE INVENTION

1. Field of the Invention

The present invention relates to a shake-preventing correction optical system and an inner focus type telephoto lens, and more particularly to a shake-preventing correction optical system capable of correcting changes of image position due to hand shakes in taking a picture through a taking optical system and correcting changes of image position occurring when a picture is taken at a vibrating place, for example in a car or a helicopter. Further, the invention concerns an inner focus type telephoto lens for autofocusing cameras such as single-lens reflex cameras or electronic still cameras.

2. Related Background Art

Conventional shake-preventing correction optical systems are arranged to correct changes of image position caused by fluctuations of an optical system due to hand shakes etc. by decentering a lens unit forming a part of the optical system in a direction nearly perpendicular to the optical axis, for example as disclosed in the bulletin of Japanese Laid-open Patent Application No. 2-234115.

In the present specification, "shake prevention" or "shake-preventing correction" means to correct changes of image position caused by hand shakes etc. by moving the lens unit in the direction nearly perpendicular to the optical axis. Further, the lens unit decentered in the direction nearly perpendicular to the optical axis will be referred to as a "decentering lens unit."

The conventional shake-preventing correction optical systems as described above, however, include an increased number of constituent lenses in the decentering lens unit in order to maintain good aberration characteristics upon decentration of decentering lens unit, that is, upon shake-preventing correction, which increases the size and weight of optical system. For example, supposing the decentering lens unit was composed of three or more lenses, there was a problem of a great load forced on an actuator for decentering the decentering lens unit.

Meanwhile, an example of the conventional inner focus type telephoto lenses is described in the bulletin of Japanese Laid-open Patent Application No. 4-294310. This inner focus type telephoto lens, however, needs a long distance for focusing movement of a focusing lens unit to move along the optical axis upon focusing. Additionally, because the focusing lens unit includes a lot of lens elements, the weight thereof is heavy.

As described above, the conventional inner focus type telephoto lenses had large amounts of focusing movement and the heavy focusing lens unit. This resulted in forcing a great load on a motor for autofocus drive of focusing lens unit and raising problems of increasing the size of a focusing drive mechanism and making it complex.

SUMMARY OF THE INVENTION

The present invention has been accomplished in view of the above-discussed problems, and an object of the present invention is to provide a shake-preventing correction optical system composed of a decreased number of constituent lens elements in the decentering lens unit and having good imaging performance upon shake-preventing correction.

Further, in view of the above-discussed problems, another object of the invention is to provide an inner focus type telephoto lens having a light-weight focusing lens unit, a small amount of focusing movement, and good imaging performance.

In a first aspect of the invention, a shake-preventing correction optical system comprises in order from the object side a lens unit Gf fixed in a direction perpendicular to the optical axis and a shake-preventing correction lens unit Gv comprising a decentering lens unit arranged as movable in a direction substantially perpendicular to the optical axis, wherein said lens unit Gf comprises a first lens unit G1 having a positive refractive power, a focusing lens unit G2 having a negative refractive power and arranged to move along the optical axis to effect focusing to a near object, and a lens unit G3a, and wherein said shake-preventing correction lens unit Gv comprises the decentering lens unit G3b having a positive lens and a negative lens.

In a second aspect of the invention, a shake-preventing correction optical system comprises in order from the object side a lens unit Gf fixed in a direction perpendicular to the optical axis and a shake-preventing correction lens unit Gv comprising a decentering lens unit arranged as movable in a direction substantially perpendicular to the optical axis, wherein said lens unit Gf comprises a first lens unit G1 having a positive refractive power, a focusing lens unit G2 having a negative refractive power and arranged to move along the optical axis to effect focusing to a near object, and a lens unit G3a, and wherein said shake-preventing correction lens unit Gv comprises the decentering lens unit G3b having an aspherical lens.

In a third aspect of the invention, a shake-preventing correction optical system comprises in order from the object side a lens unit Gf fixed in a direction perpendicular to the optical axis and a shake-preventing correction lens unit Gv comprising a decentering lens unit arranged as movable in a direction substantially perpendicular to the optical axis, wherein said lens unit Gf comprises a first lens unit G1 having a positive refractive power, a focusing lens unit G2 having a negative refractive power and arranged to move along the optical axis to effect focusing to a near object, and a lens unit G3a, and wherein said shake-preventing correction lens unit Gv comprises the decentering lens unit G3b having a GRIN lens having an axial index distribution in which the refractive index thereof changes from the object side toward the image side.

In a fourth aspect of the invention, an inner focus type telephoto lens comprises in order from the object side a first lens unit G1 having a positive refractive power, a second lens unit G2 having a negative refractive power, and a third lens unit G3 having a positive refractive power, wherein said first lens unit G1 and said second lens unit G2 compose a substantially afocal system and wherein said second lens unit G2 is arranged to move along the optical axis to effect focusing to a near object, wherein said first lens unit G1 has a positive lens component L11, a positive lens component L12, and a negative lens component L13 arranged in order from the object side, wherein said second lens unit G2 has a positive lens component L21 and a negative lens component L22 arranged in order from the object side, wherein said third lens unit G3 has a positive lens component L31, a negative lens component L32, a positive lens component L33, and a negative lens component L34 arranged in order from the object side, which satisfies the following conditions:

$0.40 < f1/F < 0.73$ $-1.90 < f1/f2 < -1.40$ $1.3 < Ra/Rb < 3.1$ where f1 is a focal length of said first lens unit G1, f2 is a focal length of said second lens unit G2, F is a focal length of the total lens system, Ra is a radius of curvature of an object-side surface of said positive lens component L11, and Rb is a radius of curvature of an object-side surface of said positive lens component L12.

In a fifth aspect of the invention, an inner focus type telephoto lens comprises in order from the object side a first lens unit G1 having a positive refractive power, a second lens unit G2 having a negative refractive power, and a third lens unit G3 having a positive refractive power, wherein said first lens unit GI and said second lens unit G2 compose a substantially afocal system and wherein said second lens unit G2 is arranged to move along the optical axis to effect focusing to a near object, wherein said first lens unit G1 has a positive lens component L11, a positive lens component L12, and a negative lens component L13 arranged in order from the object side, wherein said second lens unit G2 has at least one positive lens component and at least one negative lens component, wherein said third lens unit G3 has a positive lens component L31, a negative lens component L32, and a positive lens component L33 at least one surface of which is aspherical, arranged in order from the object side, which satisfies the following conditions:

$0.41 < f1/F < 0.76$ $-2.26 < f1/f2 < -0.97$ $1.3 < Ra/Rb < 2.0$ where f1 is a focal length of said first lens unit G1, f2 is a focal length of said second lens unit G2, F is a focal length of the total lens system, Ra is a radius of curvature of an object-side surface of said positive lens component L11, and Rb is a radius of curvature of an object-side surface of said positive lens component L12.

In a sixth aspect of the invention, an inner focus type telephoto lens comprises in order from the object side a first lens unit G1 having a positive refractive power, a second lens unit G2 having a negative refractive power, and a third lens unit G3 having a positive refractive power, wherein said first lens unit G1 and said second lens unit G2 compose a substantially afocal system and wherein said second lens unit G2 is arranged to move along the optical axis to effect focusing to a near object, wherein said first lens unit G1 has a positive lens component L11, a positive lens component L12, and a negative lens component L13 arranged in order from the object side, wherein said second lens unit G2 has at least one positive lens component and at least one negative lens component, wherein said third lens unit G3 has a positive lens component L31, a negative lens component L32, and a positive lens component L33 which is a GRIN lens having an axial index distribution in which the refractive index thereof changes from the object side toward the image side, arranged in order from the object side, which satisfies the following conditions:

$0.40 < f1/F < 0.82$ $-1.70 < f1/f2 < -0.76$ $1.35 < Ra/Rb < 2.25$ where f1 is a focal length of said first lens unit G1, f2 is a focal length of said second lens unit G2, F is a focal length of the total lens system, Ra is a radius of curvature of an object-side surface of said positive lens component L11, and Rb is a radius of curvature of an object-side surface of said positive lens component L12.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 2A–2D are aberration diagrams to show aberrations in an infinity focus state of the first embodiment;

FIGS. 3A–3G are aberration diagrams to show a comparison between lateral aberration before shake-preventing correction and lateral aberration upon shake-preventing correction in the infinity focus state of the first embodiment;

FIGS. 5A–5D are aberration diagrams to show aberrations in an infinity focus state of the second embodiment;

FIGS. 6A–6G are aberration diagrams to show a comparison between lateral aberration before shake-preventing correction and lateral aberration upon shake-preventing correction in the infinity focus state of the second embodiment;

FIGS. 8A–8D are aberration diagrams to show aberrations in an infinity focus state of the third embodiment;

FIGS. 9A–9G are aberration diagrams to show a comparison between lateral aberration before shake-preventing correction and lateral aberration upon shake-preventing correction in the infinity focus state of the third embodiment;

FIG. 10 is a drawing to show a lens layout of a shake-preventing correction optical system according to the fourth embodiment of the present invention;

FIGS. 11A-11D are aberration diagrams to show aberrations in an infinity focus state of the fourth embodiment;

FIGS. 12A-12G are aberration diagrams to show a comparison between lateral aberration before shake-preventing correction and lateral aberration upon shake-preventing correction in the infinity focus state of the fourth embodiment;

FIGS. 14A-14D are aberration diagrams to show aberrations in an infinity focus state of the fifth embodiment;

FIGS. 15A-15G are aberration diagrams to show a comparison between lateral aberration before shake-preventing correction and lateral aberration upon shake-preventing correction in the infinity focus state of the fifth embodiment;

FIGS. 17A-17D are aberration diagrams to show aberrations in an infinity focus state of the sixth embodiment;

FIGS. 18A-18G are aberration diagrams to show a comparison between lateral aberration before shake-preventing correction and lateral aberration upon shake-preventing correction in the infinity focus state of the sixth embodiment;

FIGS. 21A-21G are aberration diagrams to show a comparison between lateral aberration before shake-preventing correction and lateral aberration upon shake-preventing correction in the infinity focus state of the seventh embodiment;

FIGS. 23A-23D are aberration diagrams to show aberrations in an infinity focus state of the eighth embodiment;

FIGS. 24A-24G are aberration diagrams to show a comparison between lateral aberration before shake-preventing correction and lateral aberration upon shake-preventing correction in the infinity focus state of the eighth embodiment;

FIGS. 27A-27G are aberration diagrams to show a comparison between lateral aberration before shake-preventing correction and lateral aberration upon shake-preventing correction in the infinity focus state of the ninth embodiment;

FIGS. 29A-29D are aberration diagrams to show aberrations in an infinity focus state of the tenth embodiment;

FIGS. 30A-30G are aberration diagrams to show a comparison between lateral aberration before shake-preventing correction and lateral aberration upon shake-preventing correction in the infinity focus state of the tenth embodiment;

FIGS. 32A-32D are aberration diagrams to show aberrations in an infinity focus state of the eleventh embodiment;

FIGS. 33A-33G are aberration diagrams to show a comparison between lateral aberration before shake-preventing correction and lateral aberration upon shake-preventing correction in the infinity focus state of the eleventh embodiment;

FIGS. 35A-35D are aberration diagrams to show aberrations in an infinity focus state of the twelfth embodiment;

FIGS. 36A-36G are aberration diagrams to show a comparison between lateral aberration before shake-preventing correction and lateral aberration upon shake-preventing correction in the infinity focus state of the twelfth embodiment;

FIGS. 38A-38I are aberration diagrams to show aberrations in an infinity focus state of the thirteenth embodiment;

FIGS. 39A-39I are aberration diagrams to show aberrations in a near shooting state of the thirteenth embodiment;

FIGS. 41A-41I are aberration diagrams to show aberrations in an infinity focus state of the fourteenth embodiment;

FIGS. 42A-42I are aberration diagrams to show aberrations in a near shooting state of the fourteenth embodiment;

FIGS. 44A-44I are aberration diagrams to show aberrations in an infinity focus state of the fifteenth embodiment;

FIGS. 45A-45I are aberration diagrams to show aberrations in a near shooting state of the fifteenth embodiment;

FIGS. 47A-47I are aberration diagrams to show aberrations in an infinity focus state of the sixteenth embodiment;

FIGS. 48A-48I are aberration diagrams to show aberrations in a near shooting state of the sixteenth embodiment;

FIGS. 53A-53I are aberration diagrams to show aberrations in an infinity focus state of the eighteenth embodiment;

FIGS. 56A–56I are aberration diagrams to show aberrations in an infinity focus state of the nineteenth embodiment;

FIGS. 57A–57I are aberration diagrams to show aberrations in a near shooting state of the nineteenth embodiment;

FIG. 58 is a drawing to show a lens layout of a telephoto lens according to the twentieth embodiment of the present invention;

FIGS. 59A–59I are aberration diagrams to show aberrations in an infinity focus state of the twentieth embodiment;

FIGS. 60A–60I are aberration diagrams to show aberrations in a near shooting state of the twentieth embodiment;

FIGS. 62A–62D are aberration diagrams to show aberrations in an infinity focus state of the twenty first embodiment;

FIGS. 63A–63D are aberration diagrams to show aberrations in a near shooting state of the twenty first embodiment;

FIGS. 65A–65D are aberration diagrams to show aberrations in an infinity focus state of the twenty second embodiment;

FIGS. 66A–66D are aberration diagrams to show aberrations in a near shooting state of the twenty second embodiment;

FIGS. 69A–69D are aberration diagrams to show aberrations in a near shooting state of the twenty third embodiment;

FIGS. 71A–71D are aberration diagrams to show aberrations in an infinity focus state of the twenty fourth embodiment; and FIGS. 72A–72D are aberration diagrams to show aberrations in a near shooting state of the twenty fourth embodiment.

DESCRIPTION OF THE PREFERRED EMBODIMENTS

Figure 1:
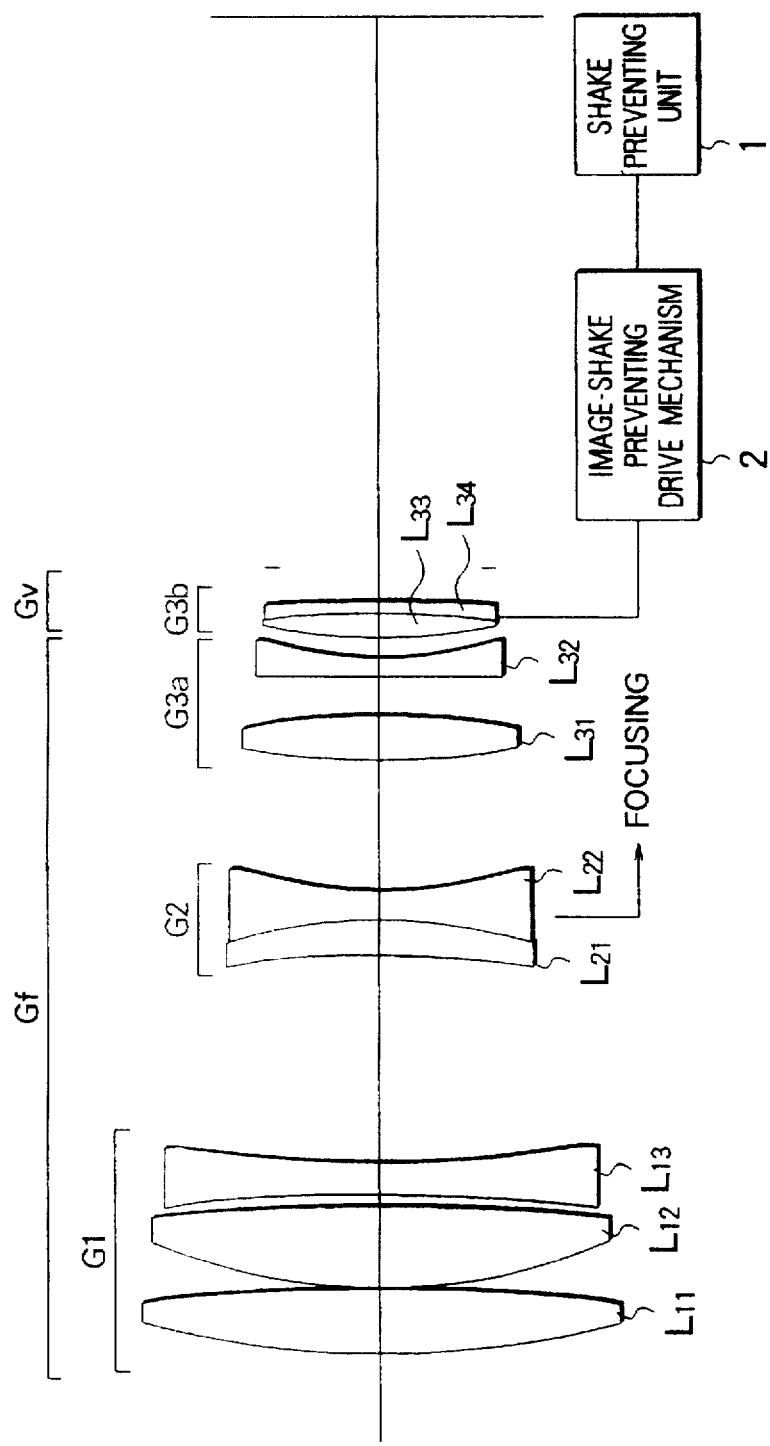
FIG. 1 is a drawing to show a lens layout of a shake-preventing correction optical system according to the first embodiment of the present invention.

In the present invention, a shake-preventing correction optical system comprises in order from the object side a lens unit Gf fixed in a direction perpendicular to the optical axis, and a shake-preventing correction lens unit Gv having a decentering lens unit arranged as movable in a direction nearly perpendicular to the optical axis, wherein the above lens unit Gf comprises a first lens unit G1 having a positive refractive power, a focusing lens unit G2 having a negative refractive power and arranged to move along the optical axis to effect focusing to a near object, and a lens unit G3a, and wherein the above shake-preventing correction lens unit Gv comprises the decentering lens unit G3b having a positive lens and a negative lens. When ff is a focal length of the above lens unit Gf and f is a focal length of the entire optical system, they satisfy the following condition:

$$2.1 < |ff/f|.$$

In a preferred embodiment of the present invention, the above decentering lens unit G3b is more preferably a cemented lens of a positive lens and a negative lens arranged in order from the object side.

For normal inner focus type telephoto lenses without a decentering mechanism (or shake-preventing correction mechanism), general refractive-power (power) arrangement is such that a lens is composed of a first lens unit of a positive refractive power, a second lens unit of a negative refractive power for focusing, and a third lens unit of a positive refractive power, from the viewpoints of decreasing the total length of lens and simplifying the structure of the focusing mechanism.

For the telephoto lenses of this type, it is economically more advantageous because of smaller numbers of constituent lens elements in the respective lens units to decrease aberration of the entire lens system by arranging the system so as to cancel aberrations appearing in the respective lens units with each other rather than to effect individual aberration corrections in the respective lens units.

When a shake-preventing correction optical system is constructed by adding a decentering mechanism to a normal inner focus type telephoto lens, it is suitable to choose either the second lens unit or the third lens unit having a relatively small diameter as the decentering lens unit in order to decrease the load on the actuator as driving means for the decentering mechanism. Considering aberration after decentration or aberration upon shake-preventing correction, a preferred arrangement is that aberration is corrected for in the decentering lens unit and the decentering lens unit is located on the image side of an afocal system.

Incidentally, from the viewpoints of decreasing the total length of lens and aberration correction, the inner focus type telephoto lens without the decentering mechanism is arranged so that the first lens unit and the second lens unit have a composite focal length positively or negatively long, thus composing substantially an afocal system. Therefore, to select the third lens unit as a decentering lens system is most suitable in order to suppress aberration change due to decentration.

However, if the third lens unit were determined as the decentering lens unit and if aberration correction relied only on the third lens unit of the decentering lens unit in order to effect aberration correction after decentration, the aberration balance would become off from the mutually canceling state of the lens units in the total lens system.

Then, the conventional shake-preventing correction optical system, in which the decentering mechanism is added to the normal inner focus type telephoto lens, is arranged for good correction for aberrations of the total lens system in such a manner that the first lens unit and the second lens unit each are individually corrected for aberration as well as the third lens unit of the decentering lens unit, thereby effecting aberration correction of the total lens system both before and after decentration.

In detail, the conventional optical system obtained by changing the inner focus type telephoto lens into the shake-preventing correction optical system with the decentering mechanism is composed of three units, the first lens unit of a positive refractive power, the second lens unit of a negative refractive power for focusing, and the third lens unit of a positive refractive power as being the decentering lens unit.

This arrangement requires individual aberration corrections of the respective lens units including the third lens unit of the decentering lens unit in order to correct aberrations after decentration well. This increased the number of lens elements in the third lens unit of the decentering lens unit so as to increase the size and weight thereof, resulting in increasing the load on the actuator for decentering the decentering lens unit.

Here, let us consider the decentering lens unit.

First of all, a ray incident to a most-object-side lens surface of optical system in parallel with the optical axis will be called as a Rand ray. Considering aberration of Rand ray after decentration, it is desired that the decentering lens unit take a minimum angle of deflection with respect to the Rand rays. On taking the minimum angle of deflection, a most suitable arrangement is that the Rand rays are substantially parallel with the optical axis, in view of aberration change after decentration.

Further, it is preferred that the Rand rays be parallel with the optical axis when entering the decentering lens unit even if they are incident at any height to the most-object-side lens surface of optical system. Thus, in order to make the Rand rays entering the decentering lens unit substantially parallel with the optical axis, it is most suitable to arrange all lens units on the object side with respect to the decentering lens unit, i.e., a front optical system as a substantially afocal system.

Thus, the shake-preventing correction optical system of the present invention is a shake-preventing correction optical system comprising in order from the object side the lens unit Gf fixed in a direction perpendicular to the optical axis, and the shake-preventing correction lens unit Gv comprising the decentering lens unit arranged as movable in a direction substantially perpendicular to the optical axis, wherein the lens unit Gf comprises a first lens unit G1 having a positive refractive power, a focusing lens unit G2 having a negative refractive power and arranged to move along the optical axis to effect focusing to a near object, and a lens unit G3a, wherein the shake-preventing correction lens unit Gv comprises the decentering lens unit G3b having a positive lens and a negative lens, and wherein the lens unit Gf is a substantially afocal system.

Namely, the present invention employs the following arrangement in order to decrease the number of lenses in the decentering lens unit.

First, the third lens unit is separated into the decentering lens unit G3b less in aberration change due to decentration, and the correction lens unit G3a for correcting normal aberration caused because the decentering lens unit G3b is arranged so as to decrease the aberration change due to decentration.

Further, as described previously, it is desired that the Rand rays be substantially parallel to the optical axis when entering the decentering lens unit G3b even though they are incident at any height to the most-object-side lens surface of optical system. For this, the correction lens unit G3a is placed on the object side of the decentering lens unit G3b, and the lens unit Gf, which is the front optical system composed of the first lens unit G1 of the positive refractive power, the focusing lens unit G2 of the negative refractive power, and the correction lens unit G3a, is arranged to be a substantially afocal system.

In more detail, the present invention includes satisfying the following condition of Equation (1) in order to arrange the lens unit Gf as a substantially afocal system.

$$2.1 < |ff/fl| \tag{1}$$

In the above equation,
 ff: the focal length of the lens unit Gf,
 f: the focal length of the total optical system.

The condition of Equation (1) defines an appropriate range of a ratio of the focal length ff of the lens unit Gf to the focal length f of the total optical system, which is a condition for arranging the front lens unit Gf as a substantially afocal system.

Below the lower limit of the condition of Equation (1), the focal length of the front lens unit Gf becomes not large enough, which causes the Rand rays not to be substantially parallel with the optical axis when entering the decentering lens unit G3b.

The present invention is based on such a concept that it is fine as long as aberration correction is effected on the whole of optical system in either occasion of infinity shooting and near-range shooting or after decentration. Thus, suitable aberration correction is such that the front lens Gf is arranged as a lens unit having no aberration change even upon near-range shooting in focusing and that the shake-preventing correction lens unit Gv is arranged as a lens unit having no aberration change in decentration. As a result, a need is to cancel aberrations other than the aberration change due to focusing and the aberration change due to decentration with each other between the front lens unit Gf and the shake-preventing correction lens unit Gv. This obviates a need to perform individual perfect aberration corrections in the respective lens units of the first lens unit G1, the second lens unit G2, and the third lens unit, as required in the conventional system, and therefore, the number of lenses in each lens unit, especially the number of constituent lenses of the decentering lens unit G3b, can be decreased.

Further, if achromatization is not sufficient for the decentering lens unit G3b so as to leave chromatic aberration, chromatic aberration appears after decentration as if rays are bent by a prism.

Accordingly, also taking degradation of the resolving power due to chromatic aberration into consideration in addition to the previous consideration, the following four points are listed as main necessary conditions for the arrangement of the decentering lens unit G3b.

(1) The decentering lens unit should be composed of an as small number of lens elements as possible, so as to be compact and light.

(2) The decentering lens unit should take a minimum angle of deflection relative to the Rand rays.

(3) The decentering lens unit should be fully achromatized therein.

(4) The decentering lens unit should be fully corrected for the aberration change due to decentration.

When the decentering lens unit is composed of a decreased number of lenses, the above condition (2) can be satisfied by arranging the front optical system as a substantially afocal system, but there is a possibility of not satisfying the conditions (3) and (4) sufficiently. Therefore, the present invention involves achromatization with a doublet having a positive lens and a negative lens to decrease occurrence of chromatic aberration after decentration. Aberration can be kept at a good level after decentration by using the decentering lens unit with the doublet thus achromatized.

Here, it is preferred in respect of production to employ a cemented lens of a positive lens and a negative lens arranged in order from the object side.

In the present invention the following condition of Equation (2) is preferably satisfied in order to make the decentering lens unit G3b composed of the doublet take the minimum angle of deflection relative to the Rand rays.

$$0.2 < (rb+ra)/(rb-ra) < 0.8 \quad (2)$$

In the above equation, ra: a radius of curvature of a most-object-side surface of the decentering lens unit G3b, rb: a radius of curvature of a most-image-side surface of the decentering lens unit G3b.

The condition of Equation (2) defines a shape of the decentering lens unit for taking the minimum angle of deflection. When the decentering lens unit is a cemented lens, the condition of Equation (2) defines a shape factor for the cemented lens.

Within the range defined by the upper limit and the lower limit of the condition of Equation (2), the decentering lens unit can take substantially the minimum angle of deflection relative to the Rand rays after decentration. However, departing from the above range, changes of spherical aberration and coma due to decentration increase.

In the present invention, in order to effect effective correction assist of aberration caused by the decentering lens unit G3b, using the correction lens unit G3a, the correction lens unit G3a is preferably arranged to have at least one positive lens and at least one negative lens and to satisfy the following condition of Equation (3).

$$-1.5 < \Phi 3an/\Phi 3ap < -0.8 \quad (3)$$

In the above equation, $\Phi 3ap$: a composite refractive power of the positive lenses forming the lens unit G3a.

$\Phi 3an$: a composite refractive power of the negative lenses forming the lens unit G3a.

Since the decentering lens unit G3b has a positive refractive power, the decentering lens unit G3b gives rise to spherical aberration or curvature of field specific to the positive lens. Thus, the condition of Equation (3) defines a condition for canceling the spherical aberration and curvature of field specific to the positive lens by slightly increasing the negative refractive power in the correction lens unit G3a.

Further, the correction lens unit G3a may have a positive lens and a negative lens arranged in order from the object side, which is a preferred arrangement for decreasing the total length of lens.

Further, the following condition of Equation (4) is preferably satisfied in order to achieve good aberration balance.

$$0.5 < |f3a/f| \quad (4)$$

In the above equation, f3a: a focal length of the correction lens unit G3a.

The condition of Equation (4) defines an appropriate range of a ratio of the refractive power of the correction lens unit G3a to the refractive power of the entire lens system.

Below the lower limit of the condition of Equation (4), the refractive power of the correction lens unit G3a for aberration correction assist becomes too strong, causing higher-order aberrations in the correction lens unit G3a so as to make the aberration balance off.

In order to further decrease the aberration change due to decentration so as to achieve good imaging characteristics, the correction lens unit G3a is preferably arranged to be composed of a positive lens and a negative lens arranged from the object side and to satisfy the following conditions of Equation (5) and Equation (6).

$$-0.1 < r1/r2 < 0.8 \quad (5)$$

$$0.5 < r3/r4 < 0.85 \quad (6)$$

In the above equations, r1: a radius of curvature of an image-side surface of the positive lens in the correction lens unit G3a, r2: a radius of curvature of an object-side surface of the negative lens in the correction lens unit G3a, r3: a radius of curvature of an image-side surface of the negative lens in the correction lens unit G3a, r4: a radius of curvature of a most-object-side surface of the decentering lens unit G3b.

The conditions of Equations (5) and (6) are conditions for keeping the Rand rays entering the decentering lens unit G3b substantially parallel with the optical axis even if the Rand rays are incident at any height to the most-object-side lens surface of optical system.

Outside the ranges of the conditions of Equations (5) and (6), it becomes difficult to keep the Rand rays entering the decentering lens unit G3b substantially parallel with the optical axis.

Embodiments of the present invention will be explained by reference to the accompanying drawings.

Embodiment 1

FIG. 1 is a drawing to show a lens layout of the shake-preventing correction optical system according to the first embodiment of the present invention.

The shake-preventing correction optical system as shown is composed of, in order from the object side, the first lens unit G1 consisting of a biconvex lens ($L_{11}$), a biconvex lens ($L_{12}$), and a biconcave lens ($L_{13}$), the focusing lens unit G2 consisting of a negative cemented lens of a positive meniscus lens ($L_{21}$) with a concave surface opposed to the object side and a biconcave lens ($L_{22}$), the correction lens unit G3a consisting of a biconvex lens ($L_{31}$) and a negative meniscus lens ($L_{32}$) with a convex surface opposed to the object side, and the decentering lens unit G3b consisting of a positive cemented lens of a biconvex lens ($L_{33}$) and a negative meniscus lens ($L_{34}$) with a concave surface opposed to the object side.

An aperture stop is disposed on the image side of the decentering lens unit G3b.

As shown in FIG. 1, the shake-preventing correction optical system is provided with a shake detecting unit 1 for detecting a shake of an image due to vibration of optical system, for example a shake detecting sensor, and an image-shake preventing drive mechanism 2 for moving the shake-preventing correction lens unit Gv in a direction opposite to a shake of image and nearly perpendicular to the optical axis against the shake of image detected by the shake detecting unit 1.

The above shake detecting unit 1 detects a change of image position due to hand shakes in taking a picture through a taking optical system or a change of image position occurring in taking a picture at a vibrating place, for example in a car or a helicopter. Next, the image-shake preventing drive mechanism 2 moves the shake-preventing correction lens unit Gv so as to cancel the change of image position detected by the shake detecting unit 1, thereby correcting the change of image position.

These shake detecting unit 1 and image-shake preventing drive mechanism 2 are also provided for the shake-preventing correction optical systems in respective Embodiments 2 to 12 as described below. Since the operation thereof is the same as described above, illustration and explanation thereof will be omitted.

The above-mentioned shake-preventing correction optical system is disclosed, for example, in U.S. Pat. Nos. 5,172,276 and 4,978,205, which are hereby incorporated by reference.

In Table 1-1 below there are listed values of specifications of Embodiment 1 of the present invention. In Table 1-1, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 1-1 f = 180 mm
FNO = 2.8

|  | r | d | ν | n |
|---|---|---|---|---|
| 1 | 131.236 | 8.99 | 70.1 | 1.51860 |
| 2 | −287.235 | 0.10 | | |
| 3 | 79.377 | 11.47 | 82.6 | 1.49782 |
| 4 | −312.808 | 1.74 | | |
| 5 | −241.386 | 4.37 | 32.2 | 1.67270 |
| 6 | 174.815 | 29.93 | | |
| 7 | −129.438 | 5.00 | 27.6 | 1.75520 |
| 8 | −70.818 | 4.00 | 64.1 | 1.51680 |
| 9 | 62.138 | 18.93 | | |
| 10 | 101.249 | 6.50 | 64.1 | 1.51680 |
| 11 | −94.555 | 5.29 | | |
| 12 | 1864.317 | 2.63 | 70.2 | 1.48749 |
| 13 | 50.151 | 3.00 | | |
| 14 | 75.627 | 3.52 | 64.1 | 1.51680 |
| 15 | −136.574 | 1.61 | 27.6 | 1.75520 |
| 16 | −540.094 | Bf = 82.89 | | |

(Correspondent values to the conditions)

| (1) | lff/fl = | 2.26 |
|---|---|---|
| (2) | (rb + ra)/(rb − ra) = | 0.754 |
| (3) | φ3an/φ3ap = | −0.905 |
| (4) | lf3a/fl = | 2.92 |
| (5) | r1/r2 = | −0.0507 |
| (6) | r3/r4 = | 0.663 |

FIGS. 2A–2D are aberration diagrams to show aberrations in the infinity focus state of the first embodiment. FIGS. 3A–3G are aberration diagrams to show a comparison between lateral aberration before shake-preventing correction (before decentration) and lateral aberration upon shake-preventing correction (after decentration) in the infinity focus state of the first embodiment.

In the aberration diagrams of FIGS. 2A–2D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 3A–3G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 2

Figure 4:
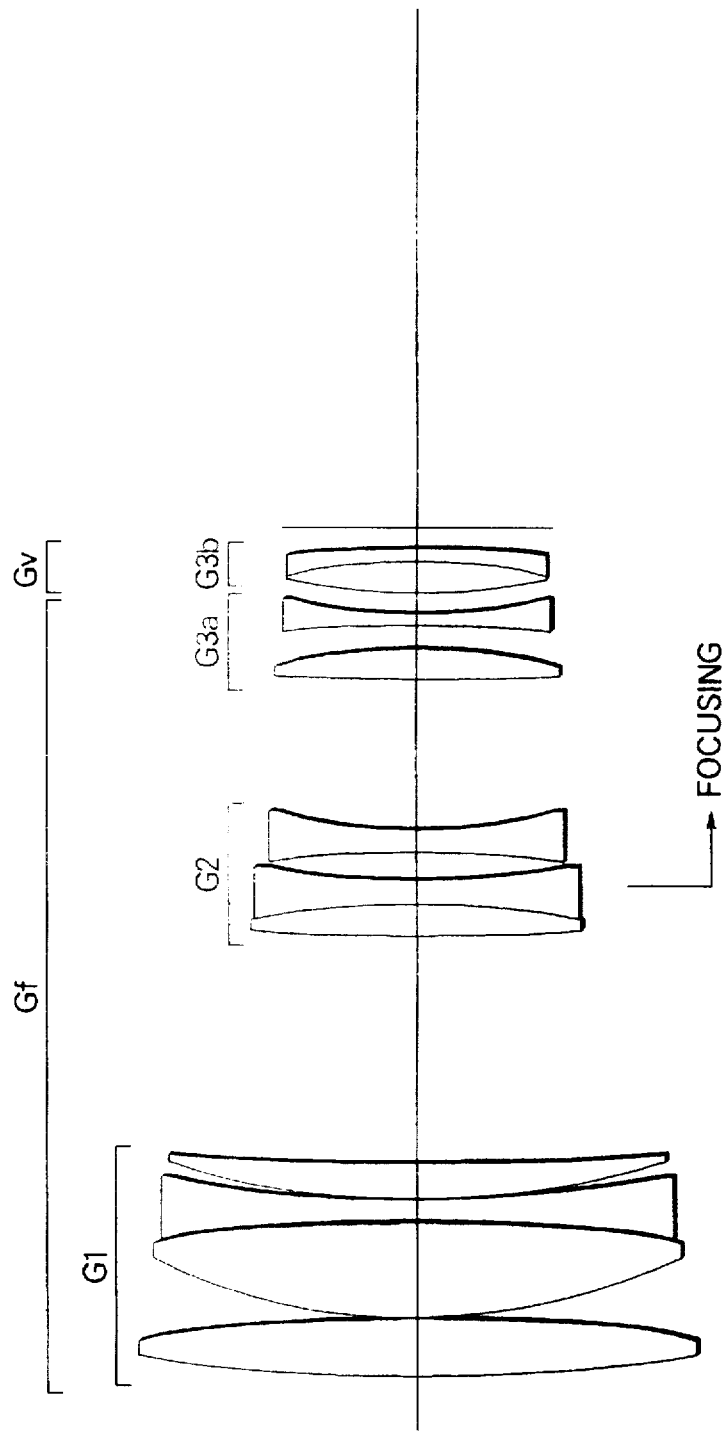
FIG. 4 is a drawing to show a lens layout of a shake-preventing correction optical system according to the second embodiment of the present invention.

FIG. 4 is a drawing to show a lens layout of the shake-preventing correction optical system according to the second embodiment of the present invention.

The shake-preventing correction optical system as shown is composed of, in order from the object side, the first lens unit GI consisting of a biconvex lens, a biconvex lens, a biconcave lens, and a positive meniscus lens with a convex surface opposed to the object side, the focusing lens unit G2 consisting of a cemented lens of a biconvex lens and a biconcave lens, and a biconcave lens, the correction lens unit G3a consisting of a biconvex lens and a biconcave lens, and the decentering lens unit G3b consisting of a positive cemented lens of a biconvex lens and a negative meniscus lens with a concave surface opposed to the object side.

An aperture stop is disposed on the image side of the decentering lens unit G3b.

In Table 1-2 below there are listed values of specifications of Embodiment 2 of the present invention. In Table 1-2, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ587.6 nm).

TABLE 1-2 f = 300 mm
FNO = 4.0

|  | r | d | ν | n |
|---|---|---|---|---|
| 1 | 261.773 | 8.09 | 70.1 | 1.51860 |
| 2 | −262.164 | 0.10 | | |
| 3 | 84.529 | 13.17 | 82.6 | 1.49782 |
| 4 | −306.717 | 0.50 | | |
| 5 | −295.714 | 3.20 | 31.7 | 1.75692 |
| 6 | 172.404 | 0.10 | | |
| 7 | 117.999 | 5.19 | 70.1 | 1.51860 |
| 8 | 608.548 | 32.21 | | |
| 9 | 279.165 | 4.70 | 27.6 | 1.74077 |
| 10 | −109.631 | 3.20 | 58.5 | 1.65160 |
| 11 | 111.964 | 4.04 | | |
| 12 | −147.413 | 3.20 | 58.5 | 1.65160 |
| 13 | 73.784 | 21.53 | | |
| 14 | 635.070 | 4.31 | 33.9 | 1.80384 |
| 15 | −79.026 | 3.35 | | |
| 16 | −147.727 | 1.52 | 40.4 | 1.60717 |
| 17 | 74.731 | 3.00 | | |
| 18 | 94.446 | 4.62 | 70.1 | 1.51860 |
| 19 | −74.498 | 2.00 | 33.9 | 1.80384 |
| 20 | −163.057 | Bf = 136.95 | | |

(Correspondent values to the conditions)

| (1) | lff/fl = | 12.13 |
|---|---|---|
| (2) | (rb + ra)/(rb − ra) = | 0.266 |
| (3) | φ3an/φ3ap = | −1.08 |
| (4) | lf3a/fl = | 12.53 |
| (5) | r1/r2 = | 0.535 |
| (6) | r3/r4 = | 0.791 |

FIGS. 5A–5D are aberration diagrams to show aberrations in the infinity focus state of the second embodiment. FIGS. 6A–6G are aberration diagrams to show a comparison between lateral aberration before shake-preventing correction and lateral aberration upon shake-preventing correction in the infinity focus state of the second embodiment.

In the aberration diagrams of FIGS. 5A–5D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 6A–6G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 3

Figure 7:
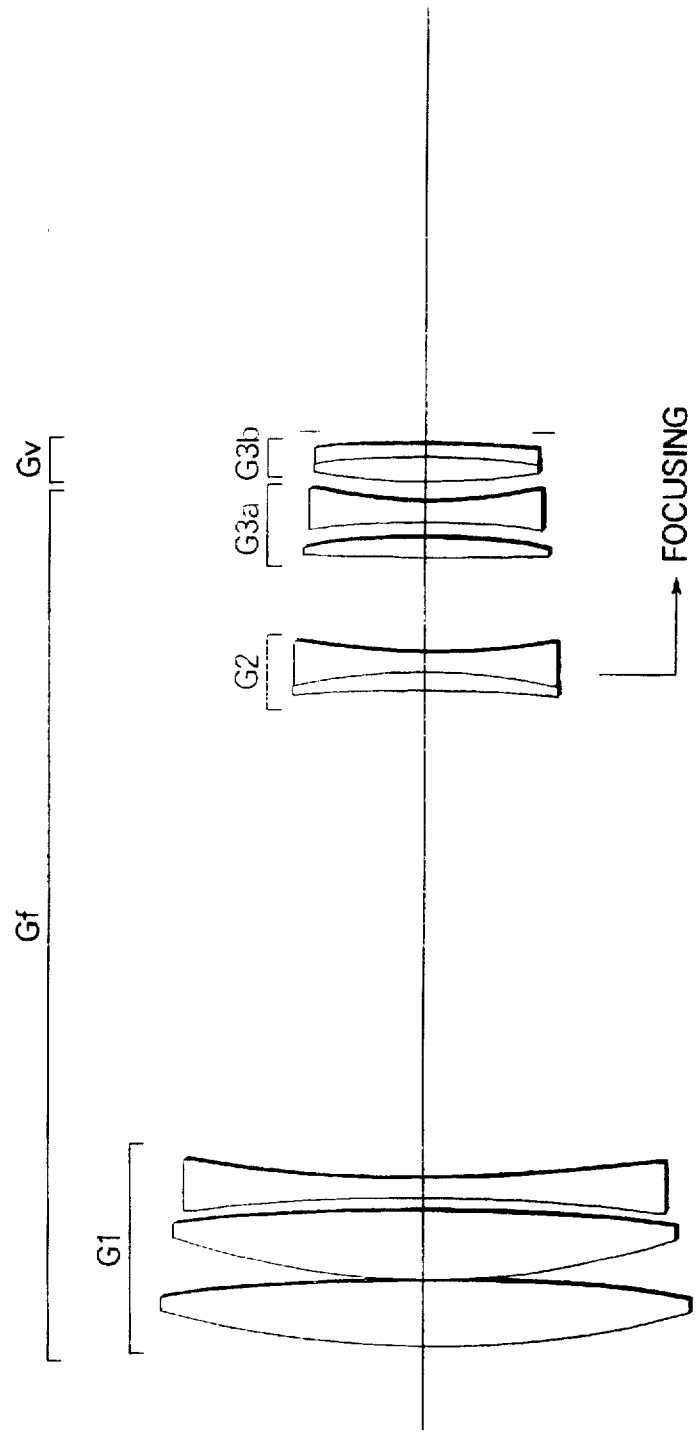
FIG. 7 is a drawing to show a lens layout of a shake-preventing correction optical system according to the third embodiment of the present invention.

FIG. 7 is a drawing to show a lens layout of the shake-preventing correction optical system according to the third embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a negative cemented lens of a positive meniscus lens with a concave surface opposed to the object side and a biconcave lens, the correction lens unit G3a consisting of a biconvex lens and a biconcave lens, and the decentering lens unit G3b consisting of a positive cemented lens of a biconvex lens and a negative meniscus lens with a concave surface opposed to the object side.

An aperture stop is disposed on the image side of the decentering lens unit G3b.

In Table 1-3 below there are listed values of specifications of Embodiment 3 of the present invention. In Table 1-3, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 1-3 f = 400 mm
FNO = 5.6

| | r | d | ν | n |
|---|---|---|---|---|
| 1 | 145.879 | 9.17 | 70.1 | 1.51860 |
| 2 | −291.576 | 0.10 | | |
| 3 | 110.353 | 9.69 | 82.6 | 1.49782 |
| 4 | −324.784 | 1.88 | | |
| 5 | −264.169 | 2.80 | 35.2 | 1.74950 |
| 6 | 225.465 | 69.07 | | |
| 7 | −313.637 | 2.80 | 27.6 | 1.74077 |
| 8 | −91.448 | 2.80 | 58.5 | 1.65160 |
| 9 | 97.799 | 13.92 | | |
| 10 | 489.812 | 2.80 | 28.6 | 1.79504 |
| 11 | −96.891 | 2.09 | | |
| 12 | −134.540 | 2.80 | 40.4 | 1.60717 |
| 13 | 69.141 | 3.00 | | |
| 14 | 116.411 | 3.27 | 70.1 | 1.51860 |
| 15 | −106.519 | 1.66 | 35.2 | 1.74950 |
| 16 | −304.726 | Bf = 167.10 | | |

(Correspondent values to the conditions)

| | | |
|---|---|---|
| (1) | |ff|/f = | 5.09 |
| (2) | (rb + ra)/(rb − ra) = | 0.447 |
| (3) | φ3an/φ3ap = | −1.36 |
| (4) | |f3a|/f = | 0.807 |
| (5) | r1/r2 = | 0.720 |
| (6) | r3/r4 = | 0.594 |

FIGS. 8A–8D are aberration diagrams to show aberrations in the infinity focus state of the third embodiment. FIGS. 9A–9G are aberration diagrams to show a comparison between lateral aberration before shake-preventing correction and lateral aberration upon shake-preventing correction in the infinity focus state of the third embodiment.

In the aberration diagrams of FIGS. 8A–8D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 9A–9G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 4

FIG. 10 is a drawing to show a lens layout of the shake-preventing correction optical system according to the fourth embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a cemented lens of a biconvex lens and a biconcave lens, and a biconcave lens, the correction lens unit G3a consisting of a biconvex lens and a biconcave lens, and the decentering lens unit G3b consisting of a positive cemented lens of a biconvex lens and a negative meniscus lens with a concave surface opposed to the object side.

An aperture stop is disposed on the image side of the decentering lens unit G3b.

In Table 1-4 below there are listed values of specifications of Embodiment 4 of the present invention. In Table 1-4, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 1-4 f = 600 mm
FNO = 5.6

| | r | d | ν | n |
|---|---|---|---|---|
| 1 | 227.505 | 13.84 | 82.6 | 1.49782 |
| 2 | −328.696 | 0.20 | | |
| 3 | 138.373 | 14.46 | 82.6 | 1.49782 |
| 4 | −815.283 | 1.81 | | |
| 5 | −483.964 | 3.60 | 35.2 | 1.74950 |
| 6 | 293.956 | 94.80 | | |
| 7 | 414.752 | 6.60 | 30.1 | 1.69895 |
| 8 | −200.977 | 3.60 | 64.1 | 1.51680 |
| 9 | 1905.091 | 1.66 | | |
| 10 | −312.220 | 3.60 | 55.6 | 1.69680 |
| 11 | 102.152 | 19.09 | | |
| 12 | 231.238 | 5.41 | 29.5 | 1.71736 |
| 13 | −122.878 | 5.47 | | |
| 14 | −200.369 | 3.60 | 40.9 | 1.79631 |
| 15 | 92.946 | 3.00 | | |

TABLE 1-4-continued

| f = 600 mm FNO = 5.6 | | | | |
|---|---|---|---|---|
| 16 | 128.828 | 3.75 | 70.1 | 1.51860 |
| 17 | −178.462 | 2.44 | 31.7 | 1.75692 |
| 18 | −573.770 | Bf = 223.07 | | |

(Correspondent values to the conditions)

| (1) | |ff/f| = | 10.75 |
|---|---|---|
| (2) | (rb + ra)/(rb − ra) = | 0.633 |
| (3) | φ3an/φ3ap = | −1.42 |
| (4) | |f3a/f| = | 0.587 |
| (5) | r1/r2 = | 0.613 |
| (6) | r3/r4 = | 0.721 |

FIGS. 11A–11D are aberration diagrams to show aberrations in the infinity focus state of the fourth embodiment. FIGS. 12A–12G are aberration diagrams to show a comparison between lateral aberration before shake-preventing correction and lateral aberration upon shake-preventing correction in the infinity focus state of the fourth embodiment.

In the aberration diagrams of FIGS. 11A–11D, $F_{NO}$ represents the F-number, Y the image height, D the d-line ($\lambda$=587.6 nm), and G the g-line ($\lambda$=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 12A–12G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

As explained above, the present invention can realize the shake-preventing correction optical system having the decentering lens unit composed of the decreased number of constituent lenses and having good imaging performance even upon shake-preventing correction.

Also, the present invention employs the doublet for the decentering lens unit to decrease the size and the weight, thereby enabling to decrease the load on the drive unit for shake-preventing correction.

Further, the shake-preventing correction optical system of the present invention can be arranged as a tracking apparatus for performing such framing that a specific subject is always located at a predetermined place.

Next, in the present invention, another shake-preventing correction optical system comprises in order from the object side the lens unit Gf fixed in a direction perpendicular to the optical axis, and the shake-preventing correction lens unit Gv comprising the decentering lens unit movable in a direction substantially perpendicular to the optical axis, wherein the lens unit Gf comprises a first lens unit G1 having a positive refractive power, a focusing lens unit G2 having a negative refractive power and arranged to move along the optical axis to effect focusing to a near object, and a lens unit G3a, and wherein the shake-preventing correction lens unit Gv comprises the decentering lens unit G3b having an aspherical lens.

The present invention includes satisfying the following condition of Equation (7) in order to arrange the lens unit Gf as a substantially afocal system.

$$4.0 < |ff/f| \tag{7}$$

In the above equation, ff: the focal length of the lens unit Gf, f: the focal length of the total optical system.

The condition of Equation (7) defines an appropriate range of a ratio of the focal length ff of the lens unit Gf to the focal length f of the total optical system, which is a condition for arranging the front lens unit Gf as a substantially afocal system.

Below the lower limit of the condition of Equation (7), the focal length of the front lens unit Gf becomes not large enough, which causes the Rand rays not to be substantially parallel with the optical axis when entering the decentering lens unit G3b.

The present invention employs the aspherical lens to construct the decentering lens unit G3b in the minimum lens number.

When the decentering lens unit is composed of a decreased number of lens elements, the condition (2) in the main necessary conditions (1) to (4) as discussed previously for the arrangement of the decentering lens unit G3b can also be satisfied by arranging the front optical system as a substantially afocal system, but there is a possibility of not satisfying the conditions (3) and (4) sufficiently. As for the condition (3), the decentering lens unit G3b is preferably corrected for chromatic aberration therein, and in the present invention an optic material with a large Abbe number vd is used for the aspherical lens in order to keep occurrence of chromatic aberration after decentration at a low level. Aberration can be maintained at a good level after decentration by using the decentering lens unit utilizing such a single aspherical lens.

In the present invention the following condition of Equation (8) is preferably satisfied in order to make the aspherical lens composing the decentering lens unit G3b take the minimum angle of deflection relative to the Rand rays.

$$0.4 < (rb+ra)/(rb-ra) < 1.0 \tag{8}$$

In the above equation, ra: a radius of curvature of an object-side surface of the aspherical lens, rb: a radius of curvature of an image-side surface of the aspherical lens.

The condition of Equation (8) defines a shape of the aspherical lens to take the minimum angle of deflection relative to the Rand rays, that is, the shape factor thereof.

Within the range defined by the upper limit and the lower limit of the condition of Equation (8), the decentering lens unit can take substantially the minimum angle of deflection relative to the Rand rays after decentration. However, departing from the above range, changes of spherical aberration and coma due to decentration increase.

When the decentering lens unit is constructed in the small lens number as in the present invention, aberration occurring in the decentering lens unit G3b should be preferably corrected by effective correction assist of the correction lens unit G3a in order to better satisfy the above conditions (3) and (4). For this purpose, the correction lens unit G3a is preferably arranged to have at least one positive lens and at least one negative lens and to satisfy the following condition of Equation (9).

$$-2.5 < \Phi 3an/\Phi 3ap < -0.9 \tag{9}$$

In the above equation,

Φ3ap: a composite refractive power of the positive lenses forming the lens unit G3a, Φ3an: a composite refractive power of the negative lenses forming the lens unit G3a.

Since the decentering lens unit G3b has a positive refractive power, the decentering lens unit G3b gives rise to spherical aberration or curvature of field specific to the positive lens. Thus, the condition of Equation (9) defines a condition for canceling the spherical aberration and curvature of field specific to the positive lens by slightly increasing the negative refractive power in the correction lens unit G3a.

Further, the correction lens unit G3a may have a positive lens and a negative lens arranged in order from the object side, which is a preferred arrangement for decreasing the total length of lens.

Further, the following condition of Equation (10) is preferably satisfied in order to achieve good aberration balance.

$$0.3 < |f3a/f| \tag{10}$$

In the above equation, f3a: a focal length of the correction lens unit G3a.

The condition of Equation (10) defines an appropriate range of a ratio of the refractive power of the correction lens unit G3a to the refractive power of the entire lens system.

Below the lower limit of the condition of Equation (10), the refractive power of the correction lens unit G3a for aberration correction assist becomes too strong, causing higher-order aberrations in the correction lens unit G3a so as to make the aberration balance off.

In order to further decrease the aberration change due to decentration so as to achieve good imaging characteristics, the correction lens unit G3a is preferably arranged to be composed of a positive lens and a negative lens arranged from the object side and to satisfy the following conditions of Equation (11) and Equation (12).

$$0.4 < r1/r2 < 1.0 \tag{11}$$

$$0.6 < r3/r4 < 1.8 \tag{12}$$

In the above equations, r1: a radius of curvature of an image-side surface of the positive lens in the correction lens unit G3a, r2: a radius of curvature of an object-side surface of the negative lens in the correction lens unit G3a, r3: a radius of curvature of an image-side surface of the negative lens in the correction lens unit G3a, r4: a radius of curvature of the object-side surface of the aspherical lens in the decentering lens unit G3b.

The conditions of Equations (11) and (12) are conditions for keeping the Rand rays entering the decentering lens unit G3b substantially parallel with the optical axis even if the Rand rays are incident at any height to the most-object-side lens surface of optical system.

Outside the ranges of the conditions of Equations (11) and (12), it becomes difficult to keep the Rand rays entering the decentering lens unit G3b substantially parallel with the optical axis.

Embodiments of the present invention will be explained by reference to the accompanying drawings.

Embodiment 5

Figure 13:
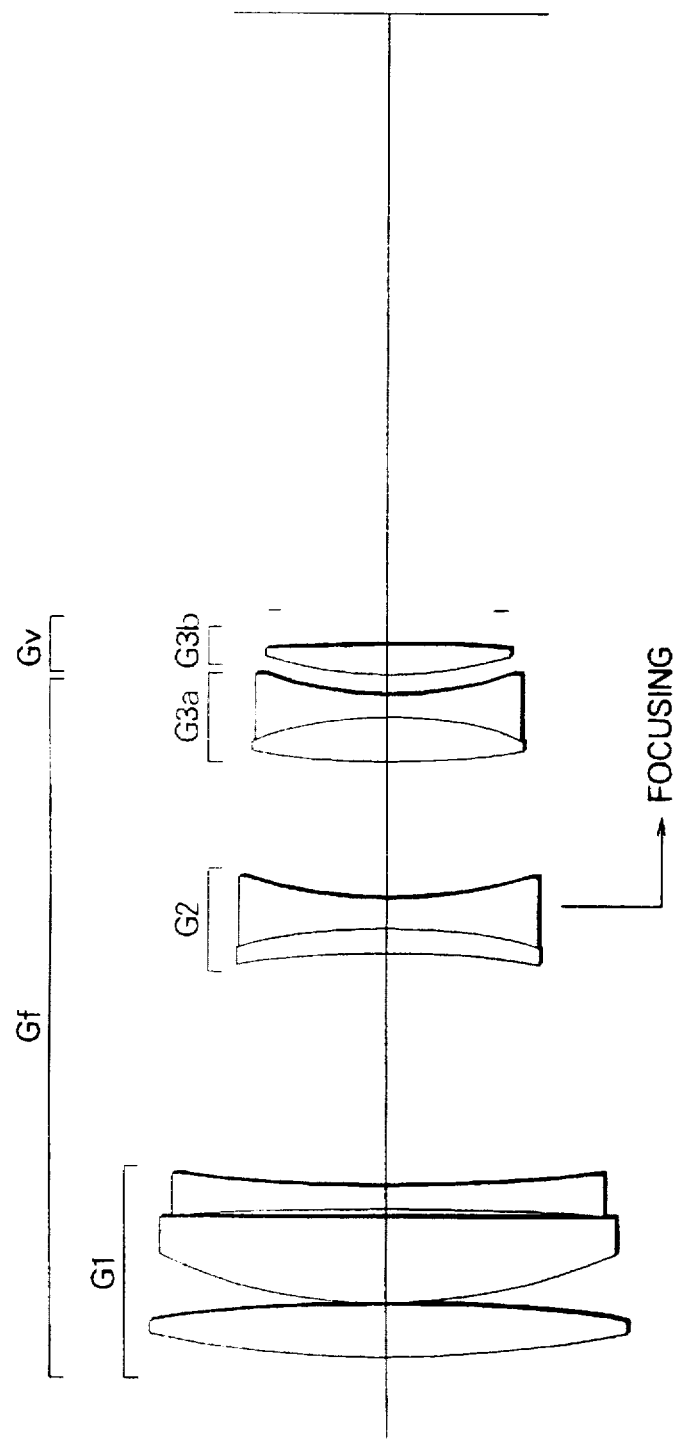
FIG. 13 is a drawing to show a lens layout of a shake-preventing correction optical system according to the fifth embodiment of the present invention.

FIG. 13 is a drawing to show a lens layout of the shake-preventing correction optical system according to the fifth embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a negative cemented lens of a positive meniscus lens with a concave surface opposed to the object side and a biconcave lens, the correction lens unit G3a consisting of a cemented lens of a biconvex lens and a biconcave lens, and the decentering lens unit G3b consisting of a biconvex, aspherical lens.

An aperture stop is disposed on the image side of the decentering lens unit G3b.

In Table 2-1 below there are listed values of specifications of Embodiment 5 of the present invention. In Table 2-1, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

An aspherical surface can be expressed by the following Equation (a) where y is a height in a direction perpendicular to the optical axis, S(y) an amount of displacement in the direction of the optical axis at the height y, r a radius of reference curvature or radius of vertex curvature, k a conic coefficient, and Cn aspherical coefficients of the order n.

$$S(y)=(y^2/r)/[1+(1-k\cdot y^2/r^2)^{1/2}]+C_2\cdot y^2+C_4\cdot y^4+C_6\cdot y^6+C_8\cdot y^8+C_{10}\cdot y^{10}+\ldots \tag{a}$$

Further, a radius R of paraxial curvature of the aspherical surface is defined by the following Equation (b).

$$R=1/(2\cdot C_2+1/r) \tag{b}$$

An asterisk is placed on the right side of a surface number of an aspherical surface in the table of specifications of embodiment.

TABLE 2-1 f = 180 mm
FNO = 2.8

| | r | d | ν | n |
|---|---|---|---|---|
| 1 | 150.240 | 7.41 | 69.9 | 1.51860 |
| 2 | −260.534 | 0.10 | | |
| 3 | 76.990 | 11.88 | 82.6 | 1.49782 |
| 4 | 2672.582 | 1.08 | | |
| 5 | −650.620 | 3.00 | 27.6 | 1.75520 |
| 6 | 203.650 | 33.41 | | |
| 7 | −171.187 | 3.52 | 25.5 | 1.80458 |
| 8 | −89.111 | 4.10 | 64.1 | 1.51680 |
| 9 | 63.332 | 19.45 | | |
| 10 | 98.691 | 6.61 | 43.3 | 1.84042 |
| 11 | −54.362 | 3.00 | 42.0 | 1.66755 |
| 12 | 50.935 | 3.00 | | |
| 13* | 60.419 | 3.93 | 95.0 | 1.43425 |
| 14 | −390.015 | Bf = 89.51 | | |

(Data on aspherical surface)

| | k | C2 | C4 |
|---|---|---|---|
| Thirteenth surface | 1.0000 | 0.0000 | −0.2994 × 10⁻⁶ |
| | C6 | C8 | C10 |
| | −0.4094 × 10⁻⁹ | 0.0000 | 0.0000 |

(Correspondent values to the conditions)

| (7) | |f3/f| = | 4.18 |
|---|---|---|
| (8) | (rb + ra)/(rb − ra) = | 0.732 |

TABLE 2-1-continued

| | f = 180 mm FNO = 2.8 | |
|---|---|---|
| (9) | φ3an/φ3ap = | −1.09 |
| (10) | lf3a/fl = | 6.67 |
| (11) | r1/r2 = | 1.0 |
| (12) | r3/r4 = | 0.843 |

FIGS. 14A–14D are aberration diagrams to show aberrations in the infinity focus state of the fifth embodiment. FIGS. 15A–15G are aberration diagrams to show a comparison between lateral aberration before shake-preventing correction (before decentration) and lateral aberration upon shake-preventing correction (after decentration) in the infinity focus state of the fifth embodiment.

In the aberration diagrams of FIGS. 14A–14D, $F_{NO}$ represents the F-number, Y the image height, D the d-line ($\lambda$=587.6 nm), and G the g-line ($\lambda$=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 15A–15G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 6

Figure 16:
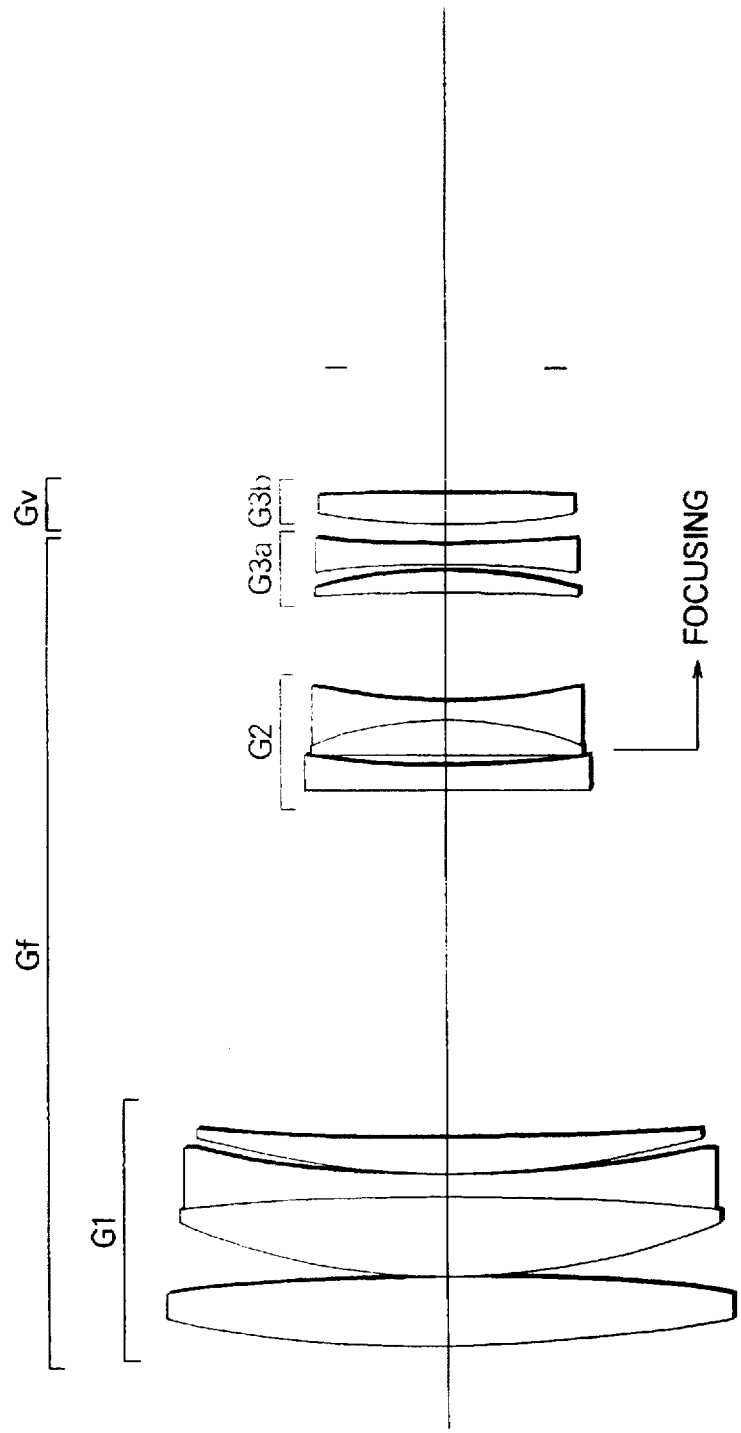
FIG. 16 is a drawing to show a lens layout of a shake-preventing correction optical system according to the sixth embodiment of the present invention.

FIG. 16 is a drawing to show a lens layout of the shake-preventing correction optical system according to the sixth embodiment of the present invention.

The shake-preventing correction optical system as shown is composed of, in order from the object side, the first lens unit G1 consisting of a biconvex lens, a biconvex lens, a biconcave lens, and a positive meniscus lens with a convex surface opposed to the object side, the focusing lens unit G2 consisting of a biconcave lens and a cemented lens of a biconvex lens and a biconcave lens, the correction lens unit G3a consisting of a positive meniscus lens with a concave surface opposed to the object side and a biconcave lens, and the decentering lens unit G3b consisting of a biconvex, aspherical lens.

An aperture stop is disposed on the image side of the decentering lens unit G3b.

In Table 2-2 below there are listed values of specifications of Embodiment 6 of the present invention. In Table 2-2, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line ($\lambda$=587.6 nm).

TABLE 2-2

| | f = 300 mm FNO = 4.0 | | | |
|---|---|---|---|---|
| | r | d | ν | n |
| 1 | 180.569 | 9.63 | 69.9 | 1.51860 |
| 2 | −389.102 | 0.27 | | |
| 3 | 92.999 | 11.10 | 82.6 | 1.49782 |
| 4 | −408.534 | 0.10 | | |
| 5 | −392.046 | 2.99 | 35.2 | 1.74950 |
| 6 | 166.071 | 0.25 | | |
| 7 | 124.638 | 4.90 | 69.9 | 1.51860 |
| 8 | 462.678 | 50.05 | | |
| 9 | −1175.196 | 2.80 | 45.0 | 1.74400 |
| 10 | 95.980 | 1.80 | | |
| 11 | 840.898 | 4.97 | 27.6 | 1.75520 |
| 12 | −51.345 | 2.80 | 52.3 | 1.74810 |
| 13 | 82.072 | 15.30 | | |
| 14 | −620.041 | 3.23 | 52.3 | 1.74810 |
| 15 | −72.443 | 0.93 | | |
| 16 | −150.233 | 2.80 | 33.7 | 1.64831 |
| 17 | 157.170 | 3.00 | | |
| 18* | 91.982 | 4.50 | 69.9 | 1.51860 |
| 19 | −382.542 | Bf = 132.89 | | |

(Data on aspherical surface)

| | k | C2 | C4 |
|---|---|---|---|
| Eighteenth surface | 1.0000 | 0.0000 | −0.2023 × 10⁻⁶ |
| | C6 | C8 | C10 |
| | 0.0000 | 0.0000 | 0.0000 |

(Correspondent values to the conditions)

| (7) | lff/fl = | 17.58 |
|---|---|---|
| (8) | (rb + ra)/(rb − ra) = | 0.612 |
| (9) | φ3an/φ3ap = | −0.926 |
| (10) | lf3a/fl = | 4.22 |
| (11) | r1/r2 = | 0.482 |
| (12) | r3/r4 = | 1.709 |

FIGS. 17A–17D are aberration diagrams to show aberrations in the infinity focus state of the sixth embodiment. FIGS. 18A–18G are aberration diagrams to show a comparison between lateral aberration before shake-preventing correction and lateral aberration upon shake-preventing correction in the infinity focus state of the sixth embodiment.

In the aberration diagrams of FIGS. 17A–17D, $F_{NO}$ represents the F-number, Y the image height, D the d-line (I=587.6 nm), and G the g-line ($\lambda$=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 18A–18G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 7

Figure 19:
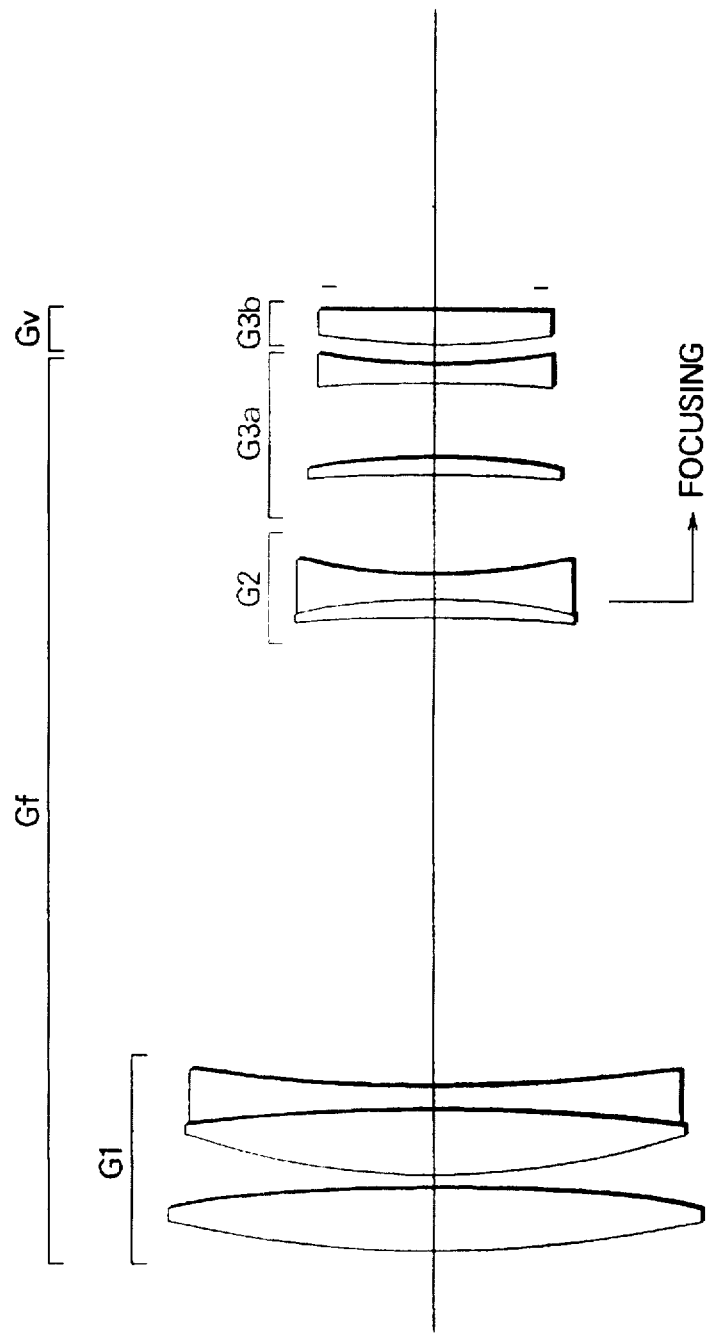
FIG. 19 is a drawing to show a lens layout of a shake-preventing correction optical system according to the seventh embodiment of the present invention.
Figures 20A, 20B, 20C, 20D:
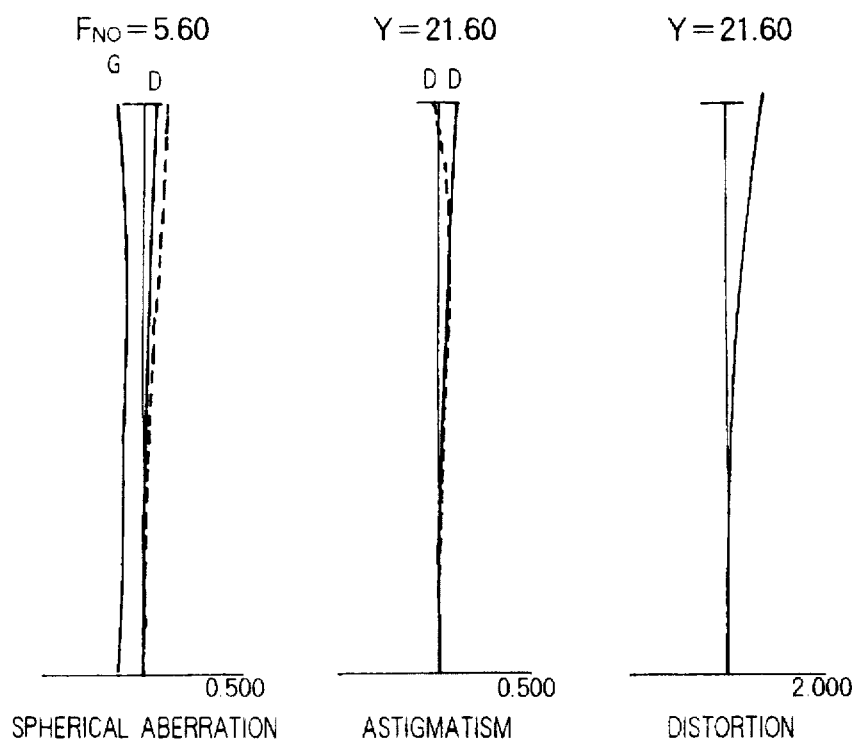
FIGS. 20A-20D are aberration diagrams to show aberrations in an infinity focus state of the seventh embodiment.

FIG. 19 is a drawing to show a lens layout of the shake-preventing correction optical system according to the seventh embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a negative cemented lens of a positive meniscus lens with a concave surface opposed to the object side and a biconcave lens, the correction lens unit G3a consisting of a positive meniscus lens with a concave surface opposed to the object side and a biconcave lens, and the decentering lens unit G3b consisting of a biconvex, aspherical lens.

An aperture stop is disposed on the image side of the decentering lens unit G3b.

In Table 2-3 below there are listed values of specifications of Embodiment 7 of the present invention. In Table 2-3, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 2-3 f = 400 mm
FNO = 5.6

| | r | d | ν | n |
|---|---|---|---|---|
| 1 | 154.255 | 8.87 | 69.9 | 1.51860 |
| 2 | −275.779 | 1.90 | | |
| 3 | 98.347 | 9.21 | 82.6 | 1.49782 |
| 4 | −387.526 | 0.57 | | |
| 5 | 320.052 | 2.60 | 35.2 | 1.74950 |
| 6 | 191.508 | 67.23 | | |
| 7 | −319.750 | 2.64 | 27.6 | 1.74077 |
| 8 | −87.778 | 3.54 | 58.5 | 1.65160 |
| 9 | 93.851 | 13.76 | | |
| 10 | −485.500 | 2.60 | 31.6 | 1.75692 |
| 11 | −98.471 | 10.40 | | |
| 12 | −229.658 | 2.60 | 40.3 | 1.60717 |
| 13 | 80.472 | 3.00 | | |
| 14* | 98.210 | 5.00 | 69.9 | 1.51860 |
| 15 | −3890.088 | Bf = 161.05 | | |

(Data on aspherical surface)

| | k | C2 | C4 |
|---|---|---|---|
| Fourteenth surface | 1.0000 | 0.0000 | −0.1521 × 10⁻⁶ |
| | C6 | C8 | C10 |
| | 0.6048 × 10⁻¹⁰ | 0.0000 | 0.0000 |

(Correspondent values to the conditions)

| (7) | lff/fl = | 9.00 |
|---|---|---|
| (8) | (rb + ra)/(rb − ra) = | 0.951 |
| (9) | φ3an/φ3ap = | −1.66 |
| (10) | lf3a/fl = | 0.742 |
| (11) | r1/r2 = | 0.429 |
| (12) | r3/r4 = | 0.819 |

FIGS. 20A–20D are aberration diagrams to show aberrations in the infinity focus state of the seventh embodiment. FIGS. 21A–21G are aberration diagrams to show a comparison between lateral aberration before shake-preventing correction and lateral aberration upon shake-preventing correction in the infinity focus state of the seventh embodiment.

In the aberration diagrams of FIGS. 20A–20D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 21A–21G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 8

Figure 22:
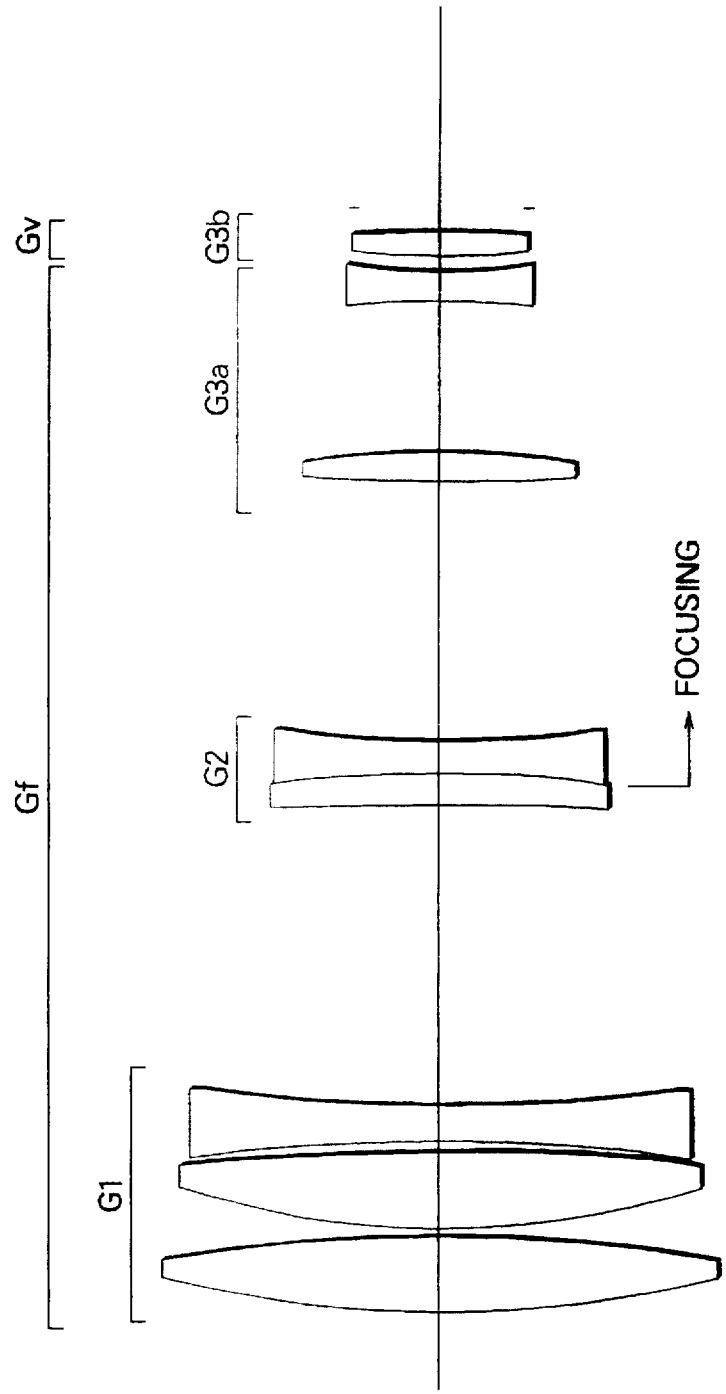
FIG. 22 is a drawing to show a lens layout of a shake-preventing correction optical system according to the eighth embodiment of the present invention.

FIG. 22 is a drawing to show a lens layout of the shake-preventing correction optical system according to the eighth embodiment of the present invention.

The shake-preventing correction optical system as shown is composed of, in order from the object side, the first lens unit GI consisting of a biconvex lens, a biconvex lens, a biconcave lens, the focusing lens unit G2 consisting of a negative cemented lens of a positive meniscus lens with a concave surface opposed to the object side and a biconcave lens, the correction lens unit G3a consisting of a biconvex lens and a biconcave lens, and the decentering lens unit G3b consisting of a biconvex, aspherical lens.

An aperture stop is disposed on the image side of the decentering lens unit G3b.

In Table 2-4 below there are listed values of specifications of Embodiment 8 of the present invention. In Table 2-4, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 2-4 f = 600 mm
FNO = 5.6

| | r | d | ν | n |
|---|---|---|---|---|
| 1 | 200.793 | 15.30 | 82.6 | 1.49782 |
| 2 | −357.743 | 1.29 | | |
| 3 | 146.613 | 16.30 | 82.6 | 1.49782 |
| 4 | −508.827 | 2.03 | | |
| 5 | −380.563 | 7.12 | 35.2 | 1.74950 |
| 6 | 287.106 | 61.06 | | |
| 7 | −2109.331 | 6.65 | 25.4 | 1.80518 |
| 8 | −264.297 | 6.32 | 49.4 | 1.77279 |
| 9 | 209.371 | 52.83 | | |
| 10 | 379.365 | 6.00 | 30.1 | 1.69895 |
| 11 | −185.088 | 31.34 | | |
| 12 | −189.513 | 6.00 | 46.4 | 1.80411 |
| 13 | 98.412 | 3.00 | | |
| 14* | 145.862 | 5.00 | 95.0 | 1.43425 |
| 15 | −443.261 | Bf = 189.71 | | |

(Data on aspherical surface)

| | k | C2 | C4 |
|---|---|---|---|
| Fourteenth surface | 1.0000 | 0.0000 | −0.8466 × 10⁻⁷ |
| | C6 | C8 | C10 |
| | 0.5631 × 10⁻¹⁰ | 0.0000 | 0.0000 |

(Correspondent values to the conditions)

| (7) | lff/fl = | 4.15 |
|---|---|---|
| (8) | (rb + ra)/(rb − ra) = | 0.505 |
| (9) | φ3an/φ3ap = | −2.24 |
| (10) | lf3a/fl = | 0.370 |
| (11) | r1/r2 = | 0.977 |
| (12) | r3/r4 = | 0.675 |

FIGS. 23A–23D are aberration diagrams to show aberrations in the infinity focus state of the eighth embodiment. FIGS. 24A–24G are aberration diagrams to show a comparison between lateral aberration before shake-preventing correction and lateral aberration upon shake-preventing correction in the infinity focus state of the eighth embodiment.

In the aberration diagrams of FIGS. 23A–23D, $F_{NO}$ represents the F-number, Y the image height, D the d-line ($\lambda$=587.6 nm), and G the g-line ($\lambda$=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 24A–24G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

As explained above, the present invention can realize the shake-preventing correction optical system having the decentering lens unit of the minimum number of constituent lens and having good imaging performance even upon shake-preventing correction.

Also, the present invention employs the aspherical lens for the decentering lens unit to decrease the size and the weight, thereby enabling to decrease the load on the drive unit for shake-preventing correction.

Further, the shake-preventing correction optical system of the present invention can be arranged as a tracking apparatus for performing such framing that a specific subject is always located at a predetermined place.

Next, in the present invention, another shake-preventing correction optical system comprises in order from the object side the lens unit Gf fixed in a direction perpendicular to the optical axis, and the shake-preventing correction lens unit Gv comprising the decentering lens unit movable in a direction substantially perpendicular to the optical axis, wherein the lens unit Gf comprises a first lens unit G1 having a positive refractive power, a focusing lens unit G2 having a negative refractive power and arranged to move along the optical axis to effect focusing to a near object, and a lens unit G3a, and wherein the shake-preventing correction lens unit Gv comprises the decentering lens unit G3b having a GRIN lens with an axial index distribution in which the refractive index changes from the object side toward the image side.

The present invention includes satisfying the following condition of Equation (13) in order to arrange the lens unit Gf as a substantially afocal system.

$$2.1 < \text{lff}/\text{f} \tag{13}$$

In the above equation, ff: the focal length of the lens unit Gf, f: the focal length of the total optical system.

The condition of Equation (13) defines an appropriate range of a ratio of the focal length ff of the lens unit Gf to the focal length f of the total optical system, which is a condition for arranging the front lens unit Gf as a substantially afocal system.

Below the lower limit of the condition of Equation (13), the focal length of the front lens unit Gf becomes not large enough, which causes the Rand rays not to be substantially parallel with the optical axis when entering the decentering lens unit G3b.

The present invention employs the GRIN lens (gradient index lens) having the axial index distribution in which the refractive index changes from the object side toward the image side, to construct the decentering lens unit G3b in the minimum lens number.

When the decentering lens unit is composed of a decreased number of lens elements, the condition (2) in the main necessary conditions (1) to (4) as discussed previously for the arrangement of the decentering lens unit G3b can also be satisfied by arranging the front optical system as a substantially afocal system, but there is a possibility of not satisfying the conditions (3) and (4) sufficiently. As for the condition (3), the decentering lens unit G3b is preferably corrected for chromatic aberration therein, and the present invention employs the GRIN lens arranged as a positive meniscus lens with a concave surface opposed to the image side and arranged so that the Abbe number vd decreases from the object side toward the image side in order to keep occurrence of chromatic aberration after decentration at a low level. Aberration after decentration can be kept at a good level by using the decentering lens unit achromatized using such a single GRIN lens.

In the present invention the following condition of Equation (14) is preferably satisfied in order to make the GRIN lens composing the decentering lens unit G3b take the minimum angle of deflection relative to the Rand rays.

$$1.5 < (rb+ra)/(rb-ra) < 2.8 \tag{14}$$

In the above equation, ra: a radius of curvature of an object-side surface of the GRIN lens, rb: a radius of curvature of an image-side surface of the GRIN lens.

The condition of Equation (14) defines a shape of the GRIN lens to take the minimum angle of deflection relative to the Rand rays, that is, the shape factor thereof.

Within the range defined by the upper limit and the lower limit of the condition of Equation (14), the decentering lens unit can take substantially the minimum angle of deflection relative to the Rand rays after decentration. However, departing from the above range, changes of spherical aberration and coma due to decentration increase.

When the decentering lens unit is constructed in the small lens number as in the present invention, aberration occurring in the decentering lens unit G3b should be preferably corrected by effective correction assist of the correction lens unit G3a in order to better satisfy the above conditions (3) and (4). For this purpose, the correction lens unit G3a is preferably arranged to have at least one positive lens and at least one negative lens and to satisfy the following condition of Equation (15).

$$-3.1 < \Phi 3\text{an}/\Phi 3\text{ap} < -0.9 \tag{15}$$

In the above equation, $\Phi 3\text{ap}$: a composite refractive power of the positive lenses forming the lens unit G3a, $\Phi 3\text{an}$: a composite refractive power of the negative lenses forming the lens unit G3a.

Since the decentering lens unit G3b has a positive refractive power, the decentering lens unit G3b gives rise to spherical aberration or curvature of field specific to the positive lens. Thus, the condition of Equation (15) defines a condition for canceling the spherical aberration and curvature of field specific to the positive lens by slightly increasing the negative refractive power in the correction lens unit G3a.

Further, the correction lens unit G3a may have a positive lens and a negative lens arranged in order from the object side, which is a preferred arrangement for decreasing the total length of lens.

Further, the following condition of Equation (16) is preferably satisfied in order to achieve good aberration balance.

$$0.3 < |f3a/f|  \quad (16)$$

In the above equation, f3a: a focal length of the correction lens unit G3a.

The condition of Equation (16) defines an appropriate range of a ratio of the refractive power of the correction lens unit G3a to the refractive power of the entire lens system.

Below the lower limit of the condition of Equation (16), the refractive power of the correction lens unit G3a for aberration correction assist becomes too strong, causing higher-order aberrations in the correction lens unit G3a so as to make the aberration balance off.

In order to further decrease the aberration change due to decentration so as to achieve good imaging characteristics, the correction lens unit G3a is preferably arranged to be composed of a positive lens and a negative lens arranged from the object side and to satisfy the following conditions of Equation (17) and Equation (18).

$$-0.15 < r1/r2 < 1.15  \quad (17)$$

$$0.50 < r3/r4 < 0.95  \quad (18)$$

In the above equations, r1: a radius of curvature of an image-side surface of the positive lens in the correction lens unit G3a, r2: a radius of curvature of an object-side surface of the negative lens in the correction lens unit G3a, r3: a radius of curvature of an image-side surface of the negative lens in the correction lens unit G3a, r4: a radius of curvature of the object-side surface of the GRIN lens in the decentering lens unit G3b.

The conditions of Equations (17) and (18) are conditions for keeping the Rand rays entering the decentering lens unit G3b substantially parallel with the optical axis even if the Rand rays are incident at any height to the most-object-side lens surface of optical system.

Outside the ranges of the conditions of Equations (17) and (18), it becomes difficult to keep the Rand rays entering the decentering lens unit G3b substantially parallel with the optical axis.

Embodiments of the present invention will be explained by reference to the accompanying drawings.

Embodiment 9

Figure 25:
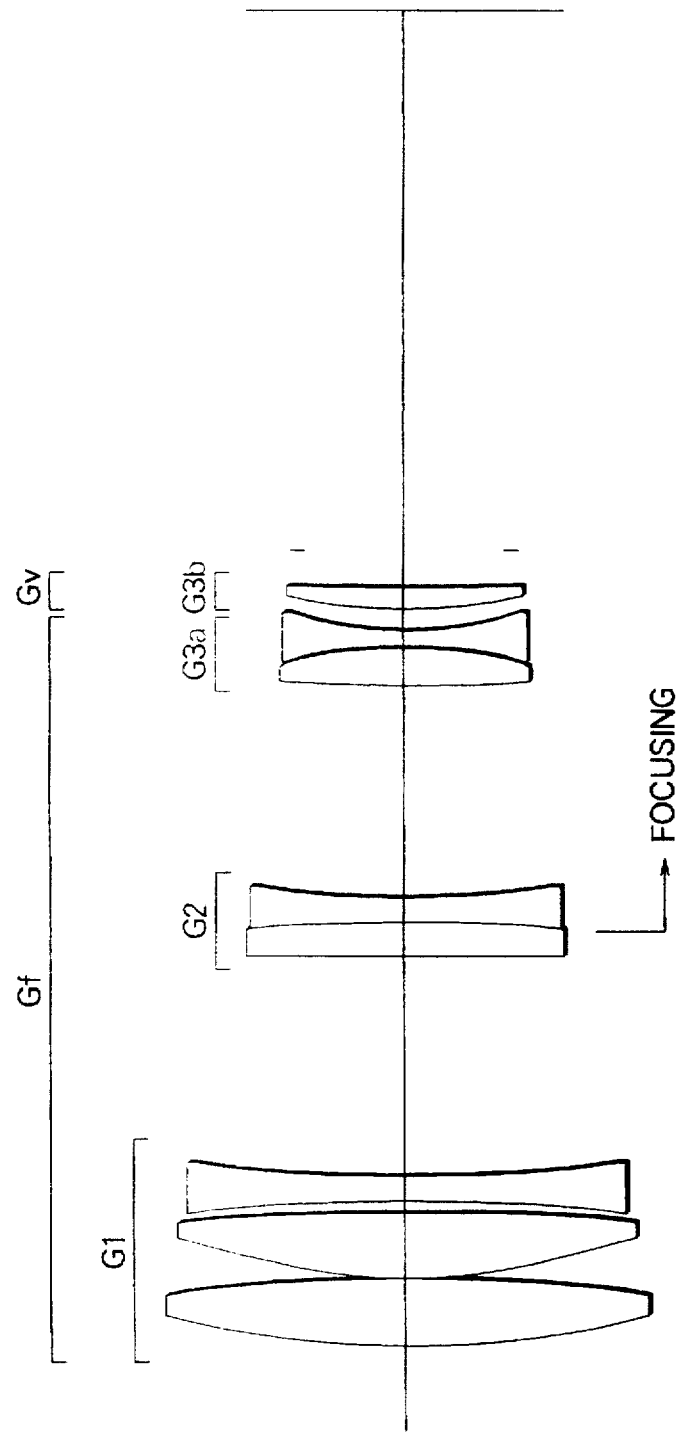
FIG. 25 is a drawing to show a lens layout of a shake-preventing correction optical system according to the ninth embodiment of the present invention.
Figures 26A, 26B, 26C, 26D:
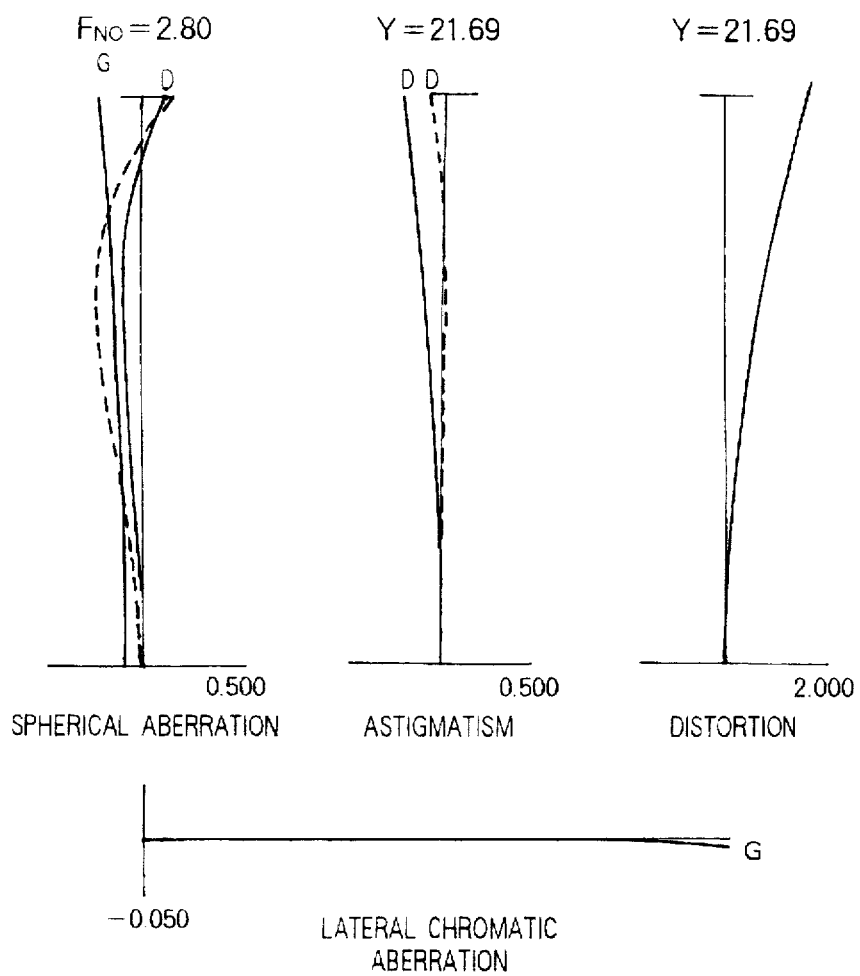
FIGS. 26A-26D are aberration diagrams to show aberrations in an infinity focus state of the ninth embodiment.

FIG. 25 is a drawing to show a lens layout of the shake-preventing correction optical system according to the ninth embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a negative cemented lens of a biconvex lens and a biconcave lens, the correction lens unit G3a consisting of a biconvex lens and a biconcave lens, and the decentering lens unit G3b consisting of a positive meniscus GRIN lens with a concave surface opposed to the image side.

An aperture stop is disposed on the image side of the decentering lens unit G3b.

In Table 3-1 below there are listed values of specifications of Embodiment 9 of the present invention. In Table 3-1, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

In each embodiment, a refractive index distribution N(z) of GRIN lens can be expressed by the following Equation (a).

$$N(z) = n0 + n1 \times z + n2 \times z^2 \quad (a)$$

In the above equation, z: a distance along the optical axis from the vertex of the object-side surface of the GRIN lens, n0: a coefficient to represent a refractive index at the vertex of the object-side surface of the GRIN lens, n1: a coefficient for the first-order term for z, n2: a coefficient for the second-order term for z.

In each embodiment the refractive index distribution of the GRIN lens is defined by presenting the coefficients n0, n1, and n for the d-line (λ=587.6 nm), the C-line (λ=656.3 nm), and the F-line (λ=486.1 nm).

TABLE 3-1

| f = 180 mm |
| FNO = 2.8 |

| | r | d | ν | n |
|---|---|---|---|---|
| 1 | 118.856 | 9.64 | 70.1 | 1.51860 |
| 2 | −269.127 | 0.10 | | |
| 3 | 86.856 | 9.47 | 82.6 | 1.49782 |
| 4 | −407.592 | 1.82 | | |
| 5 | −264.685 | 3.28 | 35.2 | 1.74950 |
| 6 | 175.974 | 31.44 | | |
| 7 | 3280.385 | 4.60 | 23.0 | 1.86074 |
| 8 | −283.296 | 3.60 | 52.3 | 1.74810 |
| 9 | 120.435 | 30.42 | | |
| 10 | 201.211 | 5.18 | 39.8 | 1.86994 |
| 11 | −65.372 | 0.50 | | |
| 12 | −62.386 | 2.10 | 40.8 | 1.58144 |
| 13 | 47.714 | 3.00 | | |
| 14 | 68.247 | 2.95 | | (GRIN lens) |
| 15 | 230.918 | Bf = 81.95 | | |

(Data on index distribution)

| | n0 | n1 | n2 |
|---|---|---|---|
| d-line | 1.74809 | −0.3025 × 10⁻² | −0.2354 × 10⁻² |
| C-line | 1.74376 | −0.3065 × 10⁻² | −0.2624 × 10⁻² |
| F-line | 1.75806 | −0.3030 × 10⁻² | −0.1612 × 10⁻² |

(Correspondent values to the conditions)

| (13) | |ff/f| = | 3.00 |
|---|---|---|
| (14) | (rb + ra)/(rb − ra) = | 1.84 |
| (15) | φ3an/φ3ap = | −1.24 |
| (16) | |f3a/f| = | 1.61 |
| (17) | r1/r2 = | 1.05 |
| (18) | r3/r4 = | 0.699 |

FIGS. 26A–26D are aberration diagrams to show aberrations in the infinity focus state of the ninth embodiment. FIGS. 27A–27G are aberration diagrams to show a comparison between lateral aberration before shake-preventing correction (before decentration) and lateral aberration upon shake-preventing correction (after decentration) in the infinity focus state of the ninth embodiment.

In the aberration diagrams of FIGS. 26A–26D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 27A–27G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 10

Figure 28:
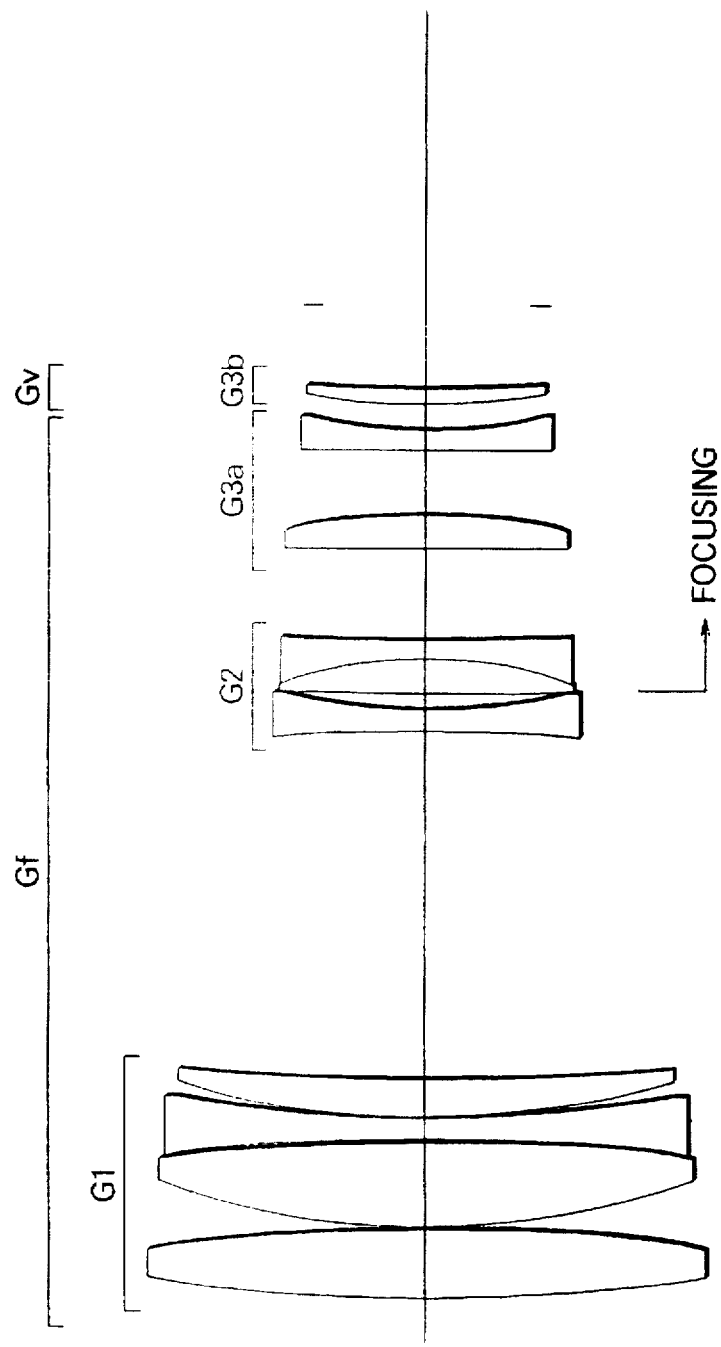
FIG. 28 is a drawing to show a lens layout of a shake-preventing correction optical system according to the tenth embodiment of the present invention.

FIG. 28 is a drawing to show a lens layout of the shake-preventing correction optical system according to the tenth embodiment of the present invention.

The shake-preventing correction optical system as shown is composed of, in order from the object side, the first lens unit G1 consisting of a biconvex lens, a biconvex lens, a biconcave lens, and a positive meniscus lens with a convex surface opposed to the object side, the focusing lens unit G2 consisting of a biconcave lens and a cemented lens of a biconvex lens and a biconcave lens, the correction lens unit G3a consisting of a biconvex lens and a negative meniscus lens with a convex surface opposed to the object side, and the decentering lens unit G3b consisting of a positive meniscus GRIN lens with a concave surface opposed to the image side.

An aperture stop is disposed on the image side of the decentering lens unit G3b.

In Table 3-2 below there are listed values of specifications of Embodiment 10 of the present invention. In Table 3-2, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 3-2 f = 300 mm
FNO = 4.0

| | r | d | ν | n |
|---|---|---|---|---|
| 1 | 219.790 | 9.69 | 70.1 | 1.51860 |
| 2 | −302.099 | 0.20 | | |
| 3 | 99.340 | 12.11 | 82.6 | 1.49782 |
| 4 | −336.767 | 0.50 | | |
| 5 | −311.727 | 2.80 | 35.2 | 1.74950 |
| 6 | 169.730 | 0.50 | | |
| 7 | 116.503 | 5.37 | 70.1 | 1.51860 |
| 8 | 359.623 | 49.06 | | |
| 9 | −329.233 | 2.80 | 45.1 | 1.74400 |
| 10 | 75.879 | 2.39 | | |
| 11 | 323.285 | 5.27 | 27.6 | 1.75520 |
| 12 | −61.140 | 2.80 | 52.3 | 1.74810 |
| 13 | 376.324 | 13.29 | | |
| 14 | 17491.536 | 4.56 | 52.3 | 1.74810 |
| 15 | −88.973 | 9.11 | | |
| 16 | 1884.297 | 2.64 | 33.8 | 1.64831 |
| 17 | 74.822 | 3.53 | | |
| 18 | 84.706 | 2.20 | | (GRIN lens) |
| 19 | 189.092 | Bf = 126.17 | | |

TABLE 3-2-continued f = 300 mm
FNO = 4.0

(Data on index distribution)

| | n0 | n1 | n2 |
|---|---|---|---|
| d-line | 1.65160 | −0.19829 × 10⁻² | 0.50090 × 10⁻³ |
| C-line | 1.64821 | −0.24844 × 10⁻² | 0.44026 × 10⁻³ |
| F-line | 1.65934 | −0.15933 × 10⁻² | 0.67549 × 10⁻³ |

(Correspondent values to the conditions)

| (13) | lff/fl = | 2.23 |
|---|---|---|
| (14) | (rb + ra)/(rb − ra) = | 2.62 |
| (15) | φ3an/φ3ap = | −0.984 |
| (16) | lf3a/fl = | 3.73 |
| (17) | r1/r2 = | −0.0472 |
| (18) | r3/r4 = | 0.883 |

FIGS. 29A–29D are aberration diagrams to show aberrations in the infinity focus state of the tenth embodiment. FIGS. 30A–30G are aberration diagrams to show a comparison between lateral aberration before shake-preventing correction and lateral aberration upon shake-preventing correction in the infinity focus state of the tenth embodiment.

In each of the aberration diagrams of FIGS. 29A–29D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 30A–30G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 11

Figure 31:
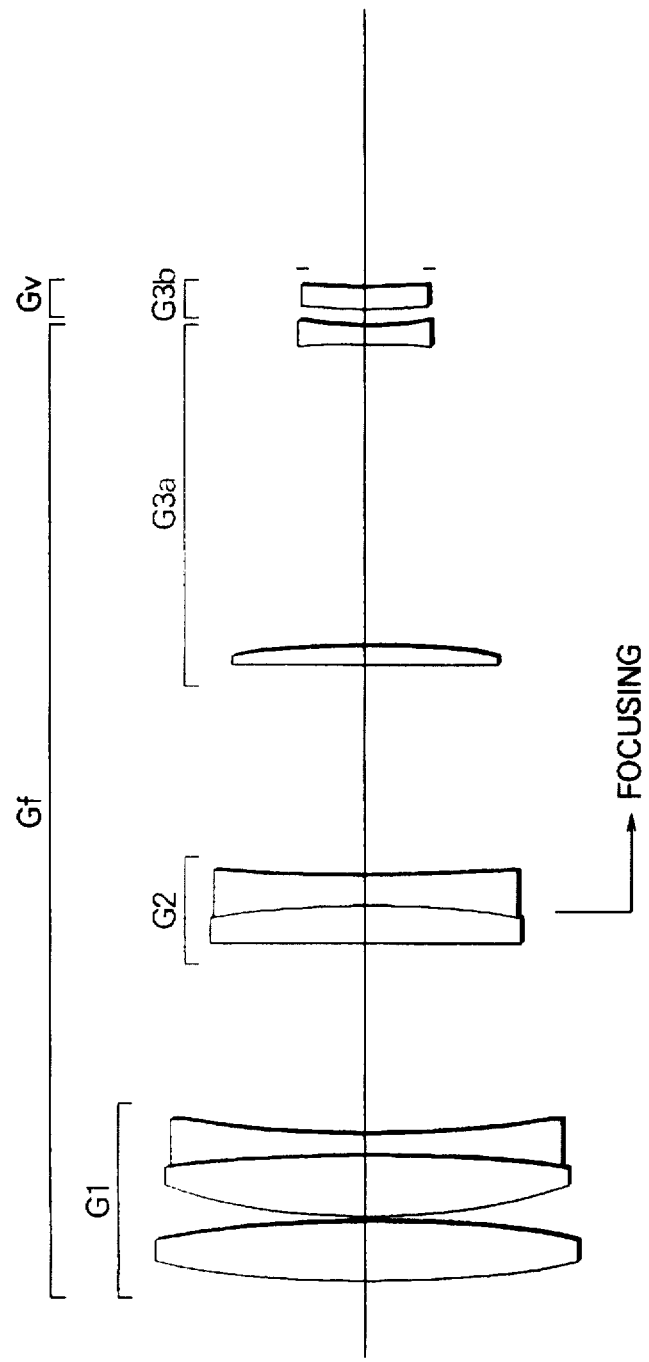
FIG. 31 is a drawing to show a lens layout of a shake-preventing correction optical system according to the eleventh embodiment of the present invention.

FIG. 31 is a drawing to show a lens layout of the shake-preventing correction optical system according to the eleventh embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a negative cemented lens of a biconvex lens and a biconcave lens, the correction lens unit G3a consisting of a biconvex lens and a biconcave lens, and the decentering lens unit G3b consisting of a positive meniscus GRIN lens with a concave surface opposed to the image side.

An aperture stop is disposed on the image side of the decentering lens unit G3b.

In Table 3-3 below there are listed values of specifications of Embodiment 11 of the present invention. In Table 3-3, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and ν refractive indices and Abbe numbers for the d-line (λ=587.6 nm).

TABLE 3-3 f = 400 mm
FNO = 5.6

| | r | d | v | n |
|---|---|---|---|---|
| 1 | 175.223 | 9.87 | 70.1 | 1.51860 |
| 2 | −283.051 | 1.01 | | |
| 3 | 104.824 | 11.46 | 82.6 | 1.49782 |
| 4 | −273.045 | 0.50 | | |
| 5 | −250.517 | 3.06 | 35.2 | 1.74950 |
| 6 | 185.172 | 33.75 | | |
| 7 | 1727.408 | 6.63 | 30.1 | 1.69895 |
| 8 | −177.220 | 4.87 | 43.3 | 1.84042 |
| 9 | 252.580 | 38.24 | | |
| 10 | 810.723 | 3.46 | 28.6 | 1.79504 |
| 11 | −185.502 | 53.51 | | |
| 12 | −367.434 | 3.02 | 49.4 | 1.77279 |
| 13 | 57.585 | 3.00 | | |
| 14 | 75.296 | 4.50 | | (GRIN lens) |
| 15 | 304.401 | Bf = 118.093 | | |

(Data on index distribution)

| | n0 | n1 | n2 |
|---|---|---|---|
| d-line | 1.65160 | −0.178 × 10$^{-2}$ | 0.614 × 10$^{-2}$ |
| C-line | 1.64821 | −0.178 × 10$^{-2}$ | 0.602 × 10$^{-2}$ |
| F-line | 1.65934 | −0.178 × 10$^{-2}$ | 0.635 × 10$^{-2}$ |

(Correspondent values to the conditions)

| | | |
|---|---|---|
| (13) | lff/fl = | 4.06 |
| (14) | (rb + ra)/(rb − ra) = | 1.66 |
| (15) | φ3an/φ3ap = | −2.96 |
| (16) | lf3a/fl = | 0.432 |
| (17) | r1/r2 = | 0.505 |
| (18) | r3/r4 = | 0.765 |

FIGS. 32A–32D are aberration diagrams to show aberrations in the infinity focus state of the eleventh embodiment. FIGS. 33A–33G are aberration diagrams to show a comparison between lateral aberration before shake-preventing correction and lateral aberration upon shake-preventing correction in the infinity focus state of the eleventh embodiment.

In the aberration diagrams of FIGS. 32A–32D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 33A–33G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

Embodiment 12

Figure 34:
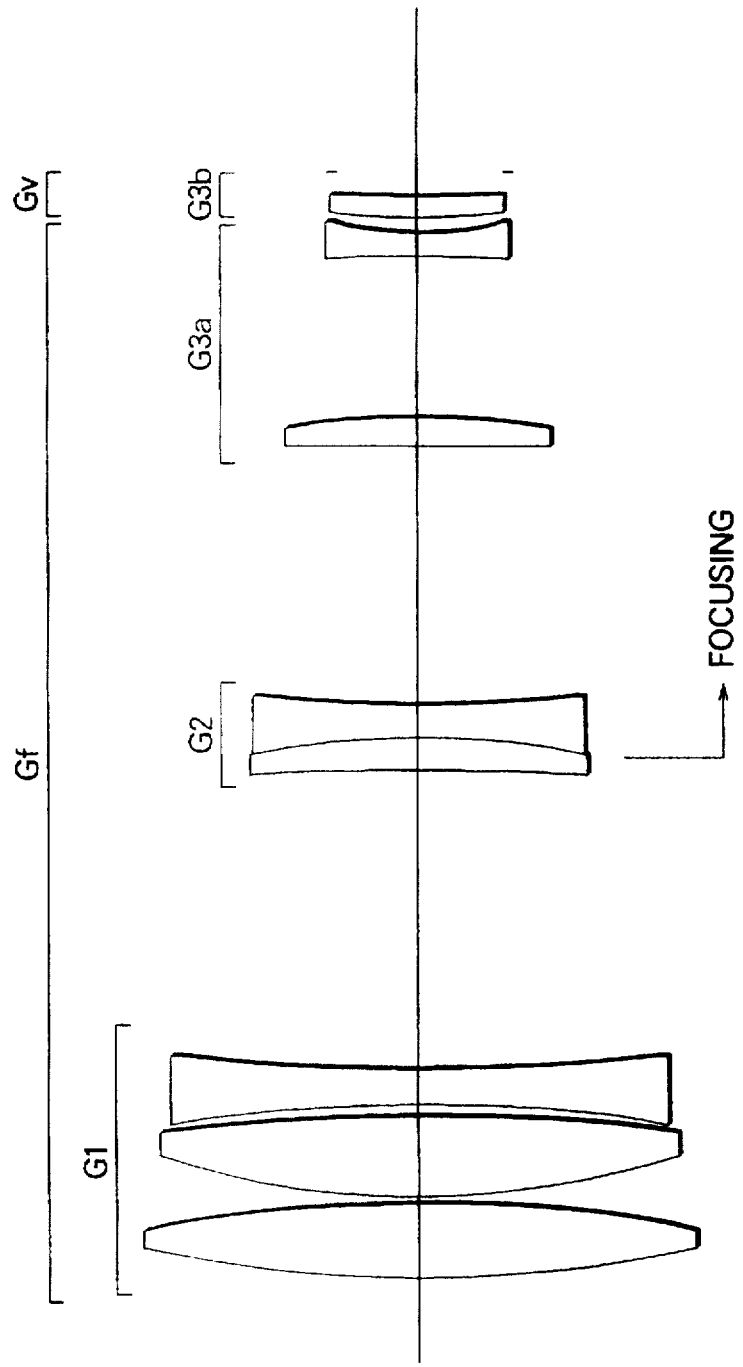
FIG. 34 is a drawing to show a lens layout of a shake-preventing correction optical system according to the twelfth embodiment of the present invention.

FIG. 34 is a drawing to show a lens layout of the shake-preventing correction optical system according to the twelfth embodiment of the present invention.

The shake-preventing correction optical system as shown is composed of, in order from the object side, the first lens unit G1 consisting of a biconvex lens, a biconvex lens, and a biconcave lens, the focusing lens unit G2 consisting of a negative cemented lens of a positive meniscus lens with a concave surface opposed to the object side and a biconcave lens, the correction lens unit G3a consisting of a biconvex lens and a biconcave lens, and the decentering lens unit G3b consisting of a positive meniscus GRIN lens with a concave surface opposed to the image side.

An aperture stop is disposed on the image side of the decentering lens unit G3b.

In Table 3-4 below there are listed values of specifications of Embodiment 12 of the present invention. In Table 3-4, f represents the focal length, $F_{NO}$ the F-number, and Bf the back focus.

Further, left-end numerals indicate orders of lens surfaces from the object side, r radii of curvature of the lens surfaces, d surface separations between the lens surfaces, and n and v refractive indices and Abbe numbers for the d-line (λ=587.6 nm).

TABLE 3-4 f = 600 mm
FNO = 5.6

| | r | d | v | n |
|---|---|---|---|---|
| 1 | 220.265 | 15.30 | 82.6 | 1.49782 |
| 2 | −306.094 | 1.29 | | |
| 3 | 154.295 | 16.30 | 82.6 | 1.49782 |
| 4 | −499.490 | 2.03 | | |
| 5 | −354.340 | 7.12 | 35.2 | 1.74950 |
| 6 | 336.484 | 61.28 | | |
| 7 | −1184.505 | 6.65 | 27.6 | 1.74077 |
| 8 | −190.430 | 6.32 | 49.4 | 1.77279 |
| 9 | 268.070 | 52.61 | | |
| 10 | 1711.969 | 6.00 | 30.1 | 1.69895 |
| 11 | −178.768 | 33.09 | | |
| 12 | −650.186 | 4.93 | 49.4 | 1.77279 |
| 13 | 78.170 | 3.00 | | |
| 14 | 126.671 | 4.32 | | (GRIN lens) |
| 15 | 383.107 | Bf = 189.76 | | |

(Data on index distribution)

| | n0 | n1 | n2 |
|---|---|---|---|
| d-line | 1.74809 | −0.5945 × 10$^{-3}$ | 0.813 × 10$^{-3}$ |
| C-line | 1.74376 | −0.8034 × 10$^{-3}$ | 0.669 × 10$^{-3}$ |
| F-line | 1.75806 | −0.6618 × 10$^{-3}$ | 0.1112 × 10$^{-2}$ |

(Correspondent values to the conditions)

| | | |
|---|---|---|
| (13) | lff/fl = | 4.24 |
| (14) | (rb + ra)/(rb − ra) = | 1.99 |
| (15) | φ3an/φ3ap = | −2.58 |
| (16) | lf3a/fl = | 0.328 |
| (17) | r1/r2 = | 0.275 |
| (18) | r3/r4 = | 0.617 |

FIGS. 35A–35D are aberration diagrams to show aberrations in the infinity focus state of the twelfth embodiment. FIGS. 36A–36G are aberration diagrams to show a comparison between lateral aberration before shake-preventing correction and lateral aberration upon shake-preventing correction in the infinity focus state of the twelfth embodiment.

In the aberration diagrams of FIGS. 35A–35D, $F_{NO}$ represents the F-number, Y the image height, D the d-line (λ=587.6 nm), and G the g-line (λ=435.8 nm). In the aberration diagram to show astigmatism, the solid line indicates the sagittal image surface while the dashed line the meridional image surface. Further, in the aberration diagram to show spherical aberration, the dashed line shows the sine condition.

In each of the lateral aberration diagrams of FIGS. 36A–36G, the solid line represents the lateral aberration before shake-preventing correction while the dashed line the lateral aberration upon shake-preventing correction.

As apparent from the aberration diagrams, the present embodiment is well corrected for various aberrations including those upon shake-preventing correction.

As explained above, the present invention can realize the shake-preventing correction optical system having the decentering lens unit of the minimum number of constituent lens and having good imaging performance even upon shake-preventing correction.

Also, the present invention employs the GRIN lens for the decentering lens unit to decrease the size and the weight, thereby enabling to decrease the load on the drive unit for shake-preventing correction.

Further, the shake-preventing correction optical system of the present invention can be arranged as a tracking apparatus for performing such framing that a specific subject is always located at a predetermined place.

Next, in the present invention, an inner focus type telephoto lens comprises in order from the object side a first lens unit G1 having a positive refractive power, a second lens unit G2 having a negative refractive power, and a third lens unit G3 having a positive refractive power, wherein the first lens unit G1 and the second lens unit G2 compose a nearly afocal system and wherein the second lens unit G2 is moved along the optical axis to effect focusing to a near object, wherein the first lens unit G1 has in order from the object side a positive lens component L11, a positive lens component L12, and a negative lens component L13, wherein the second lens unit G2 has in order from the object side a positive lens component L21, and a negative lens component L22, wherein the third lens unit G3 has in order from the object side a positive lens component L31, a negative lens component L32, a positive lens component L33, and a negative lens component L34, and wherein when f1 is a focal length of the first lens unit G1, f2 a focal length of the second lens unit G2, F a focal length of the total lens system, Ra a radius of curvature of an object-side surface of the positive lens component L11, and Rb a radius of curvature of an object-side surface of the positive lens component L12, the following conditions are satisfied:

$$0.40 < f1/F < 0.73$$

$$-1.90 < f1/f2 < -1.40$$

$$1.3 < Ra/Rb < 3.1.$$

In a preferred embodiment of the present invention, the second lens unit G2 comprises at least one biconcave lens, and when Rc is a radius of curvature of an object-side surface of the positive lens component L21 and Rd a radius of curvature of an image-side surface of the positive lens component L21, the following condition is satisfied:

$$-3.5 < (Rd+Rc)/(Rd-Rc) < -0.3.$$

The telephoto lens of the present invention has the basic configuration consisting of three groups being positive, negative, and positive, wherein the first lens unit G1 and second lens unit G2 compose a nearly afocal system. Namely, the focus position of the first lens unit G1 is made coincident with the focus position of the second lens unit G2 so as to compose the nearly afocal system, whereby light from an object at infinity is incident nearly in parallel with the optical axis into the third lens unit G3.

In performing focusing to a near object, the focus position of the second lens unit G2 is adjusted to a position of an image point of the near object formed by the first lens unit G1 so as to maintain the nearly afocal system of the first lens unit G1 and second lens unit G2, so that the second lens unit G2 moves toward the image side in performing focusing to the near object. The above focusing operation keeps rays incident to the third lens unit G3 always substantially parallel with the optical axis.

Concerning this focusing, the following problem may occur with lenses for AF (autofocus): if the second lens unit G2 as being the focusing lens unit has a large amount of movement and heavy weight, a great load is exerted on the autofocus driving motor and the size of the focusing drive mechanism increases.

It is generally known that increasing the refractive powers (powers) of the respective lens units can decrease the focusing movement amount of the second lens unit G2. However, excessive increases of the refractive powers of the respective lens units would undesirably give rise to excessive aberrations in the respective lens units.

Thus, the telephoto lens of the present invention is based on finding of optimum conditions as to the power arrangement of the respective lens units and the shape and refractive index of each lens in order to control the movement amount and the weight of the second lens unit G2 being the focusing lens unit so as to be low while maintaining good imaging performance.

Equations for the respective conditions of the present invention will be explained.

The telephoto lens of the present invention satisfies the following conditions of Equations (19) to (21).

$$0.40 < f1/F < 0.73 \tag{19}$$

$$-1.90 < f1/f2 < -1.40 \tag{20}$$

$$1.3 < Ra/Rb < 3.1 \tag{21}$$

In the above equations, f1: the focal length of the first lens unit G1, f2: the focal length of the second lens unit G2, F: the focal length of the total lens system, Ra: the radius of curvature of the object-side surface of the positive lens component L11, Rb: the radius of curvature of the object-side surface of the positive lens component L12.

The condition of Equation (19) defines an appropriate range of a ratio of the focal length f1 of the first lens unit G1 to the focal length F of the total lens system.

Below the lower limit of the condition of Equation (19), the refractive power of the first lens unit G1 becomes too strong, which would result in not correcting aberration in the first lens unit G1 sufficiently so as to give rise to great spherical aberration. Further, it becomes too hard to construct the second lens unit G2 and third lens unit G3 from a small number of lens components, while correcting the aberration thus appearing in the first lens unit G1.

Conversely, above the upper limit of the condition of Equation (19), the refractive power of the first lens unit G1 becomes too small, which undesirably increases the total lens length and the focusing movement amount.

The condition of Equation (20) defines an appropriate range of a ratio of the focal length f1 of the first lens unit G1 to the focal length f2 of the second lens unit G2. Namely, it is a condition for achieving a proper power arrangement between the first lens unit G1 and the second lens unit G2, which is a condition for determining the refractive power of the second lens unit G2 relative to the refractive power of the first lens unit G1 determined based on the condition of Equation (19).

Below the lower limit of the condition of Equation (20), the ratio of the refractive power of the second lens unit G2 to that of the first lens unit G1 becomes too large, which will make the refractive power of the second lens unit G2 too strong, resulting in making difficult correction for aberration in the second lens unit G2, particularly correction for spherical aberration.

Conversely, above the upper limit of the condition of Equation (20), the ratio of the refractive power of the second lens unit G2 to that of the first lens unit G1 becomes too small, thus making the refractive power of the second lens unit G2 weak. As described above, that the first lens unit G1 and second lens unit G2 compose the substantially afocal system means that their focus positions are coincident with each other. Accordingly, the second lens unit G2 becomes located closer to the object as the refractive power of the second lens unit G2 becomes weaker, resulting in increasing the effective diameter of the second lens unit G2. Namely, as the effective diameter of the second lens unit G2 as being the focusing lens unit increases, the weight thereof also increases, which is not preferred.

The condition of Equation (21) defines an appropriate range of a ratio of the radius of curvature Ra of the object-side surface (Ra surface) of the positive lens component L11 to the radius of curvature Rb of the object-side surface (Rb surface) of the positive lens component L12 having a positive strong refractive power in order to decrease spherical aberration appearing in the first lens unit G1 when the first lens unit G1 is arranged to have a positive strong refractive power.

Here, in order to decrease occurrence of spherical aberration in the Ra surface or the Rb surface with the positive strong refractive power as much as possible, each refracting surface is desired to have a shape close to the aplanatic surface. Thus, a preferred power arrangement is that the Rb surface has a positive refractive power stronger than that of the Ra surface.

However, above the upper limit of the condition of Equation (21) the refractive power of the Rb surface becomes too strong. Inversely, below the lower limit of the condition of Equation (21), the refractive power of the Ra surface becomes too strong. Namely, outside the range defined by the upper limit and the lower limit of the condition of Equation (21), spherical aberration increases, which is not preferred.

In the present invention the focusing movement amount is decreased by arranging the optical system so as to satisfy the above conditions.

Next, in order to decrease the weight of the focusing lens unit, that is, in order to compose the focusing lens unit of a smaller number of constituent lens components, it is preferred to construct the second lens unit G2 and third lens unit G3 as follows.

First, in order to decrease aberration change during focusing by the second lens unit G2, it is preferred to provide the second lens unit G2 having the negative refractive power with a biconcave lens. In this case, converging rays incident from the first lens unit G1 to the second lens unit G2 are refracted near the minimum angle of deflection in the second lens unit G2 to emerge therefrom, whereby the aberration change due to a change of object distance can be well corrected.

Next, noting the positive lens component L21 disposed in the second lens unit G2, it is desired to satisfy the following condition of Equation (22).

$$-3.5 < (Rd+Rc)/(Rd-Rc) < -0.3 \tag{22}$$

In the above equation,

Rc: the radius of curvature of the object-side surface of the positive lens component L21.

Rd: the radius of curvature of the image-side surface of the positive lens component L21.

The condition of Equation (22) defines an appropriate range of the shape factor of the positive lens component L21 in the second lens unit G2.

Below the lower limit of the condition of Equation (22), the object-side surface of the positive lens component L21 becomes a concave surface and the radius of curvature Rc thereof becomes too small, causing great spherical aberration on the positive side (over side). Further, a change of spherical aberration becomes great upon focusing to a near object so as to degrade the imaging performance, which is not preferred.

Inversely, above the upper limit of the condition of Equation (22), great spherical aberration appears on the negative side (under side), which is not preferred.

Also, in order to decrease the aberration change upon focusing and to effect good correction for chromatic aberration in the second lens unit G2, the positive lens component L21 and the negative lens component L22 in the second lens unit G2 are preferably arranged to compose a cemented lens and to satisfy the following condition of Equation (23).

$$|Rd(N21-N22)/(v21-v22)| < 1.1 \tag{23}$$

In the above equation,

N21: a refractive index of the positive lens component L21.

N22: a refractive index of the negative lens component L22.

v21: a dispersion value of the positive lens component L21.

v22: a dispersion value of the negative lens component L22.

Here, the above refractive powers and dispersion values are those for the d-line ($\lambda$=587.6 nm).

The condition of Equation (23) is a condition for decreasing the aberration change due to focusing and achieving correction for chromatic aberration in the cemented lens of the positive lens component L21 and negative lens component L22 in the second lens unit G2.

Above the upper limit of the condition of Equation (23), the sine condition is likely to be over, thus easily causing coma. Also, satisfying the condition of Equation (23), aberrations including chromatic aberration can be corrected in a good balance, and occurrence of higher-order aberrations can be effectively suppressed.

In the present invention the third lens unit G3 itself has the positive refractive power as a whole in order to correct aberrations that the second lens unit G2 leaves, by the third lens unit G3. The third lens unit G3, however, has the negative lens component L32 having the negative strong refractive power.

It is preferred to locate the negative lens component L32 between the positive lens component L31 and the cemented lens composed of the positive lens component L33 and the negative lens component L34 and having a positive composite refractive power. When the power arrangement of the third lens unit G3 is determined as if to be a triplet of convex, concave, and convex lenses in this manner, aberrations not to be corrected by the second lens unit G2 can be well corrected while the third lens unit G3 is composed of a small number of lens components.

The above-described lens arrangement of the third lens unit G3 is most suitable for correction for spherical aberration, correction for coma, correction for chromatic aberration, etc. by a small number of lenses. If the cemented lens composed of the positive lens component L33 and the negative lens component L34 and having the positive composite refractive power, and the positive lens component L31 both are biconvex, occurrence of spherical aberration can be preferably controlled at low level.

In order to achieve better imaging performance, the following condition of Equation (24) is desired to be satisfied.

$$|Re/Rf|<3.9 \tag{24}$$

In the above equation,

Re: a radius of curvature of an object-side surface of the positive lens component L31, Rf: a radius of curvature of an image-side surface of the negative lens component L34.

The condition of Equation (24) defines an appropriate range of a ratio of the radius of curvature of the object-side surface of the positive lens component L31 and the radius of curvature of the image-side surface of the negative lens component L34.

Outside the range of the condition of Equation (24), the sine condition is likely to be over so as to cause coma, which degrades the imaging performance. Thus, it is not preferred.

In order to achieve better imaging performance, the following conditions of Equations (25) and (26) are desired to be satisfied.

$$|N31-N32|<0.2 \tag{25}$$

$$6<v32\text{"}v31 \tag{26}$$

In the above equations,

N31: a refractive index of the positive lens component L31,

N32: a refractive index of the negative lens component L32, v31: a dispersion value of the positive lens component L31, v32: a dispersion value of the negative lens component L32.

Here, the above refractive powers and dispersion values are those for the d-line (λ=587.6 nm).

The conditions of Equations (25) and (26) define characteristics of optic materials for the positive lens component L31 and the negative lens component L32.

When the positive lens component L31 and negative lens component L32 in the third lens unit G3 are made of the respective optic materials to satisfy the conditions of Equations (25) and (26), the aberrations can be corrected in a good balance and particularly, occurrence of higher-order aberrations can be effectively prevented.

Embodiments of the present invention will be explained by reference to the accompanying drawings.

Embodiment 13

Figure 37:
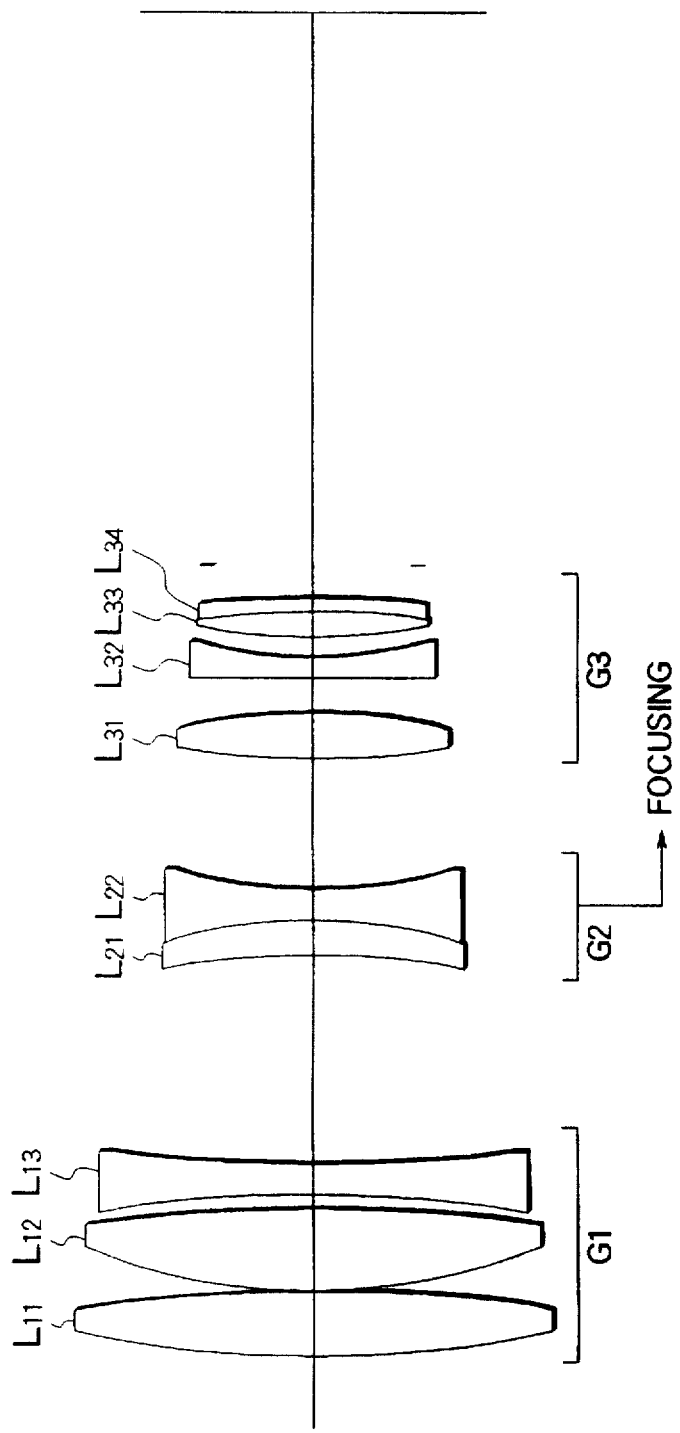
FIG. 37 is a drawing to show a lens layout of a telephoto lens according to the thirteenth embodiment of the present invention.

FIG. 37 is a drawing to show a lens layout of the telephoto lens according to the thirteenth embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a negative cemented lens of a positive meniscus lens L21 with a concave surface opposed to the object side and a biconcave lens L22, and the third lens unit G3 consisting of a biconvex lens L31, a negative meniscus lens L32 with a convex surface opposed to the object side, and a cemented biconvex lens of a biconvex lens L33 and a negative meniscus lens L34 with a concave surface opposed to the object side.

An aperture stop is disposed on the image side of the third lens unit G3. Further, the second lens unit G2 is moved toward the image side to effect focusing to a near object.

In Table 4-1 next there are listed values of specifications of Embodiment 13 of the present invention. In Table 4-1, F represents the focal length, $F_{NO}$ the F-number, Bf the back focus, and β the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line (λ=587.6 nm).

TABLE 4-1

| | f = 180 mm  FNO = 2.8 | | | |
|---|---|---|---|---|
| | r | d | v | n |
| 1 | 131.236 | 8.99 | 70.1 | 1.51860 |
| 2 | −287.235 | 0.10 | | |
| 3 | 79.377 | 11.47 | 82.6 | 1.49782 |
| 4 | −312.808 | 1.74 | | |
| 5 | −241.386 | 4.37 | 32.2 | 1.67270 |
| 6 | 174.815 | (d6 = variable) | | |
| 7 | −129.438 | 5.00 | 27.6 | 1.75520 |
| 8 | −70.818 | 4.00 | 64.1 | 1.51680 |
| 9 | 62.138 | (d9 = variable) | | |
| 10 | 101.249 | 6.50 | 64.1 | 1.51680 |
| 11 | −94.555 | 5.29 | | |
| 12 | 1864.317 | 2.63 | 70.2 | 1.48749 |
| 13 | 50.151 | 3.00 | | |
| 14 | 75.627 | 3.52 | 64.1 | 1.51680 |
| 15 | −136.574 | 1.61 | 27.6 | 1.75520 |
| 16 | −540.094 | Bf | | |

| (Variable separations upon focusing) | |
|---|---|
| F = 179.9997 | β = −0.1491 |
| D0   ∞ | 1310.0235 |
| d6   29.9307 | 44.9976 |
| d9   18.9314 | 3.8646 |
| Bf   82.8904 | 82.8904 |

| (Correspondent values to the conditions) | |
|---|---|
| (19) f1/F = | 0.728 |
| (20) f1/f2 = | −1.431 |
| (21) Ra/Rb = | 1.653 |
| (22) (Rd + Rc)/(Rd − Rc) = | −3.416 |
| (23) |Rd (N21 − N22)/(v21 − v22)| = | 0.463 |
| (24) |Re/Rf| = | 0.187 |
| (25) |N31 − N32| = | 0.02931 |
| (26) v32 − v31 = | 6.1 |

FIGS. 38A–38I are aberration diagrams to show aberrations in the infinity focus state of the thirteenth embodiment. FIGS. 39A–39I are aberration diagrams to show aberrations in a near shooting state (image magnification β=−0.1491) of the thirteenth embodiment.

In each aberration diagram, $F_{NO}$ represents F-number, NA the numerical aperture, Y the image height, D the d-line ($\lambda$=587.6 nm), and G the g-line ($\lambda$=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 14

Figure 40:
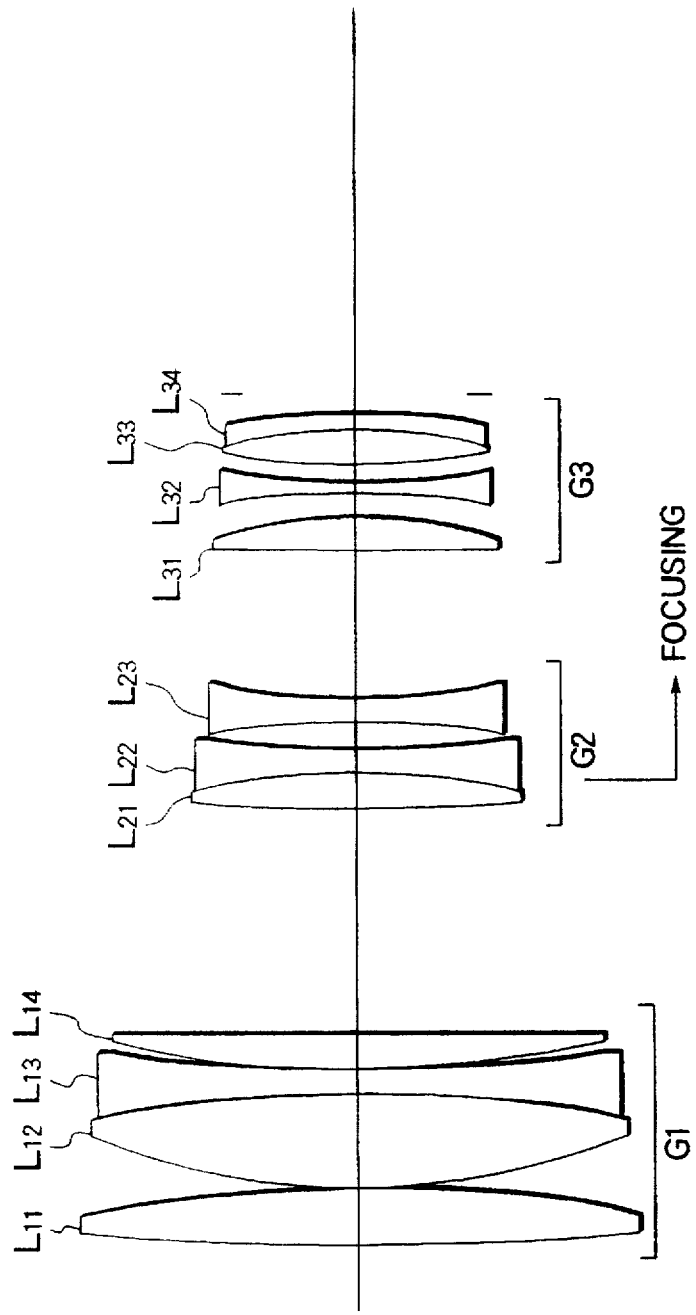
FIG. 40 is a drawing to show a lens layout of a telephoto lens according to the fourteenth embodiment of the present invention.

FIG. 40 is a drawing to show a lens layout of the telephoto lens according to the fourteenth embodiment of the present invention.

The telephoto lens as shown is composed of, in order from the object side, the first lens unit G1 consisting of a biconvex lens Li, a biconvex lens L12, a biconcave lens L13, and a positive meniscus lens L14 with a convex surface opposed to the object side, the second lens unit G2 consisting of a cemented lens of a biconvex lens L21 and a biconcave lens L22 and a biconcave lens L23, and the third lens unit G3 consisting of a biconvex lens L31, a biconcave lens L32, and a cemented biconvex lens of a biconvex lens L33 and a negative meniscus lens L34 with a concave surface opposed to the object side.

An aperture stop is disposed on the image side of the third lens unit G3. Further, the second lens unit G2 is moved toward the image side to effect focusing to a near object.

In Table 4-2 next there are listed values of specifications of Embodiment 14 of the present invention. In Table 4-2, F represents the focal length, $F_{NO}$ the F-number, Bf the back focus, and $\beta$ the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line ($\lambda$=587.6 nm).

TABLE 4-2 f = 300 mm
FNO = 4.0

| | r | d | v | n |
|---|---|---|---|---|
| 1 | 261.773 | 8.09 | 70.1 | 1.51860 |
| 2 | -262.164 | 0.10 | | |
| 3 | 84.529 | 13.17 | 82.6 | 1.49782 |
| 4 | -306.717 | 0.50 | | |
| 5 | -295.714 | 3.20 | 31.7 | 1.75692 |
| 6 | 172.404 | 0.10 | | |
| 7 | 117.999 | 5.19 | 70.1 | 1.51860 |
| 8 | 608.548 | (d8 = variable) | | |
| 9 | 279.165 | 4.70 | 27.6 | 1.74077 |
| 10 | -109.631 | 3.20 | 58.5 | 1.65160 |
| 11 | 111.964 | 4.04 | | |
| 12 | -147.413 | 3.20 | 58.5 | 1.65160 |
| 13 | 73.784 | (d13 = variable) | | |
| 14 | 635.070 | 4.31 | 33.9 | 1.80384 |
| 15 | -79.026 | 3.35 | | |
| 16 | -147.727 | 1.52 | 40.4 | 1.60717 |
| 17 | 74.731 | 3.00 | | |
| 18 | 94.446 | 4.62 | 70.1 | 1.51860 |
| 19 | -74.498 | 2.00 | 33.9 | 1.80384 |
| 20 | -163.057 | Bf | | |

TABLE 4-2-continued f = 300 mm
FNO = 4.0

(Variable separations upon focusing)

| | F = 299.9912 | $\beta$ = -0.1405 |
|---|---|---|
| D0 | ∞ | 2245.0254 |
| d8 | 32.2062 | 39.2063 |
| d13 | 21.5311 | 14.5310 |
| Bf | 136.9522 | 136.9522 |

(Correspondent values to the conditions)

| (19) | f1/F = | 0.406 |
|---|---|---|
| (20) | f1/f2 = | -1.898 |
| (21) | Ra/Rb = | 3.097 |
| (22) | (Rd + Rc)/(Rd - Rc) = | -0.436 |
| (23) | |Rd (N21 - N22)/(v21 - v22)| = | 0.316 |
| (24) | |Re/Rf| = | 3.895 |
| (25) | |N31 - N32| = | 0.19667 |
| (26) | v32 - v31 = | 6.5 |

FIGS. 41A–41I are aberration diagrams to show aberrations in the infinity focus state of the fourteenth embodiment. FIGS. 42A–42I are aberration diagrams to show aberrations in a near shooting state (image magnification $\beta$=-0.1405) of the fourteenth embodiment.

In each aberration diagram, $F_{NO}$) represents F-number, NA the numerical aperture, Y the image height, D the d-line ($\lambda$=587.6 nm), and G the g-line ($\lambda$=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 15

Figure 43:
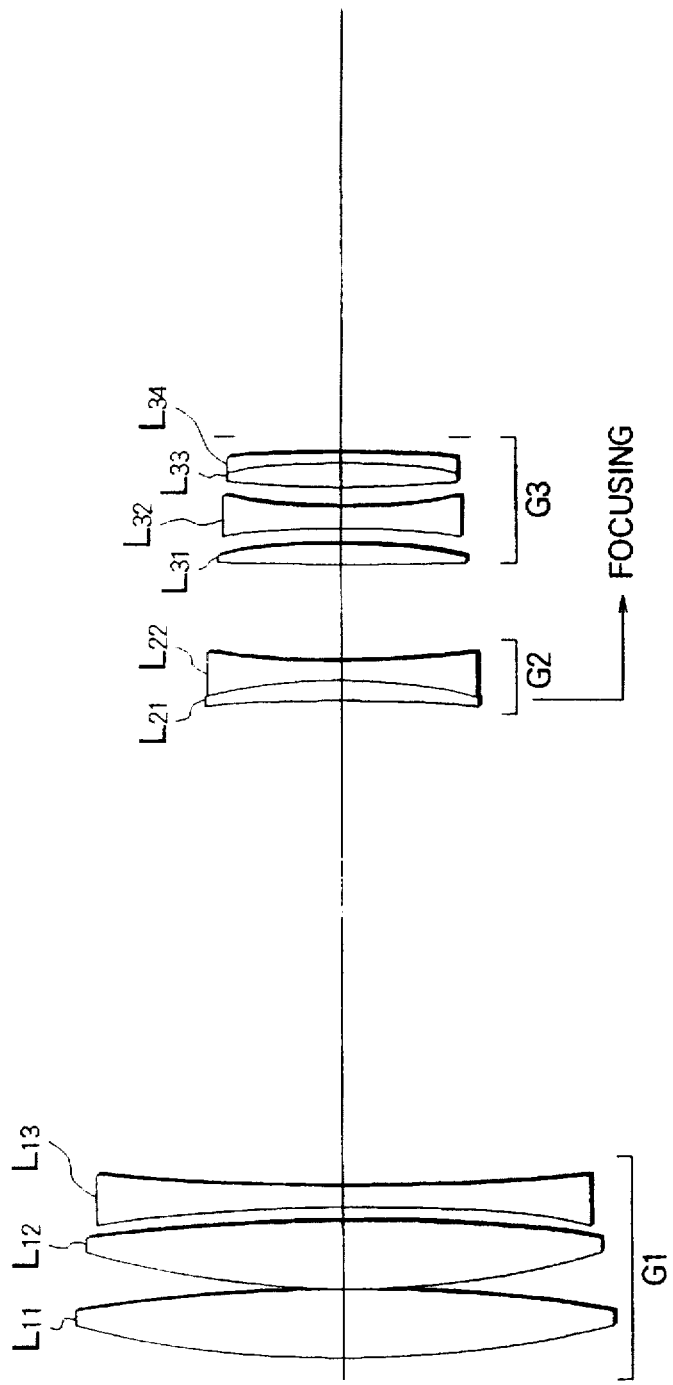
FIG. 43 is a drawing to show a lens layout of a telephoto lens according to the fifteenth embodiment of the present invention.

FIG. 43 is a drawing to show a lens layout of the telephoto lens according to the fifteenth embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a negative cemented lens of a positive meniscus lens L21 with a concave surface opposed to the object side and a biconcave lens L22, and the third lens unit G3 consisting of a biconvex lens L31, a biconcave lens L32, and a cemented biconvex lens of a biconvex lens L33 and a negative meniscus lens L34 with a concave surface opposed to the object side.

An aperture stop is disposed on the image side of the third lens unit G3. Further, the second lens unit G2 is moved toward the image side to effect focusing to a near object.

In Table 4-3 next there are listed values of specifications of Embodiment 15 of the present invention. In Table 4-3, F represents the focal length, $F_{NO}$ the F-number, Bf the back focus, and $\beta$ the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line ($\lambda$=587.6 nm).

TABLE 4-3

F = 400 mm
FNO = 5.6

| | r | d | ν | n |
|---|---|---|---|---|
| 1 | 145.879 | 9.17 | 70.1 | 1.51860 |
| 2 | −291.576 | 0.10 | | |
| 3 | 110.353 | 9.69 | 82.6 | 1.49782 |
| 4 | −324.784 | 1.88 | | |
| 5 | −264.169 | 2.80 | 35.2 | 1.74950 |
| 6 | 225.465 | (d6 = variable) | | |
| 7 | −313.637 | 2.80 | 27.6 | 1.74077 |
| 8 | −91.448 | 2.80 | 58.5 | 1.65160 |
| 9 | 97.799 | (d9 = variable) | | |
| 10 | 489.812 | 2.80 | 28.6 | 1.79504 |
| 11 | −96.891 | 2.09 | | |
| 12 | −134.540 | 2.80 | 40.4 | 1.60717 |
| 13 | 69.141 | 3.00 | | |
| 14 | 116.411 | 3.27 | 70.1 | 1.51860 |
| 15 | −106.519 | 1.66 | 35.2 | 1.74950 |
| 16 | −304.726 | Bf | | |

(Variable separations upon focusing)

| | F = 399.9889 | β = −0.1105 |
|---|---|---|
| D0 | ∞ | 3711.2441 |
| d6 | 69.0737 | 79.0117 |
| d9 | 13.9163 | 3.9783 |
| Bf | 167.0956 | 167.0956 |

(Correspondent values to the conditions)

| (19) | f1/F = | 0.443 |
|---|---|---|
| (20) | f1/f2 = | −1.432 |
| (21) | Ra/Rb = | 1.322 |
| (22) | (Rd + Rc)/(Rd − Rc) = | −1.823 |
| (23) | |Rd (N21 − N22)/(ν21 − ν22)| = | 0.264 |
| (24) | |Re/Rf| = | 1.607 |
| (25) | |N31 − N32| = | 0.18787 |
| (26) | ν32 − ν31 = | 11.8 |

FIGS. 44A–44I are aberration diagrams to show aberrations in the infinity focus state of the fifteenth embodiment. FIGS. 45A–45I are aberration diagrams to show aberrations in a near shooting state (image magnification β=−0.1105) of the fifteenth embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 16

Figure 46:
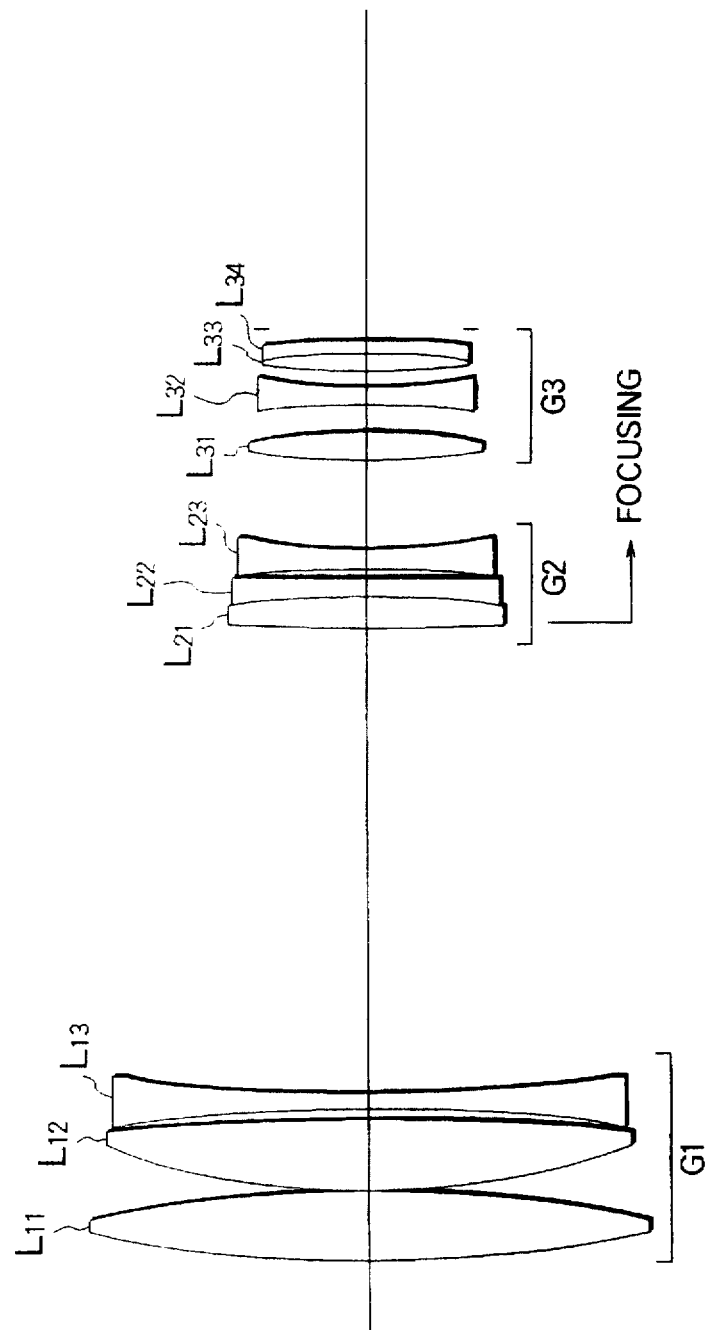
FIG. 46 is a drawing to show a lens layout of a telephoto lens according to the sixteenth embodiment of the present invention.

FIG. 46 is a drawing to show a lens layout of the telephoto lens according to the sixteenth embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a cemented lens of a biconvex lens L21 and a biconcave lens L22, and a biconcave lens L23, and the third lens unit G3 consisting of a biconvex lens L31, a biconcave lens L32, and a cemented biconvex lens of a biconvex lens L33 and a negative meniscus lens L34 with a concave surface opposed to the object side.

An aperture stop is disposed on the image side of the third lens unit G3. Further, the second lens unit G2 is moved toward the image side to effect focusing to a near object.

In Table 4-4 next there are listed values of specifications of Embodiment 16 of the present invention. In Table 4-4, F represents the focal length, $F_{NO}$ the F-number, Bf the back focus, and β the image magnification.

Further, left-end numerals indicate orders of respective lens surfaces from the object side, r radii of curvature of the respective lens surfaces, d surface separations between the lens surfaces, and n and ν refractive indices and dispersion values (Abbe numbers) for the d-line (λ=587.6 nm).

TABLE 4-4

F = 600 mm
FNO = 5.6

| | r | d | ν | n |
|---|---|---|---|---|
| 1 | 227.505 | 13.84 | 82.6 | 1.49782 |
| 2 | −328.696 | 0.20 | | |
| 3 | 138.373 | 14.46 | 82.6 | 1.49782 |
| 4 | −815.283 | 1.81 | | |
| 5 | −483.964 | 3.60 | 35.2 | 1.74950 |
| 6 | 293.956 | (d6 = variable) | | |
| 7 | 414.752 | 6.60 | 30.1 | 1.69895 |
| 8 | −200.977 | 3.60 | 64.1 | 1.51680 |
| 9 | 1905.091 | 1.66 | | |
| 10 | −312.220 | 3.60 | 55.6 | 1.69680 |
| 11 | 102.152 | (d11 = variable) | | |
| 12 | 231.238 | 5.41 | 29.5 | 1.71736 |
| 13 | −122.878 | 5.47 | | |
| 14 | −200.369 | 3.60 | 40.9 | 1.79631 |
| 15 | 92.946 | 3.00 | | |
| 16 | 128.828 | 3.75 | 70.1 | 1.51860 |
| 17 | −178.462 | 2.44 | 31.7 | 1.75692 |
| 18 | −573.770 | Bf | | |

(Variable separations upon focusing)

| | F = 600.0140 | β = −0.1342 |
|---|---|---|
| D0 | ∞ | 4589.9916 |
| d6 | 94.7998 | 109.7737 |
| d11 | 19.0937 | 4.1198 |
| Bf | 223.0686 | 223.0686 |

(Correspondent values to the conditions)

| (19) | f1/F = | 0.405 |
|---|---|---|
| (20) | f1/f2 = | −1.601 |
| (21) | Ra/Rb = | 1.644 |
| (22) | (Rd + Rc)/(Rd − Rc) = | −0.347 |
| (23) | |Rd (N21 − N22)/(ν21 − ν22)| = | 1.077 |
| (24) | |Re/Rf| = | 0.403 |
| (25) | |N31 − N32| = | 0.07895 |
| (26) | ν32 − ν31 = | 11.4 |

FIGS. 47A–47I are aberration diagrams to show aberrations in the infinity focus state of the sixteenth embodiment. FIGS. 48A–48I are aberration diagrams to show aberrations in a near shooting state (image magnification β=−0.1105) of the sixteenth embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

As explained above, the present invention can realize the inner focus type telephoto lens having the light-weight focusing lens unit, a small amount of focusing movement, and excellent imaging performance. Accordingly, the load can be decreased on the drive mechanism for focusing.

Next, in the present invention, another inner focus type telephoto lens comprises in order from the object side the first lens unit G1 having a positive refractive power, the second lens unit G2 having a negative refractive power, and the third lens unit G3 having a positive refractive power, wherein the first lens unit G1 and the second lens unit G2 compose a nearly afocal system and wherein the second lens unit G2 is moved along the optical axis to effect focusing to a near object, wherein the first lens unit G1 has in order from the object side a positive lens component L11, a positive lens component L12, and a negative lens component L13, wherein the second lens unit G2 has at least one positive lens component and at least one negative lens component, wherein the third lens unit G3 has in order from the object side a positive lens component L31, a negative lens component L32, and a positive lens component L33 at least one surface of which is aspherical, and wherein when f1 is a focal length of the first lens unit G1, f2 a focal length of the second lens unit G2, F a focal length of the total lens system, Ra a radius of curvature of an object-side surface of the positive lens component L11, and Rb a radius of curvature of an object-side surface of the positive lens component L12, the following conditions are satisfied:

$$0.41 < f1/F < 0.76$$

$$-2.26 < f1/f2 < -0.97$$

$$1.3 < Ra/Rb < 2.0.$$

In a preferred embodiment of the present invention, the second lens unit G2 comprises at least one biconcave lens, and when Rc is a radius of curvature of an object-side surface of the positive lens component in the second lens unit G2 and Rd a radius of curvature of an image-surface of the positive lens component in the second lens unit G2, the following condition is satisfied:

$$-3.2 < (Rd+Rc)/(Rd-Rc) < -0.8.$$

Equations for the respective conditions of the present invention will be explained.

The telephoto lens of the present invention satisfies the following conditions of Equations (27) to (29).

$$0.41 < f1/F < 0.76 \quad (27)$$

$$-2.26 < f1/f2 < -0.97 \quad (28)$$

$$1.3 < Ra/Rb < 2.0 \quad (29)$$

In the above equations, f1: the focal length of the first lens unit G1, f2: the focal length of the second lens unit G2, F: the focal length of the total lens system, Ra: the radius of curvature of the object-side surface of the positive lens component L11, Rb: the radius of curvature of the object-side surface of the positive lens component L12.

The condition of Equation (27) defines an appropriate range of a ratio of the focal length f1 of the first lens unit G1 to the focal length F of the total lens system.

Below the lower limit of the condition of Equation (27), the refractive power of the first lens unit G1 becomes too strong, which would result in not correcting aberration in the first lens unit G1 sufficiently so as to give rise to great spherical aberration. Further, it becomes too hard to construct the second lens unit G2 and third lens unit G3 from a small number of lens components, while correcting the aberration thus appearing in the first lens unit G1.

Conversely, above the upper limit of the condition of Equation (27), the refractive power of the first lens unit G1 becomes too small, which undesirably increases the total lens length and the focusing movement amount.

The condition of Equation (28) defines an appropriate range of a ratio of the focal length f1 of the first lens unit G1 to the focal length f2 of the second lens unit G2. Namely, it is a condition for achieving a proper power arrangement between the first lens unit G1 and the second lens unit G2, which is a condition for determining the refractive power of the second lens unit G2 relative to the refractive power of the first lens unit G1 determined based on the condition of Equation (27).

Below the lower limit of the condition of Equation (28), the ratio of the refractive power of the second lens unit G2 to that of the first lens unit G1 becomes too large, which will make the refractive power of the second lens unit G2 too strong, resulting in making difficult correction for aberration in the second lens unit G2, particularly correction for spherical aberration.

Conversely, above the upper limit of the condition of Equation (28), the ratio of the refractive power of the second lens unit G2 to that of the first lens unit G1 becomes too small, thus making the refractive power of the second lens unit G2 weak. As described above, that the first lens unit G1 and second lens unit G2 compose the substantially afocal system means that their focus positions are coincident with each other. Accordingly, the second lens unit G2 becomes located closer to the object as the refractive power of the second lens unit G2 becomes weaker, resulting in increasing the effective diameter of the second lens unit G2. Namely, as the effective diameter of the second lens unit G2 as being the focusing lens unit increases, the weight thereof also increases, which is not preferred.

The condition of Equation (29) defines an appropriate range of a ratio of the radius of curvature Ra of the object-side surface (Ra surface) of the positive lens component L11 to the radius of curvature Rb of the object-side surface (Rb surface) of the positive lens component L12 having a positive strong refractive power in order to decrease spherical aberration appearing in the first lens unit G1 when the first lens unit G1 is arranged to have a positive strong refractive power.

Here, in order to decrease occurrence of spherical aberration in the Ra surface or the Rb surface with the positive strong refractive power as much as possible, each refracting surface is desired to have a shape close to the aplanatic surface. Thus, a preferred power arrangement is that the Rb surface has a positive refractive power stronger than that of the Ra surface.

However, above the upper limit of the condition of Equation (29) the refractive power of the Rb surface becomes too strong. Inversely, below the lower limit of the condition of Equation (29), the refractive power of the Ra surface becomes too strong. Namely, outside the range defined by the upper limit and the lower limit of the condition of Equation (29), spherical aberration increases, which is not preferred.

In the present invention the focusing movement amount is decreased by arranging the optical system so as to satisfy the above conditions.

Next, in order to decrease the weight of the focusing lens unit, that is, in order to compose the focusing lens unit of a smaller number of constituent lens components, it is preferred to construct the second lens unit G2 and third lens unit G3 as follows.

First, in order to decrease aberration change during focusing by the second lens unit G2, it is preferred to provide the second lens unit G2 having the negative refractive power with a biconcave lens. In this case, converging rays incident from the first lens unit G1 to the second lens unit G2 are refracted near the minimum angle of deflection in the second lens unit G2 to emerge therefrom, whereby the aberration change due to a change of object distance can be well corrected.

Next, noting the positive lens component L21 disposed in the second lens unit G2, it is desired to satisfy the following condition of Equation (30).

$$-3.2 < (Rd+Rc)/(Rd-Rc) < -0.8 \tag{30}$$

In the above equation,

Rc: the radius of curvature of the object-side surface of the positive lens component in the second lens unit G2, Rd: the radius of curvature of the image-side surface of the positive lens component in the second lens unit G2.

The condition of Equation (30) defines an appropriate range of the shape factor of the positive lens component in the second lens unit G2.

Below the lower limit of the condition of Equation (30), the object-side surface of the positive lens component becomes a strong concave surface and the radius of curvature Rc thereof becomes too small, causing great spherical aberration on the positive side (over side). Further, a change of spherical aberration becomes great upon focusing to a near object so as to degrade the imaging performance, which is not preferred.

Inversely, above the upper limit of the condition of Equation (30), great spherical aberration appears on the negative side (under side), which is not preferred.

Also, in order to decrease the aberration change upon focusing and to effect good correction for chromatic aberration in the second lens unit G2, the positive lens component and the negative lens component in the second lens unit G2 are preferably arranged to compose a cemented lens and to satisfy the following condition of Equation (31).

$$|Rd(N2P-N2N)/(\nu 2P-\nu 2N)|<0.67 \tag{31}$$

In the above equation,

N2P: a refractive index of the positive lens component in the cemented lens in the second lens unit G2, N2N: a refractive index of the negative lens component in the cemented lens in the second lens unit G2, $\nu$2P: a dispersion value of the positive lens component in the cemented lens in the second lens unit G2, $\nu$2N: a dispersion value of the negative lens component in the cemented lens in the second lens unit G2.

Here, the above refractive powers and dispersion values are those for the d-line ($\lambda$=587.6 nm).

The condition of Equation (31) is a condition for decreasing the aberration change due to focusing and achieving correction for chromatic aberration in the cemented lens of the positive lens component and negative lens component in the second lens unit G2.

Above the upper limit of the condition of Equation (31), the sine condition is likely to be over, thus easily causing coma. Also, satisfying the condition of Equation (31), aberrations including chromatic aberration can be corrected in a good balance, and occurrence of higher-order aberrations can be effectively suppressed.

In the present invention the third lens unit G3 itself has the positive refractive power as a whole in order to correct aberrations that the second lens unit G2 leaves, by the third lens unit G3. The third lens unit G3, however, has the negative lens component L32 having the negative strong refractive power.

Then it is preferred to arrange the negative lens component L32 as a biconcave lens disposed between the positive lens component L31 and the positive lens component L33. When the power arrangement of the third lens unit G3 is determined as if to be a triplet of convex, concave, and convex lenses in this manner, aberrations not to be corrected by the second lens unit G2 can be well corrected while the third lens unit G3 is composed of a small number of lens components.

The above-described lens arrangement of the third lens unit G3 is most suitable for correction for spherical aberration, correction for coma, correction for chromatic aberration, etc. by a small number of lenses. Further, employing the aspherical configuration in which the curvature becomes gentler toward the periphery on the convex surface of the positive lens component L33, occurrence of spherical aberration can be controlled at a low level, which is thus preferred.

In order to achieve better imaging performance, the following condition of Equation (32) is desired to be satisfied.

$$|Re/Rf|<1.63 \tag{32}$$

In the above equation,

Re: a radius of curvature of an object-side surface of the positive lens component L31, Rf: a radius of curvature of an image-side surface of the positive lens component L33.

The condition of Equation (32) defines an appropriate range of a ratio of the radius of curvature of the object-side surface of the positive lens component L31 and the radius of curvature of the image-side surface of the positive lens component L33.

Outside the range of the condition of Equation (32), the sine condition is likely to be over so as to cause coma, which undesirably degrades the imaging performance.

In order to achieve better imaging performance, the following conditions of Equations (33) and (34) are desired to be satisfied.

$$|N31-N32|<0.18 \tag{33}$$

$$|\nu 31-\nu 32|<20 \tag{34}$$

In the above equations,

N31: a refractive index of the positive lens component L31,

N32: a refractive index of the negative lens component L32, $\nu$31: a dispersion value of the positive lens component L31, $\nu$32: a dispersion value of the negative lens component L32.

Here, the above refractive powers and dispersion values are those for the d-line (λ=587.6 nm).

The conditions of Equations (33) and (34) define characteristics of optic materials for the positive lens component L31 and the negative lens component L32.

When the positive lens component L31 and negative lens component L32 in the third lens unit G3 are made of the respective optic materials to satisfy the conditions of Equations (33) and (34), the aberrations can be corrected in a good balance and particularly, occurrence of higher-order aberrations can be effectively prevented.

Embodiments of the present invention will be explained by reference to the accompanying drawings.

Embodiment 17

Figure 49:
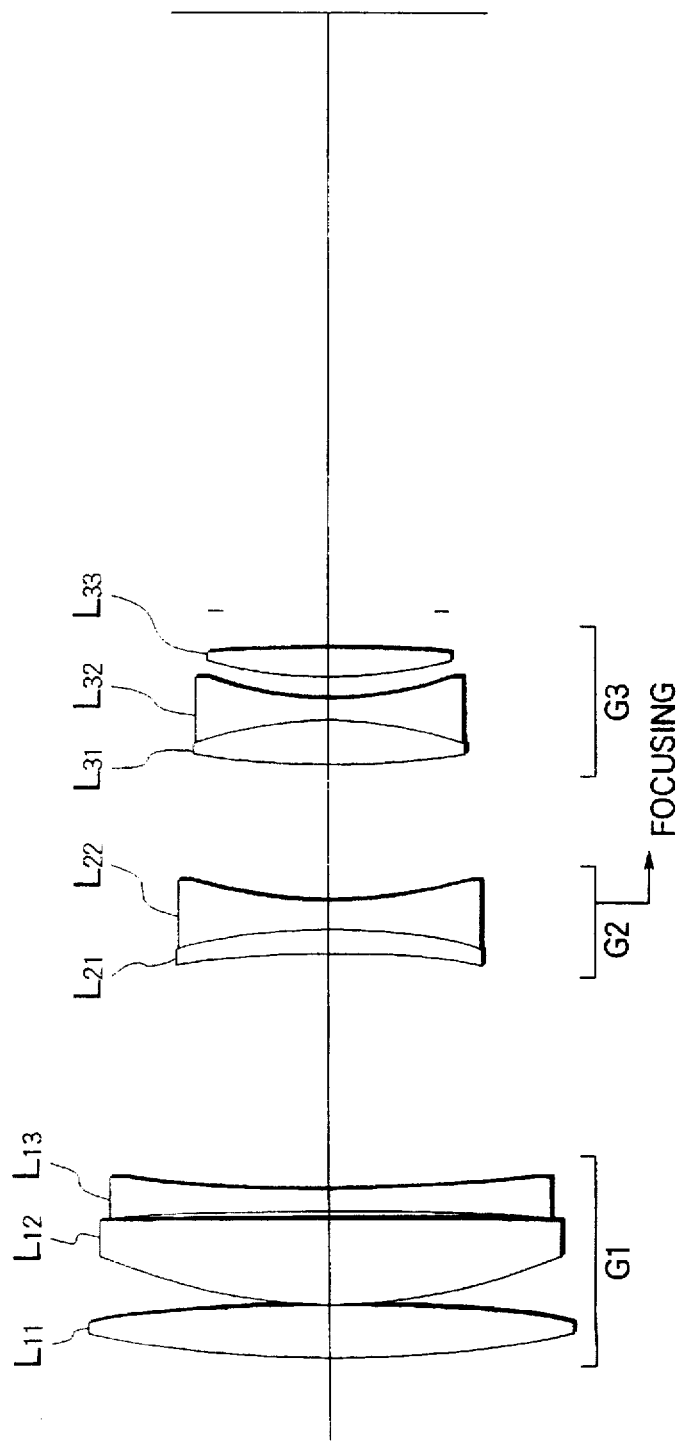
FIG. 49 is a drawing to show a lens layout of a telephoto lens according to the seventeenth embodiment of the present invention.
Figure 50:
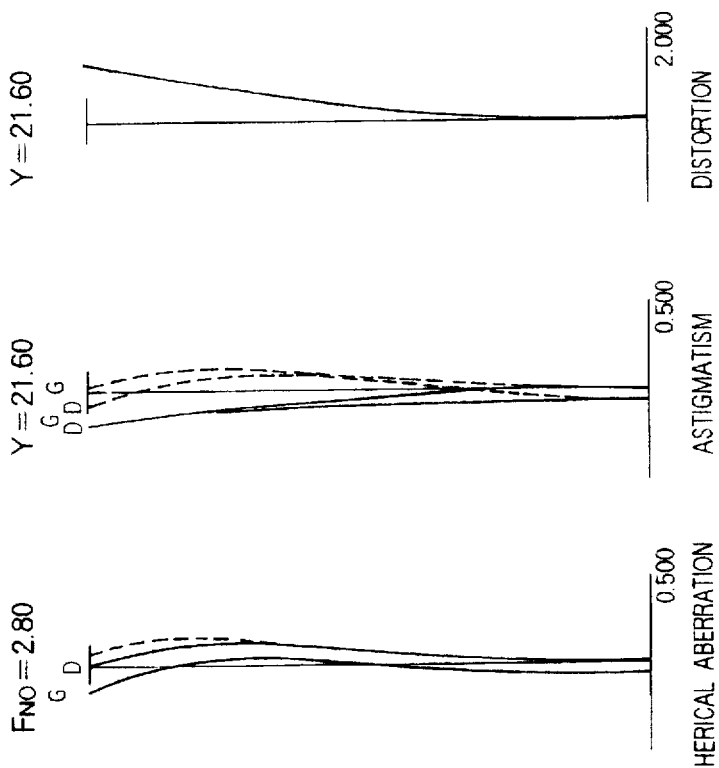
FIGS. 50A-50I are aberration diagrams to show aberrations in an infinity focus state of the seventeenth embodiment.
Figure 51:
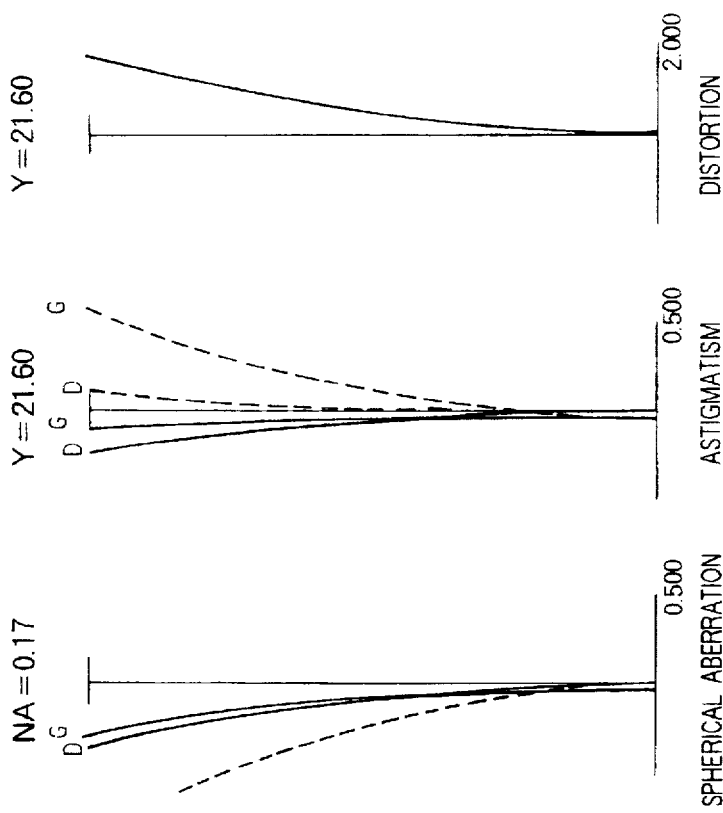
FIGS. 51A-51I are aberration diagrams to show aberrations in a near shooting state of the seventeenth embodiment.

FIG. 49 is a drawing to show a lens layout of the telephoto lens according to the seventeenth embodiment of the present invention.

The telephoto lens as shown is composed of, in order from the object side, the first lens unit G1 consisting of a biconvex lens Li, a biconvex lens L12, and a biconcave lens L13, the second lens unit G2 consisting of a cemented negative lens of a positive meniscus lens L21 with a concave surface opposed to the object side and a biconcave lens L22, and the third lens unit G3 consisting of a cemented lens of a biconvex lens L31 and a biconcave lens L32, and a biconvex aspherical lens L33.

An aperture stop is disposed on the image side of the third lens unit G3. Further, the second lens unit G2 is moved toward the image side to effect focusing to a near object.

In Table 5-1 next there are listed values of specifications of Embodiment 17 of the present invention. In Table 5-1, F represents the focal length, $F_{NO}$ the F-number, Bf the back focus, and β the image magnification.

Further, left-end numerals indicate orders of respective lens surfaces from the object side, r radii of curvature of the respective lens surfaces, d surface separations between the lens surfaces, and n and ν refractive indices and dispersion values (Abbe numbers) for the d-line (λ=587.6 nm).

An aspherical surface can be expressed by the following Equation (a) where y is a height in a direction perpendicular to the optical axis, S(y) an amount of displacement in the direction of the optical axis at the height y, r a radius of reference curvature or radius of vertex curvature, k a conic coefficient, and Cn aspherical coefficients of the order n.

$$S(y)=(y^2/r)/[1+(1-k\cdot y^2/r^2)^{1/2}]+C_2\cdot y^2+C_4\cdot y^4+C_6\cdot y^6+C_8\cdot y^8+C_{10}\cdot y^{10}+\ldots \quad (a)$$

Further, a radius R of paraxial curvature of the aspherical surface is defined by the following Equation (b).

$$R=1/(2\cdot C_2+1/r) \quad (b)$$

An asterisk is placed on the right side of a surface number of an aspherical surface in the table of specifications of embodiment.

TABLE 5-1

| | F = 180 mm<br>FNO = 2.8 | | | |
|---|---|---|---|---|
| | r | d | ν | n |
| 1 | 150.240 | 7.41 | 69.9 | 1.51860 |
| 2 | −260.534 | 0.10 | | |

TABLE 5-1-continued

| | F = 180 mm<br>FNO = 2.8 | | | |
|---|---|---|---|---|
| 3 | 76.990 | 11.88 | 82.6 | 1.49782 |
| 4 | 2672.582 | 1.08 | | |
| 5 | −650.620 | 3.00 | 27.6 | 1.75520 |
| 6 | 203.650 | (d6 = variable) | | |
| 7 | −171.187 | 3.52 | 25.5 | 1.80458 |
| 8 | −89.111 | 4.10 | 64.1 | 1.51680 |
| 9 | 63.332 | (d9 = variable) | | |
| 10 | 98.691 | 6.61 | 43.3 | 1.84042 |
| 11 | −54.362 | 3.00 | 42.0 | 1.66755 |
| 12 | 50.935 | 3.00 | | |
| 13* | 60.419 | 3.93 | 95.0 | 1.43425 |
| 14 | −390.015 | Bf | | |

(Data on aspherical surface)

| | k | C2 | C4 |
|---|---|---|---|
| Thirteenth surface | 1.0000 | 0.0000 | −0.2994 × 10⁻⁶ |
| | C6 | C8 | C10 |
| | −0.4094 × 10⁻⁹ | 0.0000 | 0.0000 |

(Variable separations upon focusing)

| | F = 179.9920 | β = −0.1482 |
|---|---|---|
| D0 | ∞ | 1310.0000 |
| d6 | 33.4102 | 49.9326 |
| d9 | 19.4520 | 2.9296 |
| Bf | 89.5057 | 89.5057 |

(Correspondent values to the conditions)

| (27) | f1/F = | 0.751 |
|---|---|---|
| (28) | f1/f2 = | −1.313 |
| (29) | Ra/Rb = | 1.951 |
| (30) | (Rd + Rc)/(Rd − Rc) = | −3.171 |
| (31) | |Rd (N2P − N2N)/(ν2P − ν2N)| = | 0.664 |
| (32) | |Re/Rf| = | 0.253 |
| (33) | |N31 − N32| = | 0.17287 |
| (34) | |ν31 − ν32| = | 1.3 |

FIGS. 50A–50I are aberration diagrams to show aberrations in the infinity focus state of the seventeenth embodiment. FIGS. 51A–51I are aberration diagrams to show aberrations in a near shooting state (image magnification β=−0.1482) of the seventeenth embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 18

Figure 52:
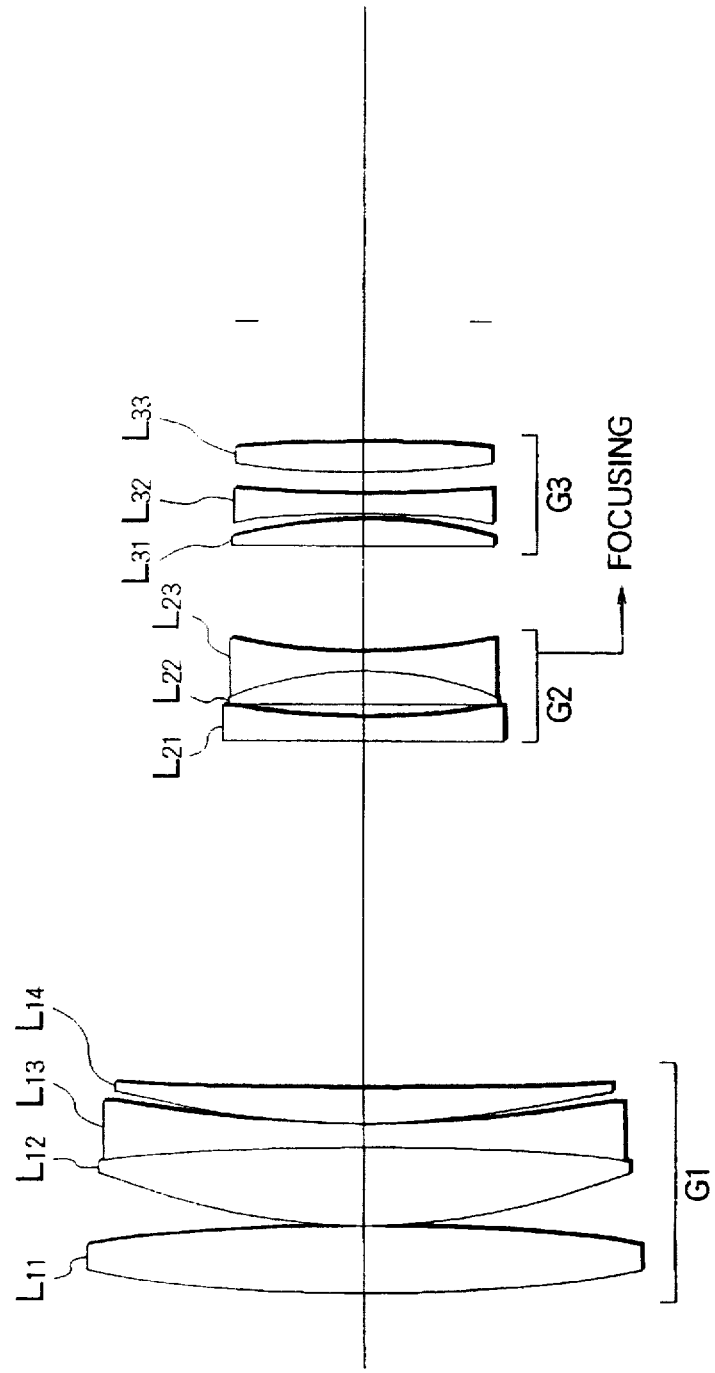
FIG. 52 is a drawing to show a lens layout of a telephoto lens according to the eighteenth embodiment of the present invention.
Figures 54A, 54B, 54C, 54D, 54E, 54F, 54G, 54H, 54I:
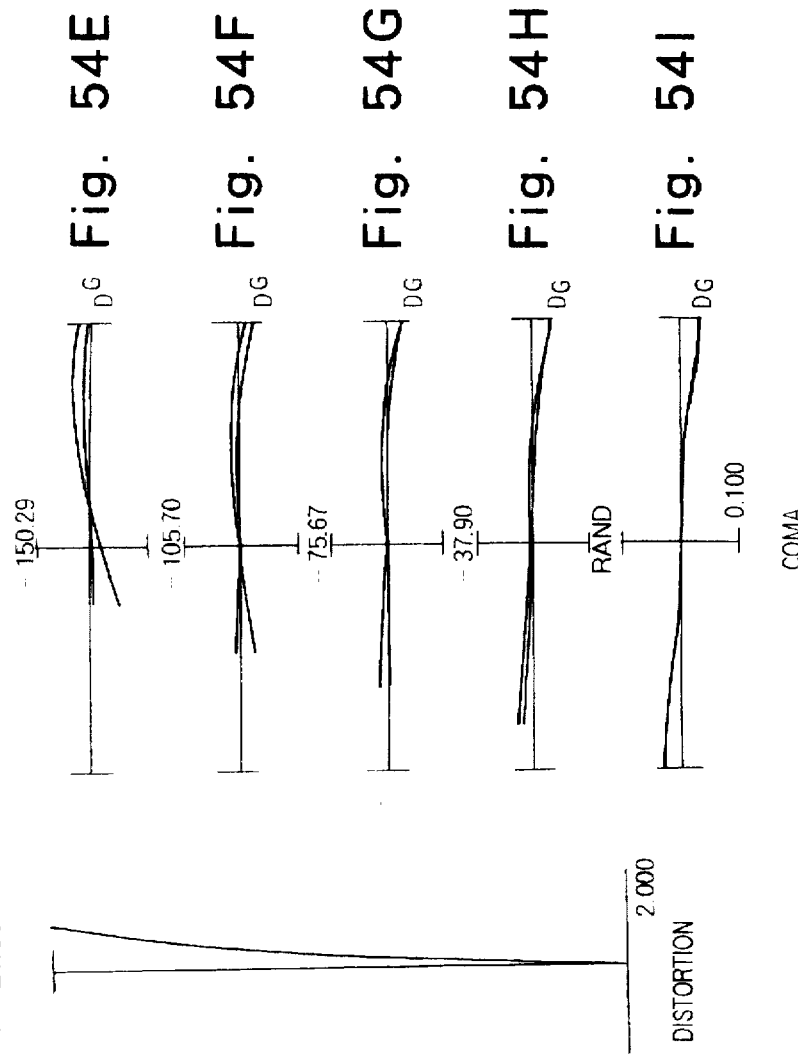
FIGS. 54A-54I are aberration diagrams to show aberrations in a near shooting state of the eighteenth embodiment.

FIG. 52 is a drawing to show a lens layout of the telephoto lens according to the eighteenth embodiment of the present invention.

The telephoto lens as shown is composed of, in order from the object side, the first lens unit G1 consisting of a biconvex lens L11, a biconvex lens L12, a biconcave lens L13, and a positive meniscus lens L14 with a convex surface opposed to the object side, the second lens unit G2 consisting of a biconcave lens L21 and a cemented lens of a biconvex lens L22 and a biconcave lens L23, and the third lens unit G3 consisting of a positive meniscus lens L31 with a concave surface opposed to the object side, a biconcave lens L32, and a biconvex, aspherical lens L33.

An aperture stop is disposed on the image side of the third lens unit G3. Further, the second lens unit G2 is moved toward the image side to effect focusing to a near object.

In Table 5-2 next there are listed values of specifications of Embodiment 18 of the present invention. In Table 5-2, F represents the focal length, $F_{NO}$ the F-number, Bf the back focus, and $\beta$ the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line ($\lambda$=587.6 nm).

TABLE 5-2

F = 300 mm
FNO = 4.0

| | r | d | v | n |
|---|---|---|---|---|
| 1 | 180.569 | 9.63 | 69.9 | 1.51860 |
| 2 | −389.102 | 0.27 | | |
| 3 | 92.999 | 11.10 | 82.6 | 1.49782 |
| 4 | −408.534 | 0.10 | | |
| 5 | −392.046 | 2.99 | 35.2 | 1.74950 |
| 6 | 166.071 | 0.25 | | |
| 7 | 124.638 | 4.90 | 69.9 | 1.51860 |
| 8 | 462.678 | (d8 = variable) | | |
| 9 | −1175.196 | 2.80 | 45.0 | 1.74400 |
| 10 | 95.980 | 1.80 | | |
| 11 | 840.898 | 4.97 | 27.6 | 1.75520 |
| 12 | −51.345 | 2.80 | 52.3 | 1.74810 |
| 13 | 82.072 | (d13 = variable) | | |
| 14 | −620.041 | 3.23 | 52.3 | 1.74810 |
| 15 | −72.443 | 0.93 | | |
| 16 | −150.233 | 2.80 | 33.7 | 1.64831 |
| 17 | 157.170 | 3.00 | | |
| 18* | 91.982 | 4.50 | 69.9 | 1.51860 |
| 19 | −382.542 | Bf | | |

(Data on aspherical surface)

| | k | C2 | C4 |
|---|---|---|---|
| Eighteenth surface | 1.0000 | 0.0000 | −0.2023 × 10⁻⁶ |
| | C6 | C8 | C10 |
| | 0.0000 | 0.0000 | 0.0000 |

(Variable separations upon focusing)

| | F = 300.0000 | $\beta$ = −0.1424 |
|---|---|---|
| D0 | ∞ | 2245.6814 |
| d8 | 50.0524 | 58.4448 |
| d13 | 15.2957 | 6.9023 |
| Bf | 132.8934 | 132.8934 |

(Correspondent values to the conditions)

| (27) | f1/F = | 0.444 |
|---|---|---|
| (28) | f1/f2 = | −2.250 |
| (29) | Ra/Rb = | 1.942 |
| (30) | (Rd + Rc)/(Rd − Rc) = | −0.885 |
| (31) | |Rd (N2P − N2N)/(v2P − v2N)| = | 0.0148 |
| (32) | |Re/Rf| = | 1.621 |
| (33) | |N31 − N32| = | 0.09979 |
| (34) | |v31 − v32| = | 18.6 |

FIGS. 53A–53I are aberration diagrams to show aberrations in the infinity focus state of the eighteenth embodiment. FIGS. 54A–54I are aberration diagrams to show aberrations in a near shooting state (image magnification $\beta$=−0.1424) of the eighteenth embodiment.

In each aberration diagram, $F_{NO}$ represents F-number, NA the numerical aperture, Y the image height, D the d-line ($\lambda$=587.6 nm), and G the g-line ($\lambda$=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 19

Figure 55:
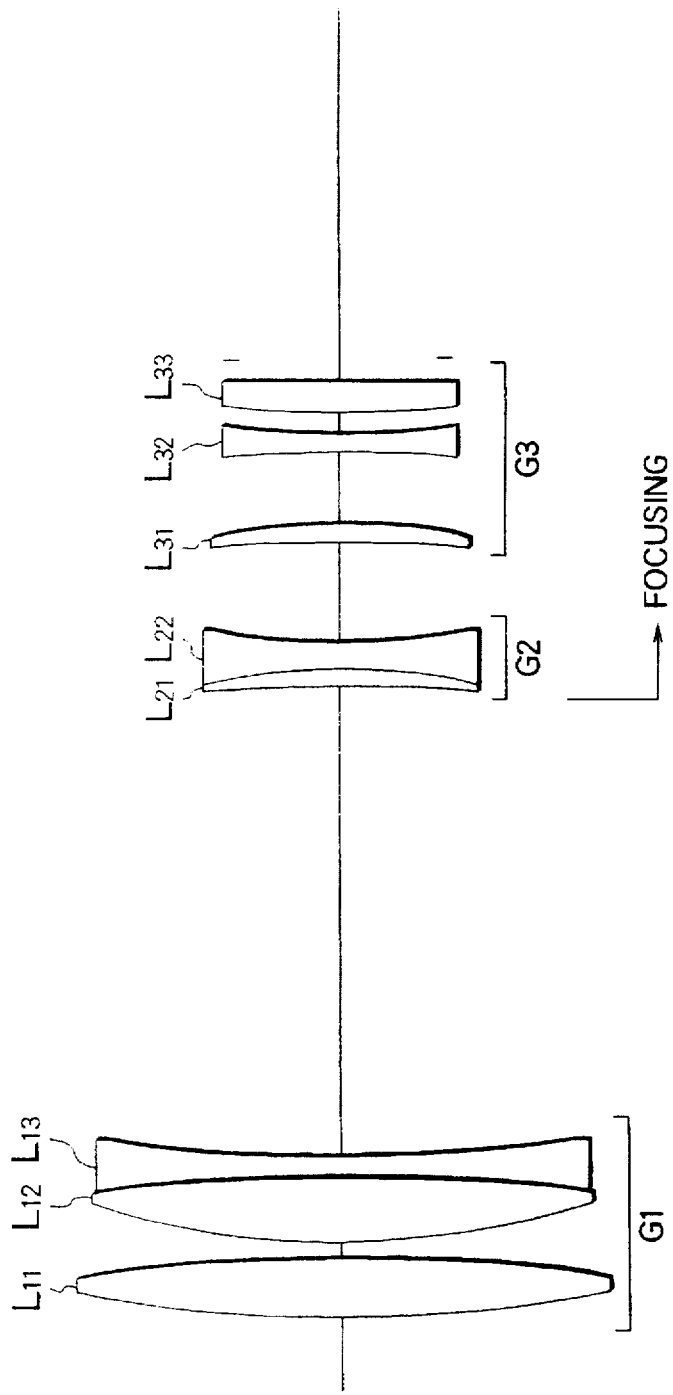
FIG. 55 is a drawing to show a lens layout of a telephoto lens according to the nineteenth embodiment of the present invention.

FIG. 55 is a drawing to show a lens layout of the telephoto lens according to the nineteenth embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a cemented negative lens of a positive meniscus lens L21 with a concave surface opposed to the object side and a biconcave lens L22, and the third lens unit G3 consisting of a positive meniscus lens L31 with a concave surface opposed to the object side, a biconcave lens L32, and a biconvex, aspherical lens L33.

An aperture stop is disposed on the image side of the third lens unit G3. Further, the second lens unit G2 is moved toward the image side to effect focusing to a near object.

In Table 5-3 next there are listed values of specifications of Embodiment 19 of the present invention. In Table 5-3, F represents the focal length, $F_{NO}$ the F-number, Bf the back focus, and $\beta$ the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line ($\lambda$=587.6 nm).

TABLE 5-3

F = 400 mm
FNO = 5.6

| | r | d | v | n |
|---|---|---|---|---|
| 1 | 154.255 | 8.87 | 69.9 | 1.51860 |
| 2 | −275.779 | 1.90 | | |
| 3 | 98.347 | 9.21 | 82.6 | 1.49782 |
| 4 | −387.526 | 0.57 | | |
| 5 | −320.052 | 2.60 | 35.2 | 1.74950 |
| 6 | 191.508 | (d6 = variable) | | |
| 7 | −319.750 | 2.64 | 27.6 | 1.74077 |
| 8 | −87.778 | 3.54 | 58.5 | 1.65160 |
| 9 | 93.851 | (d9 = variable) | | |
| 10 | −485.500 | 2.60 | 31.6 | 1.75692 |
| 11 | −98.471 | 10.40 | | |
| 12 | −229.658 | 2.60 | 40.3 | 1.60717 |
| 13 | 80.472 | 3.00 | | |
| 14* | 98.210 | 5.00 | 69.9 | 1.51860 |
| 15 | −3890.088 | Bf | | |

(Data on aspherical surface)

| | k | $C_2$ | $C_4$ |
|---|---|---|---|
| Fourteenth surface | 1.0000 | 0.0000 | −0.1521 × 10⁻⁶ |
| | $C_6$ | $C_8$ | $C_{10}$ |
| | 0.6048 × 10⁻¹⁰ | 0.0000 | 0.0000 |

TABLE 5-3-continued

F = 400 mm
FNO = 5.6

(Variable separations upon focusing)

|  | F = 400.0000 | β = −0.1109 |
|---|---|---|
| D0 | ∞ | 3705.0372 |
| d6 | 67.2286 | 76.7892 |
| d9 | 13.7613 | 4.2008 |
| Bf | 161.0537 | 161.0537 |

(Correspondent values to the conditions)

| (27) | f1/F = | 0.439 |
|---|---|---|
| (28) | f1/f2 = | −1.454 |
| (29) | Ra/Rb = | 1.568 |
| (30) | (Rd + Rc)/(Rd − Rc) = | −1.757 |
| (31) | \|Rd (N2P − N2N)/(v2P − v2N)\| = | 0.253 |
| (32) | \|Re/Rf\| = | 0.125 |
| (33) | \|N31 − N32\| = | 0.14975 |
| (34) | \|v31 − v32\| = | 8.7 |

FIGS. 56A–56I are aberration diagrams to show aberrations in the infinity focus state of the nineteenth embodiment. FIGS. 57A–57I are aberration diagrams to show aberrations in a near shooting state (image magnification β=−0.1109) of the nineteenth embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 20

FIG. 58 is a drawing to show a lens layout of the telephoto lens according to the twentieth embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a negative cemented lens of a positive meniscus lens L21 with a concave surface opposed to the object side and a biconcave lens L22, and the third lens unit G3 consisting of a biconvex lens L31, a biconcave lens L32, and a biconvex, aspherical lens L33.

An aperture stop is disposed on the image side of the third lens unit G3. Further, the second lens unit G2 is moved toward the image side to effect focusing to a near object.

In Table 5-4 next there are listed values of specifications of Embodiment 20 of the present invention. In Table 5-4, F represents the focal length, $F_{NO}$ the F-number, Bf the back focus, and β the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line (λ=587.6 nm).

TABLE 5-4

F = 600 mm
FNO = 5.6

| | r | d | v | n |
|---|---|---|---|---|
| 1 | 200.793 | 15.30 | 82.6 | 1.49782 |
| 2 | −357.743 | 1.29 | | |
| 3 | 146.613 | 16.30 | 82.6 | 1.49782 |
| 4 | −508.827 | 2.03 | | |
| 5 | −380.563 | 7.12 | 35.2 | 1.74950 |
| 6 | 287.106 | (d6 = variable) | | |
| 7 | −2109.331 | 6.65 | 25.4 | 1.80518 |
| 8 | −264.297 | 6.32 | 49.4 | 1.77279 |
| 9 | 209.371 | (d9 = variable) | | |
| 10 | 379.365 | 6.00 | 30.1 | 1.69895 |
| 11 | −185.088 | 31.34 | | |
| 12 | −189.513 | 6.00 | 46.4 | 1.80411 |
| 13 | 98.412 | 3.00 | | |
| 14* | 145.862 | 5.00 | 95.0 | 1.43425 |
| 15 | −443.261 | Bf | | |

(Data on aspherical surface)

| | k | $C_2$ | $C_4$ |
|---|---|---|---|
| Fourteenth surface | 1.0000 | 0.0000 | $-0.8466 \times 10^{-7}$ |
| | $C_6$ | $C_8$ | $C_{10}$ |
| | $0.5631 \times 10^{-10}$ | 0.0000 | 0.0000 |

(Variable separations upon focusing)

| | F = 600.0000 | β = −0.1343 |
|---|---|---|
| D0 | ∞ | 4590.0528 |
| d6 | 61.0642 | 78.5553 |
| d9 | 52.8282 | 35.3371 |
| Bf | 189.7145 | 189.7145 |

(Correspondent values to the conditions)

| (27) | f1/F = | 0.411 |
|---|---|---|
| (28) | f1/f2 = | −0.976 |
| (29) | Ra/Rb = | 1.370 |
| (30) | (Rd + Rc)/(Rd − Rc) = | −1.286 |
| (31) | \|Rd (N2P − N2N)/(v2P − v2N)\| = | 0.357 |
| (32) | \|Re/Rf\| = | 0.856 |
| (33) | \|N31 − N32\| = | 0.10516 |
| (34) | \|v31 − v32\| = | 16.3 |

FIGS. 59A–59I are aberration diagrams to show aberrations in the infinity focus state of the twentieth embodiment. FIGS. 60A–60I are aberration diagrams to show aberrations in a near shooting state (image magnification β=−0.1343) of the twentieth embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

It is clear that the positive lens L33 in the third lens unit G3 may have an aspherical surface on the image side or may have the both surfaces aspherical, though the above embodiments described the examples in which the object-side surface thereof was aspherical.

As explained above, the present invention can realize the inner focus type telephoto lens having the light-weight focusing lens unit, a small amount of focusing movement, and excellent imaging performance. Accordingly, the load can be decreased on the drive mechanism for focusing.

Next, in the present invention, another inner focus type telephoto lens comprises in order from the object side the first lens unit G1 having a positive refractive power, the second lens unit G2 having a negative refractive power, and the third lens unit G3 having a positive refractive power, wherein the first lens unit G1 and the second lens unit G2 compose a nearly afocal system and wherein the second lens unit G2 is moved along the optical axis to effect focusing to a near object, wherein the first lens unit G1 has in order from the object side a positive lens component L11, a positive lens component L12, and a negative lens component L13, wherein the second lens unit G2 has at least one positive lens component and at least one negative lens component, wherein the third lens unit G3 has in order from the object side a positive lens component L31, a negative lens component L32, and a positive lens component L33 which is a GRIN lens having an axial index distribution in which the refractive index changes from the object side toward the image side, wherein when f1 is a focal length of the first lens unit G1, f2 a focal length of the second lens unit G2, F a focal length of the total lens system, Ra a radius of curvature of an object-side surface of the positive lens component L11, and Rb a radius of curvature of an object-side surface of the positive lens component L12, the following conditions are satisfied:

$0.40 < f1/F < 0.82$ $-1.70 < f1/f2 < -0.76$ $1.35 < Ra/Rb < 2.25$.

In a preferred embodiment of the present invention, the second lens unit G2 comprises at least one biconcave lens, and when Rc is a radius of curvature of an object-side surface of the positive lens component in the second lens unit G2 and Rd a radius of curvature of an image-surface of the positive lens component in the second lens unit G2, the following condition is satisfied:

$-1.40 < (Rd+Rc)/(Rd-Rc) < -0.65$.

Equations for the respective conditions of the present invention will be explained.

The telephoto lens of the present invention satisfies the following conditions of Equations (35) to (37).

$0.40 < f1/F < 0.82$ \hfill (35)

$-1.70 < f1/f2 < -0.76$ \hfill (36)

$1.35 < Ra/Rb < 2.25$ \hfill (37)

In the above equations, f1: the focal length of the first lens unit G1, f2: the focal length of the second lens unit G2, F: the focal length of the total lens system, Ra: the radius of curvature of the object-side surface of the positive lens component L11, Rb: the radius of curvature of the object-side surface of the positive lens component L12.

The condition of Equation (35) defines an appropriate range of a ratio of the focal length f1 of the first lens unit G1 to the focal length F of the total lens system.

Below the lower limit of the condition of Equation (35), the refractive power of the first lens unit G1 becomes too strong, which would result in not correcting aberration in the first lens unit G1 sufficiently so as to give rise to great spherical aberration. Further, it becomes too hard to construct the second lens unit G2 and third lens unit G3 from a small number of lens components, while correcting the aberration thus appearing in the first lens unit G1.

Conversely, above the upper limit of the condition of Equation (35), the refractive power of the first lens unit G1 becomes too small, which undesirably increases the total lens length and the focusing movement amount.

The condition of Equation (36) defines an appropriate range of a ratio of the focal length f1 of the first lens unit G1 to the focal length f2 of the second lens unit G2. Namely, it is a condition for achieving a proper power arrangement between the first lens unit G1 and the second lens unit G2, which is a condition for determining the refractive power of the second lens unit G2 relative to the refractive power of the first lens unit G1 determined based on the condition of Equation (35).

Below the lower limit of the condition of Equation (36), the ratio of the refractive power of the second lens unit G2 to that of the first lens unit G1 becomes too large, which will make the refractive power of the second lens unit G2 too strong, resulting in making difficult correction for aberration in the second lens unit G2, particularly correction for spherical aberration.

Conversely, above the upper limit of the condition of Equation (36), the ratio of the refractive power of the second lens unit G2 to that of the first lens unit G1 becomes too small, thus making the refractive power of the second lens unit G2 weak. As described above, that the first lens unit G1 and second lens unit G2 compose the substantially afocal system means that their focus positions are coincident with each other. Accordingly, the second lens unit G2 becomes located closer to the object as the refractive power of the second lens unit G2 becomes weaker, resulting in increasing the effective diameter of the second lens unit G2. Namely, as the effective diameter of the second lens unit G2 as being the focusing lens unit increases, the weight thereof also increases, which is not preferred.

The condition of Equation (37) defines an appropriate range of a ratio of the radius of curvature Ra of the object-side surface (Ra surface) of the positive lens component L11 to the radius of curvature Rb of the object-side surface (Rb surface) of the positive lens component L12 having a positive strong refractive power in order to decrease spherical aberration appearing in the first lens unit G1 when the first lens unit G1 is arranged to have a positive strong refractive power.

Here, in order to decrease occurrence of spherical aberration in the Ra surface or the Rb surface with the positive strong refractive power as much as possible, each refracting surface is desired to have a shape close to the aplanatic surface. Thus, a preferred power arrangement is that the Rb surface has a positive refractive power stronger than that of the Ra surface.

However, above the upper limit of the condition of Equation (37) the refractive power of the Rb surface becomes too strong. Inversely, below the lower limit of the condition of Equation (37), the refractive power of the Ra surface becomes too strong. Namely, outside the range defined by the upper limit and the lower limit of the condition of Equation (37), spherical aberration increases, which is not preferred.

In the present invention the focusing movement amount is decreased by arranging the optical system so as to satisfy the above conditions.

Next, in order to decrease the weight of the focusing lens unit, that is, in order to compose the focusing lens unit of a smaller number of constituent lens components, it is preferred to construct the second lens unit G2 and third lens unit G3 as follows.

First, in order to decrease aberration change during focusing by the second lens unit G2, it is preferred to provide the second lens unit G2 having the negative refractive power with a biconcave lens. In this case, converging rays incident from the first lens unit G1 to the second lens unit G2 are refracted near the minimum angle of deflection in the second lens unit G2 to emerge therefrom, whereby the aberration change due to a change of object distance can be well corrected.

Next, noting the positive lens component L21 disposed in the second lens unit G2, it is desired to satisfy the following condition of Equation (38).

$$-1.40<(Rd+Rc)/(Rd-Rc)<-0.65 \qquad (38)$$

In the above equation,

Rc: the radius of curvature of the object-side surface of the positive lens component in the second lens unit G2.

Rd: the radius of curvature of the image-side surface of the positive lens component in the second lens unit G2.

The condition of Equation (38) defines an appropriate range of the shape factor of the positive lens component in the second lens unit G2.

Below the lower limit of the condition of Equation (38), the object-side surface of the positive lens component becomes a strong concave surface and the radius of curvature Rc thereof becomes too small, causing great spherical aberration on the positive side (over side). Further, a change of spherical aberration becomes great upon focusing to a near object so as to degrade the imaging performance, which is not preferred.

Inversely, above the upper limit of the condition of Equation (38), great spherical aberration appears on the negative side (under side), which is not preferred.

Also, in order to decrease the aberration change upon focusing and to effect good correction for chromatic aberration in the second lens unit G2, the positive lens component and the negative lens component in the second lens unit G2 are preferably arranged to compose a cemented lens and to satisfy the following condition of Equation (39).

$$|Rd(N2P-N2N)/(v2P-v2N)|<1.91 \qquad (39)$$

In the above equation,

N2P: a refractive index of the positive lens component in the cemented lens in the second lens unit G2.

N2N: a refractive index of the negative lens component in the cemented lens in the second lens unit G2.

v2P: a dispersion value of the positive lens component in the cemented lens in the second lens unit G2.

v2N: a dispersion value of the negative lens component in the cemented lens in the second lens unit G2.

Here, the above refractive powers and dispersion values are those for the d-line ($\lambda$=587.6 nm).

The condition of Equation (39) is a condition for decreasing the aberration change due to focusing and achieving correction for chromatic aberration in the cemented lens of the positive lens component and negative lens component in the second lens unit G2.

Above the upper limit of the condition of Equation (39), the sine condition is likely to be over, thus easily causing coma. Also, satisfying the condition of Equation (39), aberrations including chromatic aberration can be corrected in a good balance, and occurrence of higher-order aberrations can be effectively suppressed.

In the present invention the third lens unit G3 itself has the positive refractive power as a whole in order to correct aberrations that the second lens unit G2 leaves, by the third lens unit G3. The third lens unit G3, however, has the negative lens component L32 having the negative strong refractive power.

Then it is preferred to arrange the negative lens component L32 is disposed between the positive lens component L31 and the positive lens component L33. When the power arrangement of the third lens unit G3 is determined as if to be a triplet of convex, concave, and convex lenses in this manner, aberrations not to be corrected by the second lens unit G2 can be well corrected while the third lens unit G3 is composed of a small number of lens components.

The above-described lens arrangement of the third lens unit G3 is most suitable for correction for spherical aberration, correction for coma, correction for chromatic aberration, etc. by a small number of lenses. The positive lens component L33 as being the GRIN lens (gradient index lens) in which the refractive index changes from the object side toward the image side is preferably a positive meniscus lens with a concave surface opposed to the image side, wherein the dispersion value vd obtained from the axial index distribution decreases from the object side toward the image side. Arranging the positive GRIN lens component L33 in this manner so that the dispersion value vd is large on the convex surface while small on the concave surface, chromatic aberration can be positively corrected on the both surfaces of the positive meniscus lens.

In order to achieve better imaging performance, the following condition of Equation (40) is desired to be satisfied.

$$0.85<|Re/Rf| \qquad (40)$$

In the above equation,

Re: a radius of curvature of an object-side surface of the positive lens component L31, Rf: a radius of curvature of an image-side surface of the positive lens component L33.

The condition of Equation (40) defines an appropriate range of a ratio of the radius of curvature of the object-side surface of the positive lens component L31 and the radius of curvature of the image-side surface of the positive lens component L33.

Outside the range of the condition of Equation (40), the sine condition is likely to be over so as to cause coma, which undesirably degrades the imaging performance.

In order to achieve better imaging performance, the following conditions of Equations (41) and (42) are desired to be satisfied.

$$|N31-N32|<0.29 \qquad (41)$$

$$|v31-v32|<21.5 \qquad (42)$$

In the above equations,

N31: a refractive index of the positive lens component L31,

N32: a refractive index of the negative lens component L32.

v31: a dispersion value of the positive lens component L31.

v32: a dispersion value of the negative lens component L32.

Here, the above refractive powers and dispersion values are those for the d-line (λ=587.6 nm).

The conditions of Equations (41) and (42) define characteristics of optic materials for the positive lens component L31 and the negative lens component L32.

When the positive lens component L31 and negative lens component L32 in the third lens unit G3 are made of the respective optic materials to satisfy the conditions of Equations (41) and (42), the aberrations can be corrected in a good balance and particularly, occurrence of higher-order aberrations can be effectively prevented.

Embodiments of the present invention will be explained by reference to the accompanying drawings.

Embodiment 21

Figure 61:
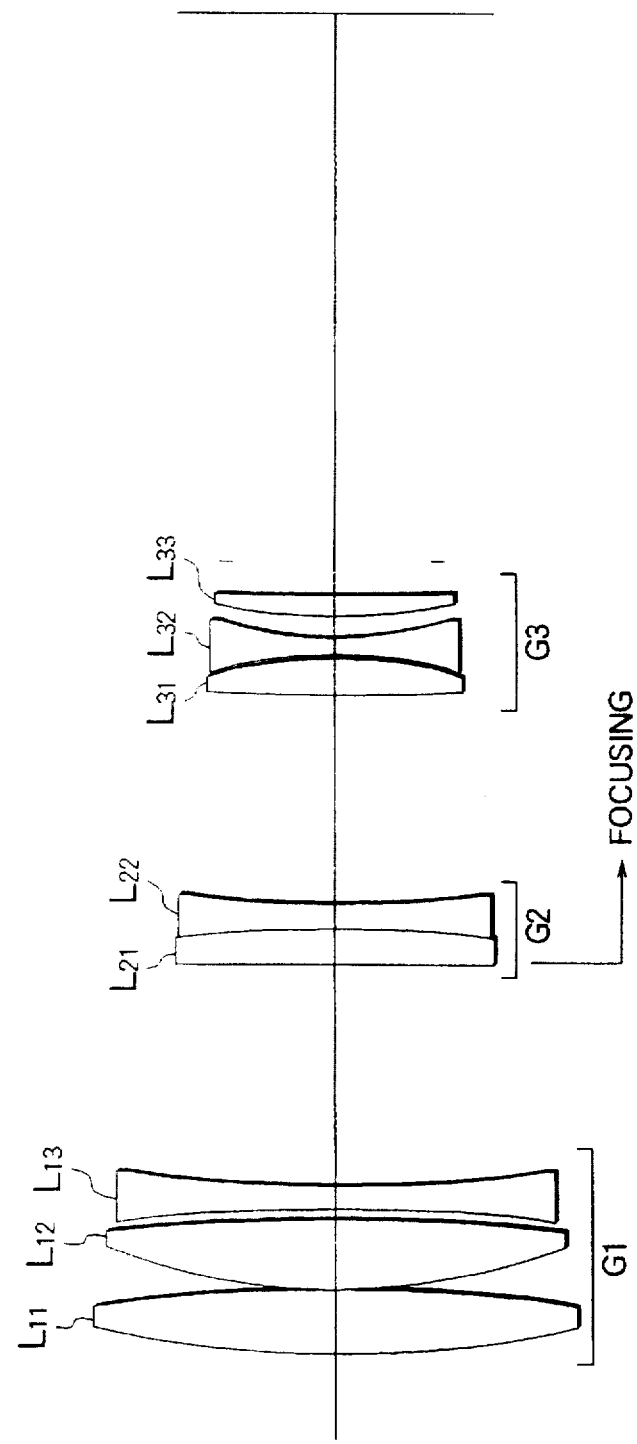
FIG. 61 is a drawing to show a lens layout of a telephoto lens according to the twenty first embodiment of the present invention.

FIG. 61 is a drawing to show a lens layout of the telephoto lens according to the twenty first embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a negative cemented lens of a biconvex lens L21 and a biconcave lens L22, and the third lens unit G3 consisting of a biconvex lens L31, a biconcave lens L32, and a positive meniscus GRIN lens L33 with a concave surface opposed to the image side.

An aperture stop is disposed on the image side of the third lens unit G3. Further, the second lens unit G2 is moved toward the image side to effect focusing to a near object.

In Table 6-1 next there are listed values of specifications of Embodiment 21 of the present invention. In Table 6-1, F represents the focal length, $F_{NO}$ the F-number, Bf the back focus, and β the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line (λ=587.6 nm).

In each embodiment, a refractive index distribution N(z) of GRIN lens can be expressed by the following Equation (c).

$$N(z) = n0 + n1 \times z + n2 \times z^2 \quad (c)$$

In the above equation, z: a distance along the optical axis from the vertex of the object-side surface of the GRIN lens, n0: a coefficient to represent a refractive index at the vertex of the object-side surface of the GRIN lens, n1: a coefficient for the first-order term for z, n2: a coefficient for the second-order term for z.

In each embodiment the refractive index distribution of the GRIN lens is defined by presenting the coefficients n0, n1, and n for the d-line (λ=587.6 nm), the C-line (λ=656.3 nm), and the F-line (λ=486.1 nm).

TABLE 6-1

F = 180 mm
FNO = 2.8

| | r | d | v | n |
|---|---|---|---|---|
| 1 | 118.856 | 9.64 | 70.1 | 1.51860 |
| 2 | −269.127 | 0.10 | | |
| 3 | 86.856 | 9.47 | 82.6 | 1.49782 |
| 4 | −407.592 | 1.82 | | |
| 5 | −264.685 | 3.28 | 35.2 | 1.74950 |
| 6 | 175.974 | (d6 = variable) | | |
| 7 | 3280.385 | 4.60 | 23.0 | 1.86074 |
| 8 | −283.296 | 3.60 | 52.3 | 1.74810 |
| 9 | 120.435 | (d9 = variable) | | |
| 10 | 201.211 | 5.18 | 39.8 | 1.86994 |
| 11 | −65.372 | 0.50 | | |
| 12 | −62.386 | 2.10 | 40.8 | 1.58144 |
| 13 | 47.714 | 3.00 | | |
| 14 | 68.247 | 2.95 | | (GRIN lens) |
| 15 | 230.918 | Bf | | |

(Data on index distribution)

| | n0 | n1 | n2 |
|---|---|---|---|
| d-line | 1.74809 | −0.3025 × 10⁻² | −0.2354 × 10⁻² |
| C-line | 1.74376 | −0.3065 × 10⁻² | −0.2624 × 10⁻² |
| F-line | 1.75806 | −0.3030 × 10⁻² | −0.1612 × 10⁻² |

(Variable separations upon focusing)

| | F = 180.0000 | β = −0.1444 |
|---|---|---|
| D0 | ∞ | 1309.9606 |
| d6 | 31.4418 | 57.2931 |
| d9 | 30.4204 | 4.5691 |
| Bf | 81.9470 | 81.9470 |

(Correspondent values to the conditions)

| | | |
|---|---|---|
| (35) | f1/F = | 0.818 |
| (36) | f1/f2 = | −0.816 |
| (37) | Ra/Rb = | 1.368 |
| (38) | (Rd + Rc)/(Rd − Rc) = | 0.841 |
| (39) | \|Rd (N2P − N2N)/(v2P − v2N)\| = | 1.089 |
| (40) | \|Re/Rf\| = | 0.871 |
| (41) | \|N31 − N32\| = | 0.2885 |
| (42) | \|v31 − v32\| = | 1 |

FIGS. 62A–62D are aberration diagrams to show aberrations in the infinity focus state of the twenty first embodiment. FIGS. 63A–63D are aberration diagrams to show aberrations in a near shooting state (image magnification β=−0.1444) of the twenty first embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 22

Figure 64:
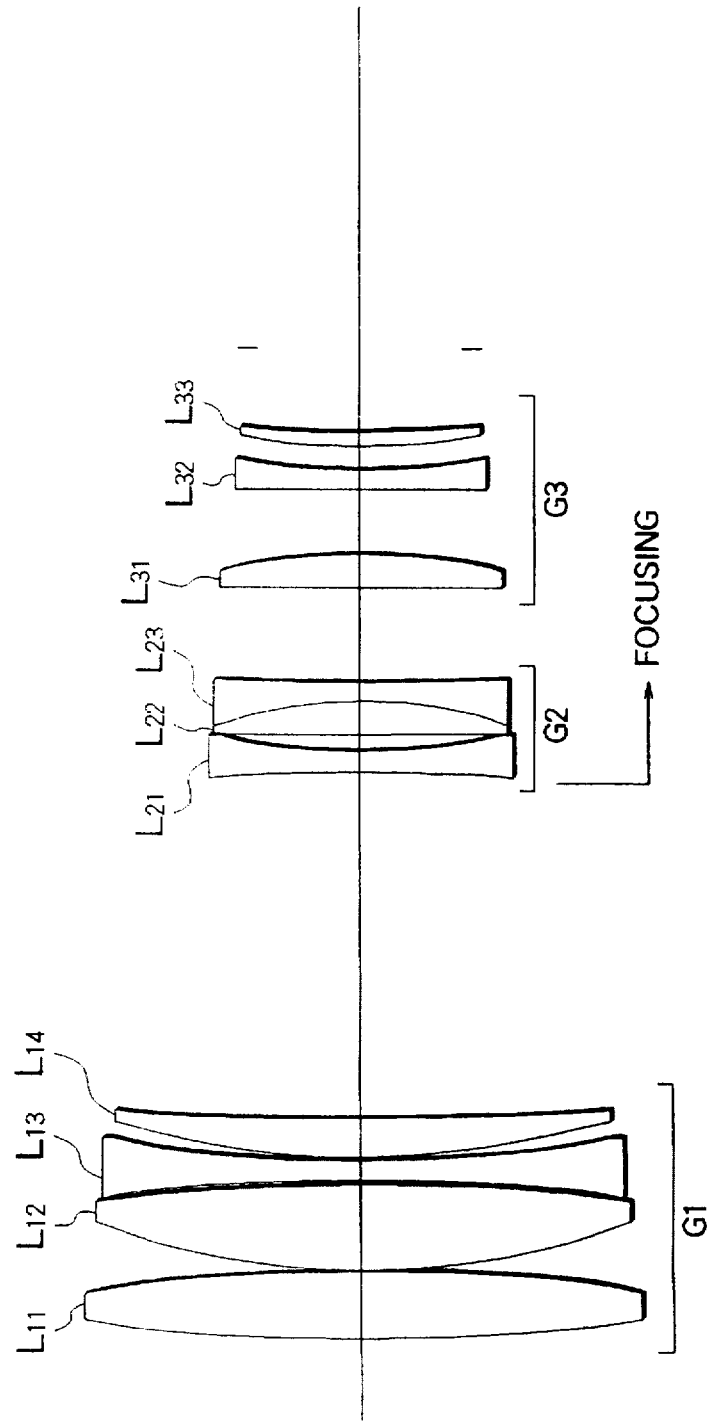
FIG. 64 is a drawing to show a lens layout of a telephoto lens according to the twenty second embodiment of the present invention.

FIG. 64 is a drawing to show a lens layout of the telephoto lens according to the twenty second embodiment of the present invention.

The telephoto lens as shown is composed of, in order from the object side, the first lens unit G1 consisting of a biconvex lens L11, a biconvex lens L12, a biconcave lens L13, and a positive meniscus lens L14 with a convex surface opposed to the object side, the second lens unit G2 consisting of a biconcave lens L21 and a cemented lens of a biconvex lens L22 and a biconcave lens L23, and the third lens unit G3 consisting of a biconvex lens L31, a negative meniscus lens L32 with a convex surface opposed to the object side, and a positive meniscus GRIN lens L33 with a concave surface opposed to the image side.

An aperture stop is disposed on the image side of the third lens unit G3. Further, the second lens unit G2 is moved toward the image side to effect focusing to a near object.

In Table 6-2 next there are listed values of specifications of Embodiment 22 of the present invention. In Table 6-2, F represents the focal length, $F_{NO}$ the F-number, Bf the back focus, and $\beta$ the image magnification.

Further, left-end numerals indicate orders of respective lens surfaces from the object side, r radii of curvature of the respective lens surfaces, d surface separations between the lens surfaces, and n and ν refractive indices and dispersion values (Abbe numbers) for the d-line (λ=587.6 nm).

TABLE 6-2

| F = 300 mm FNO = 4.0 | | | |
|---|---|---|---|
| r | d | ν | n |
| 1   219.790 | 9.69 | 70.1 | 1.51860 |
| 2  −302.099 | 0.20 | | |
| 3    99.340 | 12.11 | 82.6 | 1.49782 |
| 4  −336.767 | 0.50 | | |
| 5  −311.727 | 2.80 | 35.2 | 1.74950 |
| 6   169.730 | 0.50 | | |
| 7   116.503 | 5.37 | 70.1 | 1.51860 |
| 8   359.623 | (d8 = variable) | | |
| 9  −329.233 | 2.80 | 45.1 | 1.74400 |
| 10   75.879 | 2.39 | | |
| 11  323.285 | 5.27 | 27.6 | 1.75520 |
| 12  −61.140 | 2.80 | 52.3 | 1.74810 |
| 13  376.324 | (d13 = variable) | | |
| 14 17491.536 | 4.56 | 52.3 | 1.74810 |
| 15  −88.973 | 9.11 | | |
| 16 1884.297 | 2.64 | 33.8 | 1.64831 |
| 17   74.822 | 3.53 | | |
| 18   84.706 | 2.20 | | (GRIN lens) |
| 19  189.092 | Bf | | |

| (Data on index distribution) | | | |
|---|---|---|---|
| | n0 | n1 | n2 |
| d-line | 1.65160 | −0.19829 × 10⁻² | 0.50090 × 10⁻³ |
| C-line | 1.64821 | −0.24844 × 10⁻² | 0.44026 × 10⁻³ |
| F-line | 1.65934 | −0.15933 × 10⁻² | 0.67549 × 10⁻³ |

| (Variable separations upon focusing) | | |
|---|---|---|
| | F = 300.0000 | β = −0.1404 |
| D0 | ∞ | 2245.0122 |
| d8 | 49.0615 | 59.1762 |
| d13 | 13.2857 | 3.1710 |
| Bf | 126.1706 | 126.1706 |

| (Correspondent values to the conditions) | | |
|---|---|---|
| (35) | f1/F = | 0.481 |
| (36) | f1/f2 = | −1.689 |
| (37) | Ra/Rb = | 2.213 |
| (38) | (Rd + Rc)/(Rd − Rc) = | −0.682 |
| (39) | \|Rd (N2P − N2N)/(ν2P − ν2N)\| = | 0.0176 |
| (40) | \|Re/Rf\| = | 92.503 |
| (41) | \|N31 − N32\| = | 0.09979 |
| (42) | \|ν31 − ν32\| = | 18.5 |

FIGS. 65A–65D are aberration diagrams to show aberrations in the infinity focus state of the twenty second embodiment. FIGS. 66A–66D are aberration diagrams to show aberrations in a near shooting state (image magnification $\beta$=−0.1404) of the twenty second embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 23

Figure 67:
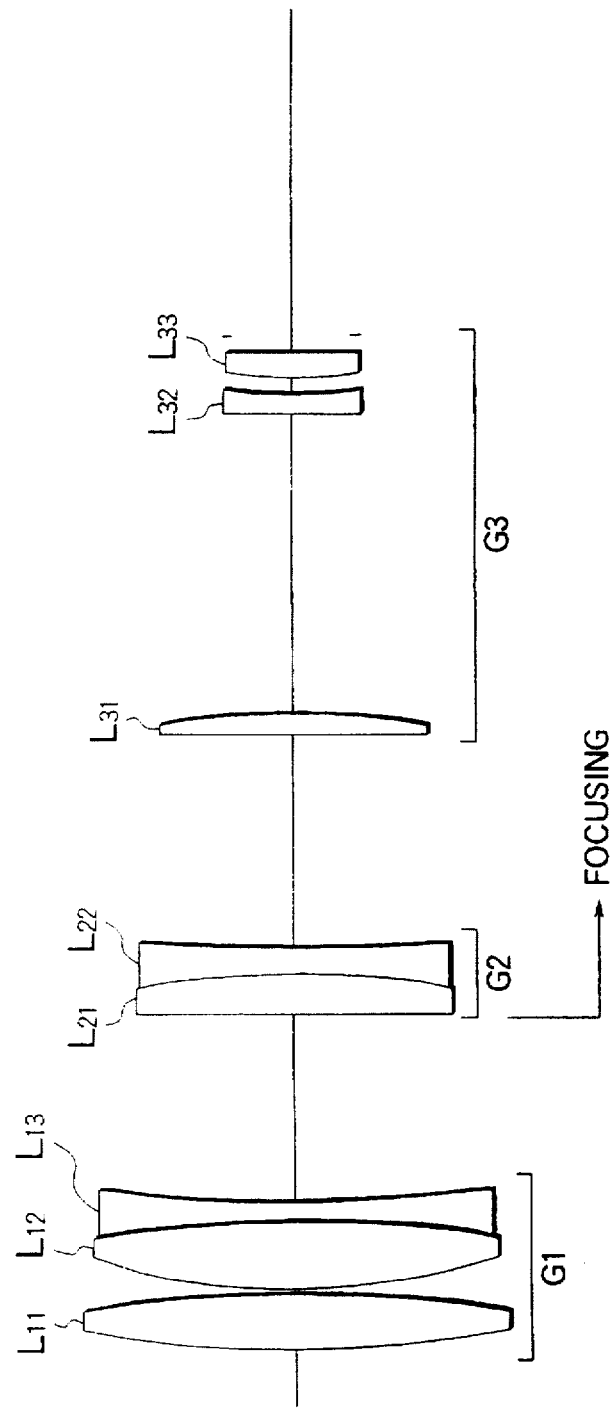
FIG. 67 is a drawing to show a lens layout of a telephoto lens according to the twenty third embodiment of the present invention.
Figures 68A, 68B, 68C, 68D:
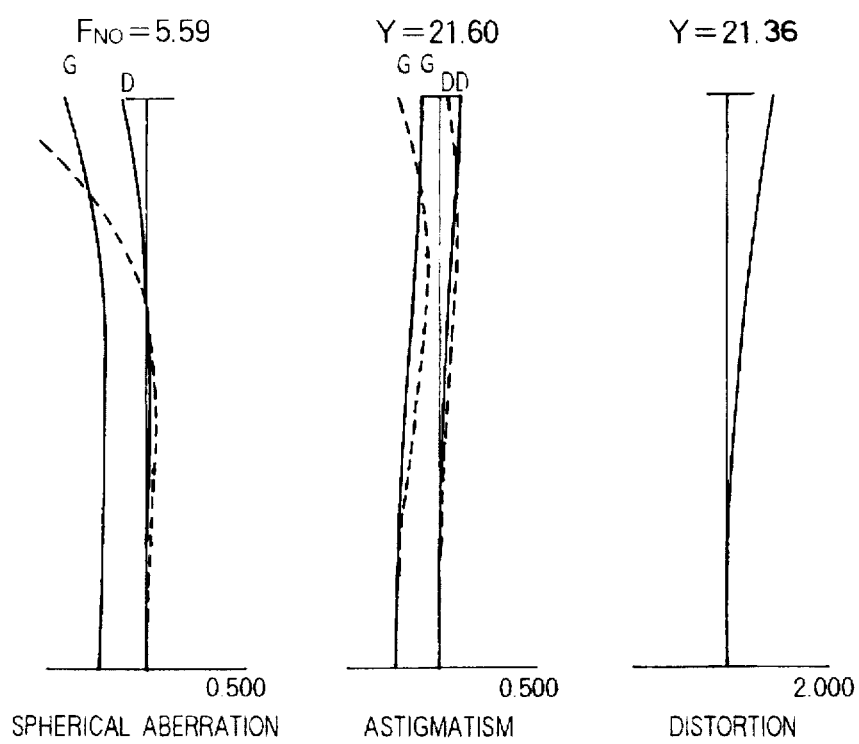
FIGS. 68A–68D are aberration diagrams to show aberrations in an infinity focus state of the twenty third embodiment.

FIG. 67 is a drawing to show a lens layout of the telephoto lens according to the twenty third embodiment of the present invention.

The telephoto lens as shown is composed of, in order from the object side, the first lens unit G1 consisting of a biconvex lens L11, a biconvex lens L12, and a biconcave lens L13, the second lens unit G2 consisting of a negative cemented lens of a biconvex lens L21 and a biconcave lens L22, and the third lens unit G3 consisting of a biconvex lens L31, a biconcave lens L32, and a positive meniscus GRIN lens L33 with a concave surface opposed to the image side.

An aperture stop is disposed on the image side of the third lens unit G3. Further, the second lens unit G2 is moved toward the image side to effect focusing to a near object.

In Table 6-3 next there are listed values of specifications of Embodiment 23 of the present invention. In Table 6-3, F represents the focal length, $F_{NO}$ the F-number, Bf the back focus, and $\beta$ the image magnification.

Further, left-end numerals indicate orders of respective lens surfaces from the object side, r radii of curvature of the respective lens surfaces, d surface separations between the lens surfaces, and n and ν refractive indices and dispersion values (Abbe numbers) for the d-line (λ=587.6 nm).

TABLE 6-3

| F = 400 mm FNO = 5.6 | | | |
|---|---|---|---|
| r | d | ν | n |
| 1   175.223 | 9.87 | 70.1 | 1.51860 |
| 2  −283.051 | 1.01 | | |
| 3   104.824 | 11.46 | 82.6 | 1.49782 |
| 4  −273.045 | 0.50 | | |
| 5  −250.517 | 3.06 | 35.2 | 1.74950 |
| 6   185.172 | (d6 = variable) | | |
| 7  1727.408 | 6.63 | 30.1 | 1.69895 |
| 8  −177.220 | 4.87 | 43.3 | 1.84042 |
| 9   252.580 | (d9 = variable) | | |
| 10  810.723 | 3.46 | 28.6 | 1.79504 |
| 11 −185.502 | 53.51 | | |
| 12 −367.434 | 3.02 | 49.4 | 1.77279 |
| 13   57.585 | 3.00 | | |
| 14   75.296 | 4.50 | | (GRIN lens) |
| 15  304.401 | Bf | | |

TABLE 6-3-continued

F = 400 mm
FNO = 5.6

(Data on index distribution)

|  | n0 | n1 | n2 |
| --- | --- | --- | --- |
| d-line | 1.65160 | $-0.178 \times 10^{-2}$ | $0.614 \times 10^{-2}$ |
| C-line | 1.64821 | $-0.178 \times 10^{-2}$ | $0.602 \times 10^{-2}$ |
| F-line | 1.65934 | $-0.178 \times 10^{-2}$ | $0.635 \times 10^{-2}$ |

(Variable separations upon focusing)

| | F = 400.0000 | β = -0.1115 |
| --- | --- | --- |
| D0 | ∞ | 3705.0385 |
| d6 | 33.7540 | 49.8774 |
| d9 | 38.2360 | 22.1126 |
| Bf | 118.0926 | 118.0926 |

(Correspondent values to the conditions)

| (35) | f1/F = | 0.524 |
| --- | --- | --- |
| (36) | f1/f2 = | -0.779 |
| (37) | Ra/Rb = | 1.672 |
| (38) | (Rd + Rc)/(Rd - Rc) = | -0.814 |
| (39) | IRd (N2P - N2N)/(v2P - v2N)I = | 1.899 |
| (40) | IRe/RfI = | 2.663 |
| (41) | IN31 - N32I = | 0.02225 |
| (42) | Iv31 - v32I= | 20.8 |

FIGS. 68A–68D are aberration diagrams to show aberrations in the infinity focus state of the twenty third embodiment. FIGS. 69A–69D are aberration diagrams to show aberrations in a near shooting state (image magnification β=−0.1115) of the twenty third embodiment.

In each aberration diagram, $F_{NO}$ represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

Embodiment 24

Figure 70:
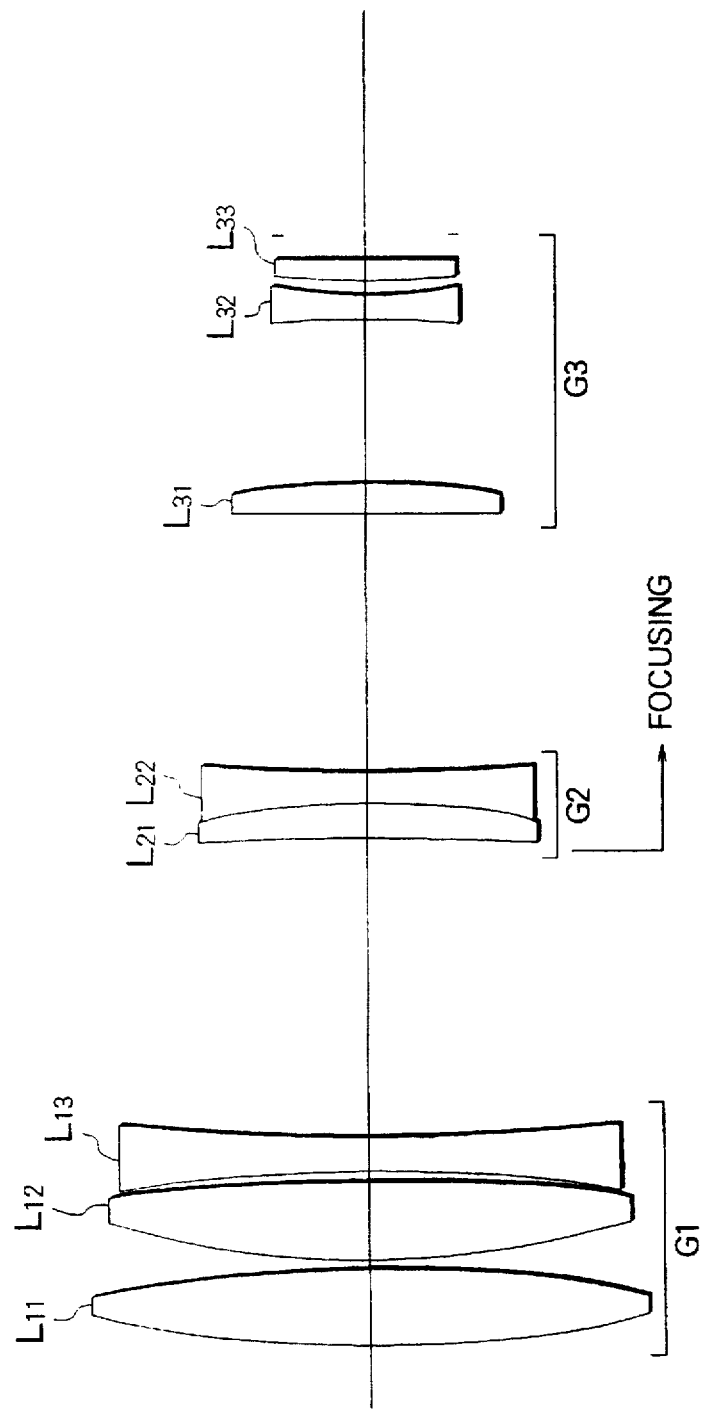
FIG. 70 is a drawing to show a lens layout of a telephoto lens according to the twenty fourth embodiment of the present invention.

FIG. 70 is a drawing to show a lens layout of the telephoto lens according to the twenty fourth embodiment of the present invention.

The telephoto lens as shown is composed of, in order from the object side, the first lens unit G1, consisting of a biconvex lens L11, a biconvex lens L12, and a biconcave lens L13, the second lens unit G2 consisting of a negative cemented lens of a positive meniscus lens L21 with a concave surface opposed to the object side and a biconcave lens L22, and the third lens unit G3 consisting of a biconvex lens L31, a biconcave lens L32, and a positive meniscus GRIN lens L33 with a concave surface opposed to the image side.

An aperture stop is disposed on the image side of the third lens unit G3. Further, the second lens unit G2 is moved toward the image side to effect focusing to a near object.

In Table 6-4 next there are listed values of specifications of Embodiment 24 of the present invention. In Table 6-4, F represents the focal length, $F_{NO}$ the F-number, Bf the back focus, and β the image magnification.

Further, left-end numerals indicate orders of respective lens surfaces from the object side, r radii of curvature of the respective lens surfaces, d surface separations between the lens surfaces, and n and v refractive indices and dispersion values (Abbe numbers) for the d-line (λ=587.6 nm).

TABLE 6-4

F = 600 mm
FNO = 5.6

| | r | d | v | n |
| --- | --- | --- | --- | --- |
| 1 | 220.265 | 15.30 | 82.6 | 1.49782 |
| 2 | -306.094 | 1.29 | | |
| 3 | 154.295 | 16.30 | 82.6 | 1.49782 |
| 4 | -499.490 | 2.03 | | |
| 5 | -354.340 | 7.12 | 35.2 | 1.74950 |
| 6 | 336.484 | (d6 = variable) | | |
| 7 | -1184.505 | 6.65 | 27.6 | 1.74077 |
| 8 | -190.430 | 6.32 | 49.4 | 1.77279 |
| 9 | 268.070 | (d9 = variable) | | |
| 10 | 1711.969 | 6.00 | 30.1 | 1.69895 |
| 11 | -178.768 | 33.09 | | |
| 12 | -650.186 | 4.93 | 49.4 | 1.77279 |
| 13 | 78.170 | 3.00 | | |
| 14 | 126.671 | 4.32 | | (GRIN lens) |
| 15 | 383.107 | Bf | | |

(Data on index distribution)

| | n0 | n1 | n2 |
| --- | --- | --- | --- |
| d-line | 1.74809 | $-0.5945 \times 10^{-3}$ | $0.813 \times 10^{-3}$ |
| C-line | 1.74376 | $-0.8034 \times 10^{-3}$ | $0.669 \times 10^{-3}$ |
| F-line | 1.75806 | $-0.6618 \times 10^{-3}$ | $0.1112 \times 10^{-2}$ |

(Variable separations upon focusing)

| | F = 600.0000 | β = -0.1339 |
| --- | --- | --- |
| D0 | ∞ | 4590.0073 |
| d6 | 61.2828 | 19.1810 |
| d9 | 52.6096 | 34.7114 |
| Bf | 189.7601 | 189.7601 |

(Correspondent values to the conditions)

| (35) | f1/F = | 0.405 |
| --- | --- | --- |
| (36) | f1/f2 = | -0.898 |
| (37) | Ra/Rb = | 1.428 |
| (38) | (Rd + Rc)/Rd - Rc) = | -1.383 |
| (39) | IRd (N2P - N2N)/(v2P - v2N)I = | 0.280 |
| (40) | IRe/RfI = | 4.469 |
| (41) | IN31 - N32I = | 0.07384 |
| (42) | Iv31 - v32I = | 19.3 |

FIGS. 71A–71D are aberration diagrams to show aberrations in the infinity focus state of the twenty fourth embodiment. FIGS. 72A–72D are aberration diagrams to show aberrations in a near shooting state (image magnification β=−0.1339) of the twenty fourth embodiment.

In each aberration diagram, $F_{NO}$, represents F-number, NA the numerical aperture, Y the image height, D the d-line (λ=587.6 nm), and G the g-line (λ=435.8 nm). In the aberration diagram to show astigmatism the solid line indicates the sagittal image surface while the dashed line the meridional image surface. Further, in the aberration diagram to show spherical aberration the dashed line illustrates the sine condition.

As apparent from the aberration diagrams, the present embodiment is well corrected for the various aberrations from the infinity to the near range.

As explained above, the present invention can realize the inner focus type telephoto lens having the light-weight focusing lens unit, a small amount of focusing movement, and excellent imaging performance. Accordingly, the load can be decreased on the drive mechanism for focusing.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 281228/1994 (6-281228) filed on Oct. 20, 1994, 281229/1994 (6-281229) filed on Oct. 20, 1994, 281231/1994 (6-281231) filed on Oct. 20, 1994, 281232/1994 (6-281232) filed on Oct. 20, 1994 and 281233/1994 (6-281233) filed on Oct. 20, 1994 and 281234/1994 (6-281234) filed on Oct. 20, 1994 are hereby incorporated by reference.

What is claimed is:

1. A shake-preventing correction optical comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having a positive lens and a negative lens, wherein said lens unit (G3a) has at least one positive lens and at least one negative lens, and which satisfies the following condition:

$$-1.5 < \Phi 3an/\Phi 3ap < -0.8$$

where $\Phi 3ap$ is a composite refractive power of the positive lens in said lens unit (G3a) and $\Phi 3an$ is a composite refractive power of the negative lens in said lens unit (G3a).

2. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having a positive lens and a negative lens, which satisfies the following condition:

$$-0.5 < |f3a/f1$$

where f3a is a focal length of said lens unit (G3a) and f is a focal length of the whole of the optical system.

3. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having a positive lens and a negative lens, wherein said lens unit (G3a) comprises a positive lens and a negative lens arranged in order from the object side, and which satisfies the following conditions:

$$-0.1 < r1/r2 < 0.8$$

$$0.5 < r3/r4 < 0.85$$

where r1 is a radius of curvature of an image-side surface of the positive lens in said lens unit (G3a), r2 a radius of curvature of an object-side surface of the negative lens in said lens unit (G3a), r3 a radius of curvature of an image-side surface of the negative lens in said lens unit (G3a), and r4 a radius of curvature of a most-object-side surface of said decentering lens unit (G3b).

4. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having a positive lens and a negative lens, wherein said first lens unit (G1) has a positive lens component (L11), a positive lens component (L12), and a negative lens component (L13) arranged in order from the object side, and which satisfies the following conditions:

$$0.40 < f1/f < 0.73$$

$$-1.90 < f1/f2 < -1.40$$

$$1.3 < Ra/Rb < 3.1$$

where f1 is a focal length of said first lens unit (G1), f2 a focal length of said second lens unit (G2), f a focal length of the whole of the optical system, Ra a radius of curvature of an object-side surface of said positive lens component (L11), and Rb a radius of curvature of an object-side surface of said positive lens component (L12).

5. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having an aspherical lens, wherein said lens unit (G3a) comprises a positive lens and a negative lens arranged in order from the object side, and which satisfies the following conditions:

$0.4 < r1/r2 < 1.0$ $0.6 < r3/r4 < 1.8$ where r1 is a radius of curvature of an image-side surface of the positive lens in said lens unit (G3a), r2 a radius of curvature of an object-side surface of the negative lens in said lens unit (G3a), r3 a radius of curvature of an image-side surface of the negative lens in said lens unit (G3a), and r4 a radius of curvature of an object-side surface of the aspherical lens in said decentering lens unit (G3b).

6. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having an aspherical lens, wherein said first lens unit (G1) has a positive lens component (L11), a positive lens component (L12), and a negative lens component (L13) arranged in order from the object side, and which satisfies the following conditions:

$0.40 < f1/f < 0.73$ $-1.90 < f1/f2 < -1.40$ $1.3 < Ra/Rb < 3.1$ where f1 is a focal length of said first lens unit (G1), f2 a focal length of said second lens unit (G2), f a focal length of the whole of the optical system, Ra a radius of curvature of an object-side surface of said positive lens component (L11), and Rb a radius of Curvature of an object-side surface of said positive lens component (L12).

7. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having a GRIN lens having an axial index distribution in which a refractive index thereof changes from the object side toward the image side, wherein said lens unit (G3a) comprises a positive lens and a negative lens arranged in order from the object side, and which satisfies the following conditions:

$-0.15 < r1/r2 < 1.15$ $0.50 < r3/r4 < 0.95$ where r1 is a radius of curvature of an image-side surface of the positive lens in said lens unit (G3a), r2 a radius of curvature of an object-side surface of the negative lens in said lens unit (G3a), r3 a radius of curvature of an image-side surface of the negative lens in said lens unit (G3a), and r4 a radius of curvature of an object-side surface of the GRIN lens in said decentering lens unit (G3b).

8. A shake-preventing correction optical system comprising in order from the object side a lens unit (Gf) fixed in a direction perpendicular to an optical axis and a shake-preventing correction lens unit (Gv) comprising a decentering lens unit arranged as movable in a direction substantially perpendicular to the optical axis, wherein said lens unit (Gf) comprises a first lens unit (G1) having a positive refractive power, a focusing lens unit (G2) having a negative refractive power and arranged to move along the optical axis to effect focusing to a near object, and a lens unit (G3a), and wherein said shake-preventing correction lens unit (Gv) consists of the decentering lens unit (G3b) having a GRIN lens having an axial index distribution in which a refractive index thereof changes from the object side toward the image side, wherein said first lens unit (G1) has a positive lens component (L11), a positive lens component (L12), and a negative lens component (L13) arranged in order from the object side, and which satisfies the following conditions:

$0.40 < f1/f < 0.73$ $-1.90 < f1/f2 < -1.40$ $1.3 < Ra/Rb < 3.1$ where f1 is a focal length of said first lens unit (G1), f2 a focal length of said second lens unit (G2), f a focal length of the whole the optical system, Ra a radius of curvature of an object-side surface of said positive lens component (L11), and Rb a radius of curvature of an object-side surface of said positive lens component (L12).

* * * * *